United States Patent [19]
Puckett

[11] Patent Number: 5,572,670
[45] Date of Patent: Nov. 5, 1996

[54] BI-DIRECTIONAL TRANSLATOR FOR DIAGNOSTIC SENSOR DATA

[75] Inventor: Timothy L. Puckett, Thornton, Colo.

[73] Assignee: Storage Technology Corporation, Louisville, Colo.

[21] Appl. No.: 179,583

[22] Filed: Jan. 10, 1994

[51] Int. Cl.[6] .................................................. G06F 11/34
[52] U.S. Cl. ............................ 395/183.22; 395/184.01
[58] Field of Search ..................... 395/183.22, 183.02, 395/183.03, 12, 184.01, 185.01; 364/920.04, 972.1, 419.05, 419.08, 920.4, 972.1

[56] References Cited

U.S. PATENT DOCUMENTS

| | | | |
|---|---|---|---|
| 3,971,014 | 7/1976 | Korowitz | 341/89 |
| 4,130,882 | 12/1978 | Swanstrom et al. | 364/900 |
| 4,498,149 | 2/1985 | Yoshida | 364/709 |
| 4,604,710 | 8/1986 | Amezcua et al. | 364/900 |
| 4,615,002 | 9/1986 | Innes | 364/419 |
| 4,649,515 | 3/1987 | Thompson et al. | 364/900 |
| 4,787,035 | 11/1988 | Bourne | 364/300 |
| 4,816,994 | 3/1989 | Freiling et al. | 364/200 |
| 4,901,247 | 2/1990 | Wakimoto et al. | 364/513 |
| 4,985,857 | 1/1991 | Bajpal et al. | 364/551.01 |
| 5,090,014 | 2/1992 | Polich et al. | 371/15.1 |
| 5,103,498 | 4/1992 | Lanier et al. | 395/68 |
| 5,107,500 | 4/1992 | Wakamoto et al. | 371/15.1 |
| 5,123,017 | 1/1992 | Simpkins et al. | 371/15.1 |
| 5,157,606 | 10/1992 | Nagashima | 364/419 |

OTHER PUBLICATIONS

Min Ke and M. Ali, "MLS, A Machine Learning System for Engine Fault Diagnosis," Artificial Intelligence Laboratory, The University of Tennessee Space Institute, (1988) pp. 721–727.

*Primary Examiner*—Robert W. Beausoliel, Jr.
*Assistant Examiner*—Albert Decady
*Attorney, Agent, or Firm*—Sheridan Ross & McIntosh

[57] ABSTRACT

A bi-directional translator is disclosed which translates between low level substantially binary records of a data repository (such as a data log) and substantially equivalent high level English-like terms. Thus, the translator is used to translate English-like queries for the data repository into equivalent binary records which can, in turn, be used in retrieving appropriately matching records from the data repository where the data repository records are redundant and have both time related dependencies between the records and have a plurality of different binary formats. Subsequently, the translator is used to translate the retrieved records into substantially equivalent non-redundant English-like terms having no time related dependencies between terms and such that the data format for the terms is substantially uniform.

21 Claims, 7 Drawing Sheets

110110001 1101100100110110010110110110111
10000111010110110001101101010111110011011000
1011101101100110001010011101101101111100110111

EVENT RECORD
(a)

er(10,1,t(90,12,21,8,9,22),e(19,3,5,65))

TUPLE
(b)

EVENT:DEVICE_FAILURE,DEVICE:1SM_1,YEAR:90,MONTH:12,DAY:21,HOUR:8,
MINUTE:9,SECOND:22, MECHANISM: ARM,ERROR:MOVEMENT FAILURE

METALANGUAGE STATEMENT
(c)

FAILURE OF LIBRARY STORAGE MODULE #1 ON DECEMBER 12, 1990
AT 8:09:22 A.M. WAS CAUSED BY A MOVEMENT FAILURE IN AN ARM
MECHANISM

ENGLISH LANGUAGE
(d)

EVENT RECORD DATA BEFORE CONVERSION (a)

3317849319033317849678

EVENT RECORD DATA CONVERTED TO DECIMAL FORMAT (b)

er(7,8,t(4,9,3),d(1,9,0,3),3,1,7,849678)

TUPLE CORRESPONDING TO THE EVENT RECORD (c)

FIG. 7

BI-DIRECTIONAL TRANSLATOR FOR DIAGNOSTIC SENSOR DATA

FIELD OF THE INVENTION

The present invention relates to translating between low level data records having both interrelated time dependencies and having a large plurality of varying formats as, for example, the bit oriented output by diagnostic sensors for a mass data storage system, and substantially equivalent high level data having English-like terms where statements of this latter data are not interrelated by time dependencies and such that the data format is substantially fixed and uniform.

BACKGROUND OF THE INVENTION

As computational systems become increasingly more complex, the data output has become more varied and complex. In particular, for system data output for diagnostic purposes from a mass data storage system, this is especially true. It is not uncommon for such diagnostic data captured as "log data" in "system log" files to be:

(1.1) extremely voluminous: In fact, such logs can be some of the system's largest data storage collections;

(1.2) extremely cryptic: It is not uncommon for the data to be encoded as merely strings of bits. Further, the data can be in a plurality of substantially distinct data formats represented among the bit strings where each format has a unique set of interpretation rules. Note that this can be particularly true of computational systems with cooperating devices where the individual devices were developed substantially in isolation from one another;

(1.3) subject to frequent change: The format and information content of log data records may fluctuate substantially as new information is required for new computational system problems that must be diagnosed.

(1.4) irrelevant data: Large amounts of data may be useless for diagnosis; e.g., because it is irrelevant or outdated and thus no longer applicable.

Furthermore, since the computational system anomalies may be so intermittent or sparsely manifested in the log that they are difficult to detect. Thus, it is not unusual for there to be only a few individuals who possess a sufficient background to understand such log data. Moreover, these individuals are likely to be senior engineers whose time is in high demand as system designers rather than system debuggers. To facilitate the use of such diagnostic data, a data translation and retrieval system is required which substantially alleviates the burden of the above drawbacks, (1.1) through (1.4). By translating between the cryptic ideocycratic formats within such data and a more uniform and comprehensible data representation, a more cost effective diagnosis process can be instituted whereby fewer highly skilled personnel are required in the diagnosis of, for example, computational system faults at a customer site.

SUMMARY OF THE INVENTION

The present invention relates to a method and apparatus for translation between low level data records having both interrelated time dependencies and having a large plurality of varying formats, and high level data having English, English-like or, more generally, natural language terms where statements of this latter data are not interrelated by time dependencies and such that the data format is substantially fixed and uniform.

The invention is presently embodied within a larger system for diagnosing anomalies in a computational system where the anomalies relate to the transfer and storage of data between at least one host computer interconnected to at least one robotic archival mass data storage device. However, the architecture for the translation system of the present invention can be easily adapted to translate system logs for anomalous behavior in other computational systems. That is, at a high level, the architecture of the novel translation system is substantially independent of both the computational system and the particular anomalies being diagnosed.

The novel translator of the present invention operates cooperatively with an intelligent analysis module during the diagnosis process. In response to a request for input from the intelligent analysis module, the present invention extracts and subsequently interprets or categorizes data records from a system log data repository thereby creating intermediate semantic structures having a substantially uniform format, the format being substantially independent of any log data record format. Subsequently, these intermediate semantic structures are used in creating high level semantic structures related to the anomaly being diagnosed. In this two stage translation process, a filtering and combining of data is performed whereby data not pertinent to a current information request is filtered out and pertinent data having redundancies is combined, thereby reducing the redundancies. Thus, for example, multiple intermediate semantic structures are coalesced into a single high level semantic structure. Therefore, the present invention effectively transforms low level device and/or process specific log data records related at least by their sequence within a system log into high level natural language based semantic structures. Moreover, in accomplishing this, the present invention advantageously insulates the intelligent analysis module from format changes in the log data records.

Other features and advantages of the present invention will become apparent from the detailed description and accompanying figures contained hereinafter.

BRIEF DESCRIPTION OF THE DRAWINGS

FIG. 2 illustrates data in (a) event record format, (b) tuple format, (c) metalanguage format and (d) English;

FIG. 7 illustrates the data conversion of an event record to a tuple.

DETAILED DESCRIPTION OF THE INVENTION

Figure 1:
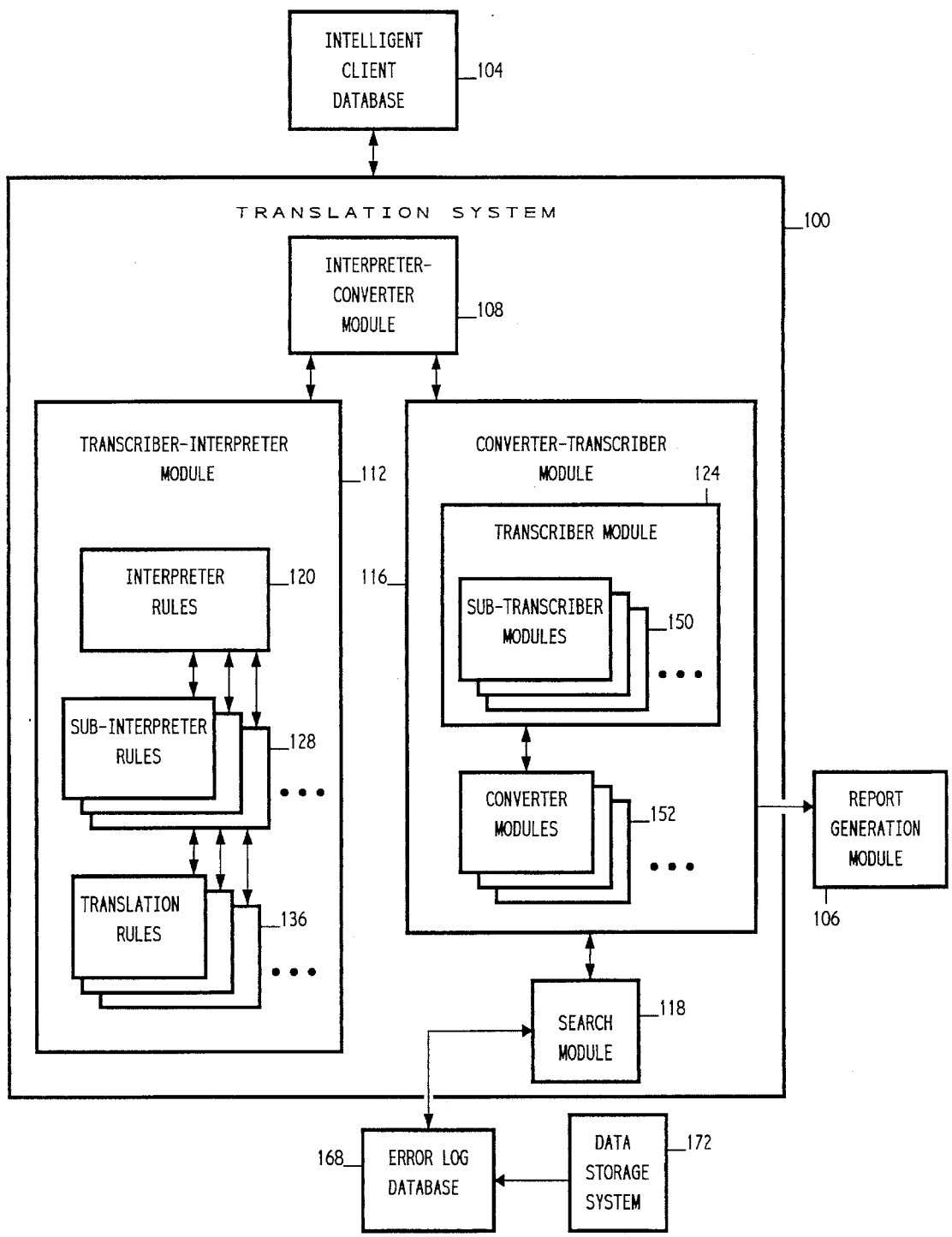
FIG. 1 is a block diagram of the translation system 100 of the present invention shown in the context of communicating with an intelligent client database 104, an error log database 168 and a report generation module 106.

Referring to FIG. 1, a diagram of the data translation system 100 embodying the present invention is disclosed. The data translation system 100 translates data between: (a) an intelligent client database 104 used for diagnosing faults within a data storage system 172; (b) an error log database 168 used for storing low level diagnostic data output by the data storage system 172; and (c) a report generation module 106 used for creating reports of the faults diagnosed by the intelligent client database 104.

The error log database 168 contains information about events that occur in the data storage system 172. These events can be errors in the storage system 172 or simply routine observations about the storage system 172. Each event is represented in the error log database 168 as a grouping of event related data having a substantially standardized descriptor or header. Thus, each grouping together with its descriptor is defined hereinafter as an "event record."

Besides interacting with the error log database 168, the translation system 100 also interacts with the intelligent client database 104. The intelligent client database 104 uses data output by the translation system 100, known as "facts" hereinafter. For example, in the current embodiment the intelligent client database 104 is implemented as an expert system using the PROLOG programming language. Thus, the facts obtained from the translation system 100 for diagnosing the causes of faults within storage system 172 are PROLOG predicates. Conversely, the intelligent client database 104 can supply data for translation as input to the translation system 100. For example, in the current embodiment, the intelligent client database 104 provides queries to the error log database 168 such that the queries, written in PROLOG, are translated by the translation system 100 into lower level C programming language data structures suitable for use by the search module 118 in retrieving event records from the error log database 168 as will be discussed further below. In addition, the expert system rules within the intelligent client database 104 can be translated by the translation system 100 into an English language format. Thus, the rules can be output and viewed by a person unfamiliar with the intelligent client database 104.

Figure 5:
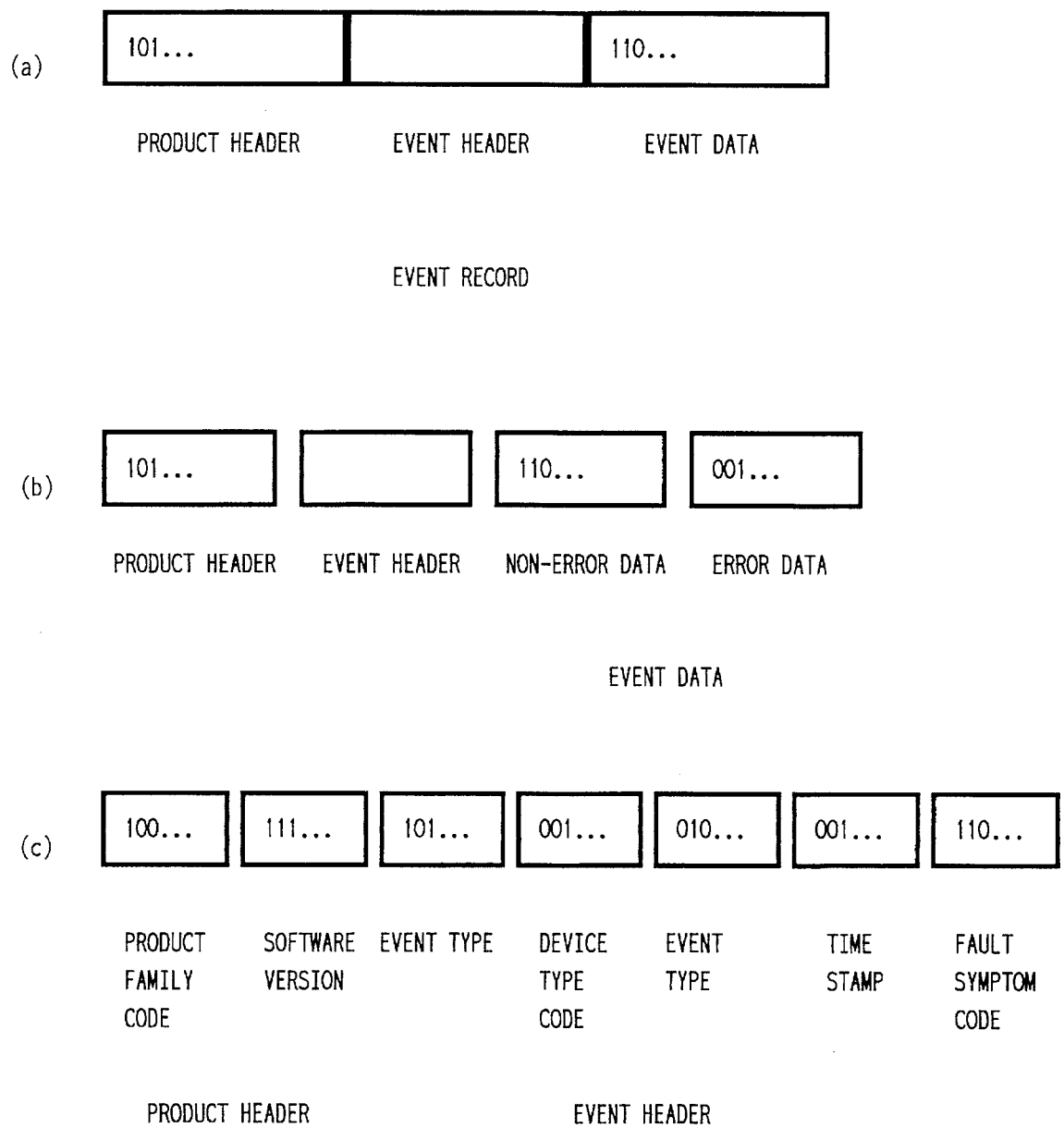
FIG. 5 illustrates data formats within an event record.

Before describing the main components of the translation system 100 more thoroughly, it is useful to define the types of data it receives, produces and/or outputs. The lowest level or most cryptic data are the event records, as shown in FIGS. 2(*a*) and 5(*a*)–(*c*). Each event record contains: (a) header data describing essentially what failed and when it failed, and (b) data describing the failure. In FIGS. 5(*a*)–(*c*) further detail of event records is shown. The header data includes an event header having the subfields of FIG. 5(*c*). Also, an initial event record of a series of event records typically includes a product header for identifying the product to which the event record series applies. In regards to the event data, as shown in FIG. 5(*b*), it is composed of a non-error data portion and an error data portion. The non-error data portion includes binary encoded accounting data providing data relating the containing event record to other records in the error log database 168. The error data portion includes substantially binary encodings of storage system 172 errors. Thus, an event record is a string of binary data having predetermined subfields determined substantially by position only.

As can be appreciated in viewing FIG. 2(*a*), event records are difficult to comprehend, especially for someone unfamiliar with the format(s) used. In particular, data within event records can be produced from various software packages or software versions and therefore event records are likely to be encoded in a variety of formats. In addition to the cryptic format(s), the event records can be highly time or sequence interrelated, making an analysis of these records substantially context dependent. Further, in certain circumstances the error log database 168 stores event records having nested data structures wherein one such data structure is nested within another, thus compounding the difficulty of accessing and interpreting the data therein.

The next higher level of data above event records used by this translation system 100 are "tuples." One example of a tuple is shown in FIG. 2(*b*). At this level, data is represented in a functional or predicate format with symbols being substantially alphanumeric. Thus, assuming FIG. 2(*b*) is a translation of FIG. 2(*a*) and that both can be interpreted as the failure of, for example, a library storage module number 1 arm mechanism, certainly a tuple is more easily comprehended. Further note that a single tuple can also represent a grouping of multiple event records and/or tuples in a condensed format. For example, the tuple, er(10, 1,t(90,9,3), e(19,3,565),e(10,5,384), e(11,5,208)) can represent a combination of er(10,1,t(90,9,3,12,01,30),e(19,3, 565)), er(10,1, t(90,9,3,13,20,03),e(10,5,389)) and er(10,1, t(90,9,3,14,01, 05),e(11,5,208)) indicating failures of disk drive number 1 at sensors 19, 10 and 11 on September 3rd.

A metalanguage level constitutes the next higher level of data used by the translation system 100, as shown in FIG. 2(*c*). Data records at the metalanguage level are an English-like translation of the data. Another example of metalanguage is: "EVENT:fail; DEVICE:DD#1; SENSOR:7; MONTH:sep; DAY:1." That is, this data is interpreted to mean that a failure occurred on disk drive #1 at sensor #7 on September 1st.

Finally, the translation system 100 is also able to translate data into an English language format, as shown in FIG. 2(*d*) which is an English translation of FIG. 2(*c*). Note, however, that the translation system 100 is not limited to these types of formats. The translation system 100 allows predetermined structures or rules for other natural languages to be easily incorporated.

In FIG. 1, the translation system 100 of the present invention is illustrated as composed of four high level submodules, that is, an interpreter-converter module 108, a transcriber-interpreter module 112, a converter-transcriber module 116 and a search module 118. The interpreter-converter module 108 functions as a controller and command interpreter for the translation system 100 thereby receiving commands from the intelligent client database 104 and invoking the transcriber-interpreter module 112 or converter-transcriber module 116 as needed. Thus, data exchanged between the transcriber-interpreter module 112 and the converter-transcriber module 116 is conveyed through the interpreter-converter module 108 rather than between the two modules directly. The interpreter-converter module 108 also outputs data to the intelligent client database 104 at the completion of the translation process. A PROLOG implementation of the major functions of the interpreter-converter module 108 is provided in Appendix A.

The transcriber-interpreter module 112 transcribes and interprets:

(2.1) tuple(s) into a metalanguage equivalent;

(2.2) metalanguage data into one or more substantially equivalent tuples; and/or (2.3) metalanguage data into an English equivalent for display via an output device such as a CRT (not shown).

The converter-transcriber module 116 converts between event records and tuples. Thus, the converter-transcriber module 116:

(3.1) transforms tuples generated from metalanguage statements by the transcriber-interpreter module 112 to search strings to be used in queries of the error log database 168;

(3.2) transforms event records retrieved from the error log database 168 into tuples; and (3.3) if necessary, transcribes a plurality of tuples into a collection of less redundant tuples by: (a) combining tuples judged to have substantially the same pertinent information, and (b) by composing tuples to provide a more compact or higher level tuple representation.

Note, that a PROLOG implementation of the major functions of the converter-transcriber module 116 is provided in Appendix E.

The search module 118 receives error log database 168 search or query requests from the converter-transcriber module 116 and initiates a search of the error log database 168 for the event record(s) satisfying the query. Subsequently, a copy of the event records satisfying the query is output to the converter-transcriber module 116 for processing.

Within the transcriber-interpreter module 112, there is an artificially intelligent software component known in the art as an expert system (not shown). This expert system is provided with a rule base that is hierarchically decomposed into three levels of rules: interpreter rules 120 (the first rules used when processing, for example, a tuple(s) into a metalanguage format), sub-interpreter rules 128, and translation rules 136 at the lowest or most specific level. The interpreter rules 120 determine what type of transformation is to be accomplished for given transcriber-interpreter module 112 input data; e.g., which of the translations (2.1)–(2.3) to perform. Furthermore, if a tuple to metalanguage translation is to be performed, then this module determines what tuple data coordinates and symbols must be interpreted. That is, since the converter-transcriber module 116 is designed to be general purpose, a tuple can contain substantially more information than is required. Therefore, when such a tuple is supplied as the input data to the interpreter rules 120 for translation into metalanguage, the rules are used to parse the tuple and locate the relevant data components for further translation.

Having determined the type of processing to be accomplished, the interpreter rules 120 provide the expert system of the transcriber-interpreter module 112 with direction in invoking one or more appropriate sub-interpreter rules 128. Note that a PROLOG version of representative rules for interpreter rules 120 is provided in Appendix B. The sub-interpreter rules 128 determine how input data is to be translated. Note that a PROLOG version of representative rules for the sub-interpreter rules 128 is provided in Appendix C. To accomplish the translation, the sub-interpreter rules 128, in turn, invoke one or more translator rules 136: (a) for translating each input tuple coordinate and symbol identified for translation into a knowledge element(s); (b) for translating each portion of an input metalanguage statement into a component of a tuple; and/or (c) for translating each portion of an input metalanguage statement into an English phrase. Thus, for example, with regard to (a), immediately above, if a tuple product identifier data component is identified as having a value of say 6, a translation rule 136 can translate this value into the knowledge element "product:acs4430" which is more suitable, in general, for symbolic manipulation in the client database 104 and also more easily understood by an operator or user. Note that a PROLOG version of representative rules for the translation rules 136 is provided in Appendix D.

Within the converter-transcriber module 116, a transcriber module 124 is used to parse the converter-transcriber module 116 input (i.e., tuples or event records). Note that a C programming language implementation of the major functions of the transcriber module 124 is provided in Appendix F. In addition, the transcriber module 124 also invokes one or more sub-transcriber modules 150 to generate appropriate data structures to be output by the converter-transcriber module 116 or (i.e., event record queries or tuples). Note that a C programming language implementation of the major functions of the sub-transcriber modules 150 is provided in Appendix G. Further, the transcriber module 124 also invokes one or more converter modules 152 to convert values between low level primitive data types such as between Binary Coded Decimal format and hexadecimal format. That is, each of the converter modules 152 provide the capability to convert between two such low level data types. Note that a C programming language implementation of the major functions of the converter modules 152 is provided in Appendix H.

Figure 3:
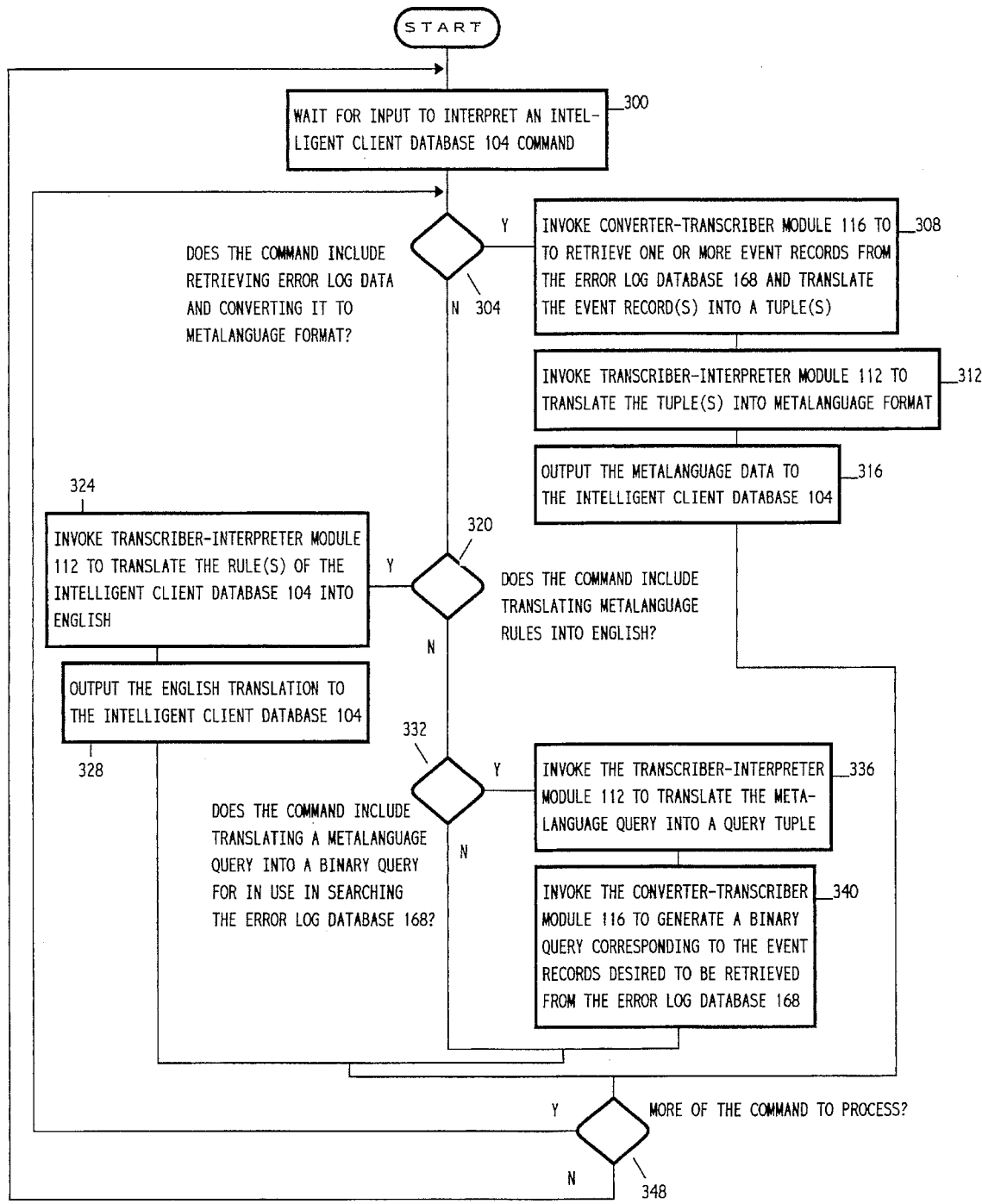
FIG. 3 is a flowchart presenting the steps performed by the interpreter-converter module 108.

Referring now to FIG. 3, a flowchart is presented of the high level steps performed by the interpreter-converter module 108. In step 300, the interpreter-converter module 108 waits for a command to be received from the intelligent client database 104. In step 304, the interpreter-converter module 108 tests whether the received command requires retrieval and conversion of one or more event records into a metalanguage format. If the command requires such a task, the interpreter-converter module 108 invokes the converter-transcriber module 116 in step 308 to retrieve the appropriate event record(s) from the error log database 168 and subsequently to translate the retrieved event record(s) into a tuple(s). As an aside, note that typically in order to perform this step, a metalanguage error log database search query must be translated into a binary search query as discussed in steps 332–340 below. Next, in step 312, the interpreter-converter module 108 invokes the transcriber-interpreter module 112 to translate the tuple(s) output by the converter-translator module 116 into metalanguage format. In step 316, the interpreter-converter module 108 then outputs the metalanguage data corresponding to the tuple(s) to the intelligent client database 104. Subsequently, in step 348, a determination is made as to whether the command currently being processed includes further directives. If not, then control loops back to step 300 in preparation for the next command. Alternatively, if there are further directives, then control loops back to step 304 for processing the additional directives.

If in step 304, the command does not require further retrieval of error log data, the interpreter-converter module 108 performs step 320. In step 320, the interpreter-converter module 108 tests whether the intelligent client database 104 requires a translation of one of its expert system rules. If this is true, in step 324, the interpreter-converter module 108 invokes the transcriber-interpreter module 112 to translate the input rule into an English language format. In step 328, the interpreter-converter module 108 outputs an English translation of the metalanguage corresponding to the rule(s) to the intelligent client database 104. Subsequently, step 348 is encountered and control is directed as appropriate.

If in step 320, the command from the intelligent client database 104 does not require further conversion of metalanguage rules to English language, the interpreter-converter module 108 proceeds to step 332. In step 332, the interpreter-converter module 108 tests whether a metalanguage query or fact pattern is to be converted into a binary query (typically for use in matching against event records when searching the error log database 168). If the command does require such a task, in step 336, the interpreter-converter module 108 invokes the transcriber-interpreter module 112 to translate the metalanguage query into a tuple (or query tuple) having substantially the same semantics and to output the result to the interpreter-converter module 108. In step 340, the interpreter-converter module 108 invokes the converter-transcriber module 116 to convert the output query tuple into a binary template suitable for matching against error log database 168 event records.

Figure 4:
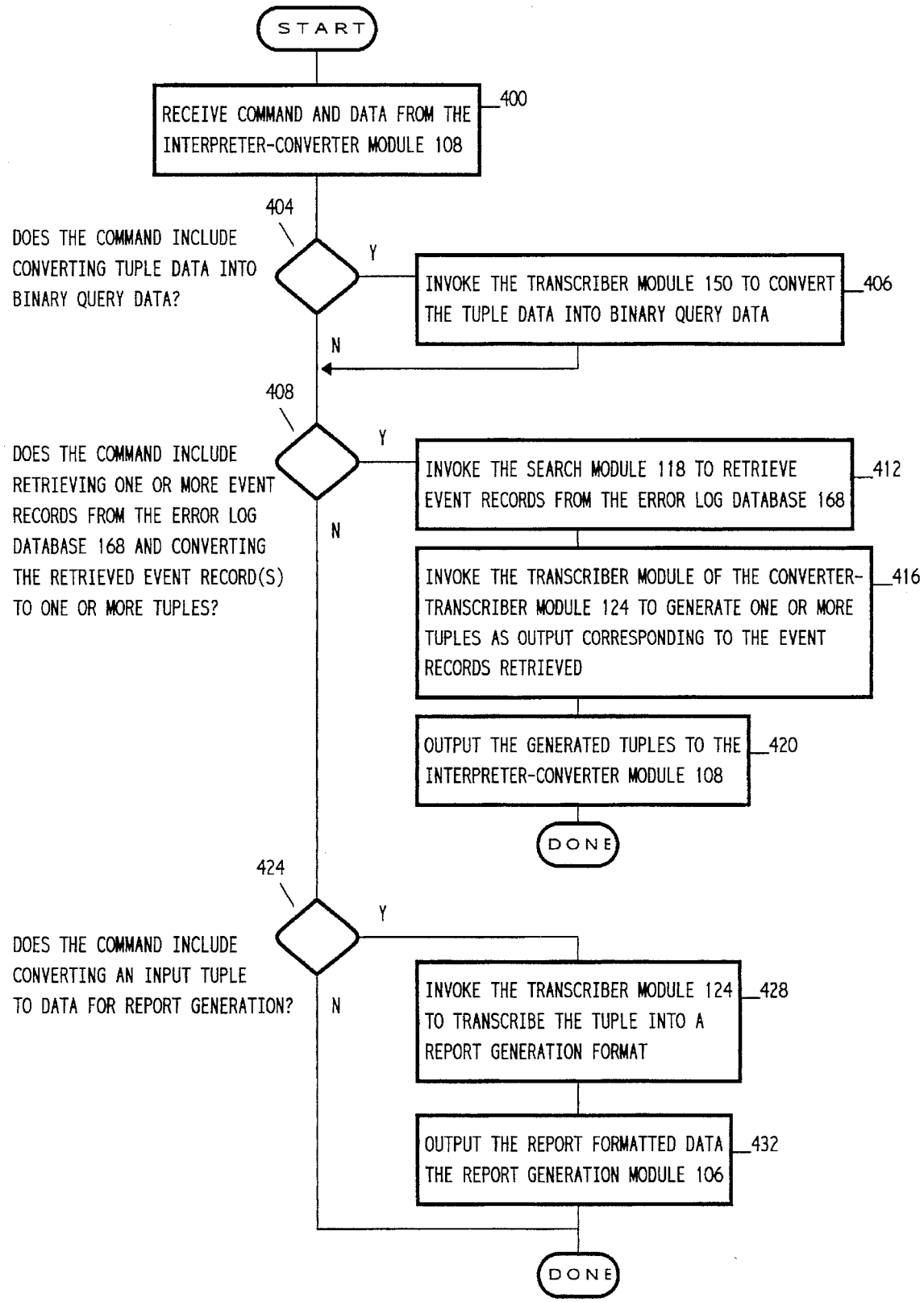
FIG. 4 is a flowchart presenting the steps performed by the converter-transcriber module 116.

Referring now to FIG. 4, a flowchart is presented of the high level steps performed by the converter-transcriber module 116. In step 400, the converter-transcriber module 116 receives a command and tuple data from the interpreter-converter module 108. In step 404, the converter-transcriber module 116 tests whether the command requires that input tuple data is to be converted to binary query data. If so, in step 406, the converter-transcriber module 116 invokes the transcriber module 124 to convert the input tuple data into binary query data. Subsequently, regardless of the path taken from step 404, step 408 is encountered. In step 408, a determination is made as to whether an event record(s) is to be retrieved from the error log database and converted into a tuple(s). If so, then in step 412, the search module 118 is invoked to search the error log database 168. Thus, the search module 118 connects to the error log database 168 and retrieves the event records which match the query. Once the search module 164 has retrieved the query satisfying event record(s), in step 416, the converter-transcriber module 116 again invokes the transcriber module 124 to transform the retrieved event record(s) into a tuple(s). Note that the transcriber module 124 is programmed to recognize each of a plurality of event record types occurring in the error log database 168. Thus, upon parsing the retrieved event record(s), the transcriber module 124 invokes converter modules 152 to transform specific primitive or atomic binary fields of the retrieved event record(s) pertinent to the query tuple.

Once the converter modules 152 convert the atomic binary subfields, the transcriber module 124 invokes one or more sub-interpreter modules 150 to structure the output from the converter modules 152 into a tuple(s) for subsequent output to the interpreter-converter 108. Thus, for example, conversion of the event record in FIG. 7(a) can produce the string of decimal numbers shown in FIG. 7(b). The transcriber module 124 then transcribes the string of numbers into a tuple, as shown in FIG. 7(c).

Further, note that the transcriber module 124 in generating a tuple(s) recognizes commonality and redundancy among both retrieved event records and generated tuples. Thus, in particular, if duplicate tuples are generated, then typically all but one such tuple is deleted from further processing.

Thus, referring to step 420 of FIG. 4, once the transcription is complete, the converter-transcriber module 116 outputs a query satisfying tuple(s) to the interpreter-converter module 108.

Alternatively, if in step 408, the interpreter-converter module 108 does not require the converter-transcriber module 116 to retrieve an event record(s), then the test in step 424 is performed. Step 424 tests whether the interpreter-converter module 108 requires the converter-transcriber module 116 to convert one or more input tuples to a data representation suitable for the report generation module 106. If so, in step 428, the converter-transcriber module 116 invokes the transcriber module 124. The transcriber module 124 invokes both one or more converter modules 152 to convert primitive data types as appropriate, and a predetermined sub-interpreter module 150 that outputs data in a form suitable to the report generation module 106. Thus, in step 432, the converter-transcriber module 116 outputs the report data to the report generation module 106.

Figure 6:
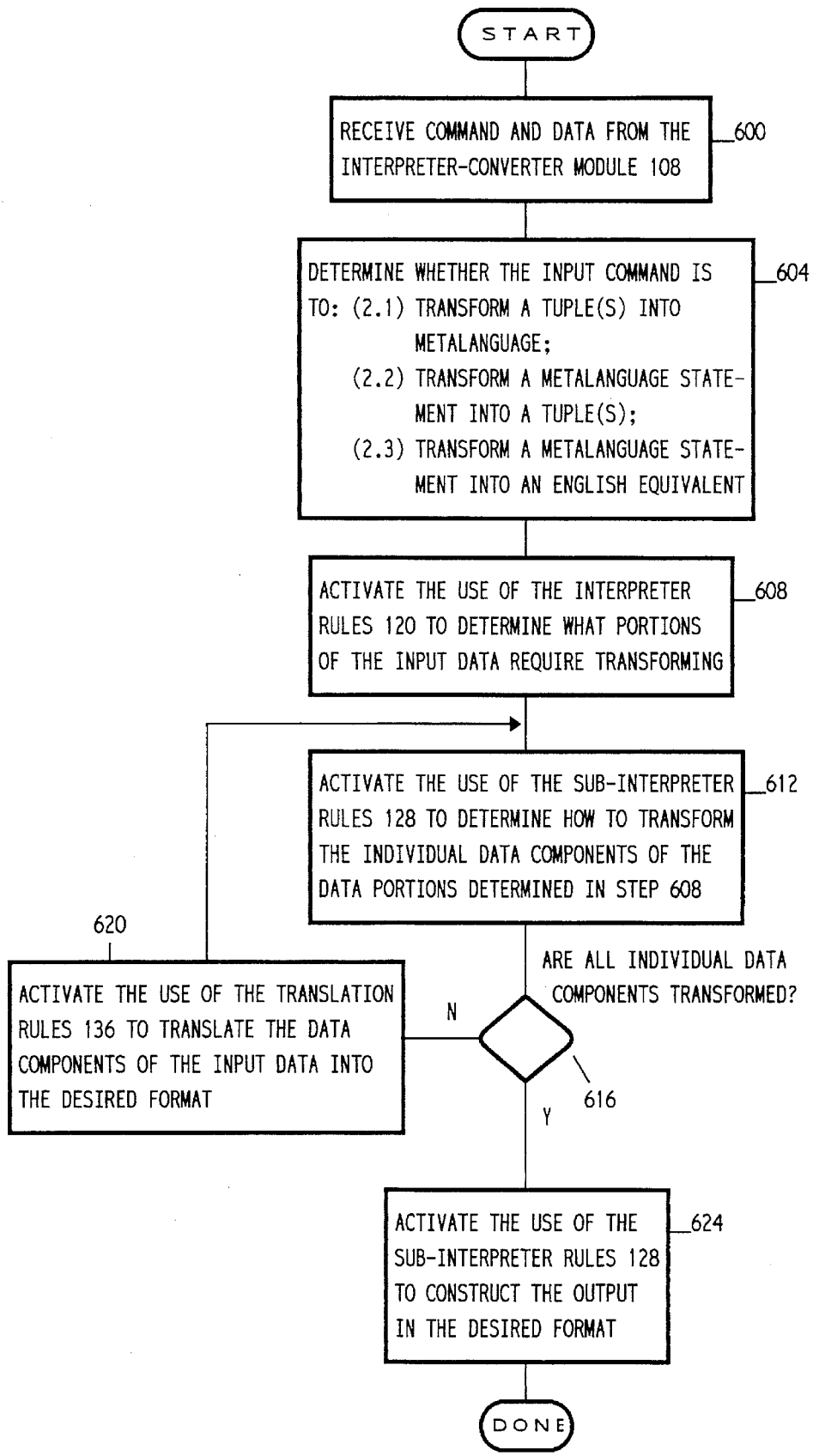
FIG. 6 is a flowchart presenting the steps performed by the transcriber-interpreter module 112.

Referring now to FIG. 6, a flowchart is presented of the high level steps performed by the transcriber-interpreter module 112. In step 600, the transcriber-interpreter module 112 receives a command and data from the interpreter-converter module 108. In step 604, the transcriber-interpreter module 112 determines the type of translation to perform, that is, one of (2.1)–(2.3) as given above and in step 604. Once the determination is made, in step 608, interpreter rules 120 are used to determine the portion(s) of the input data to be transformed. In step 612, sub-interpreter rules 128 are used to determine how to transform the individual data components of the portions of the input data determined in step 608. If, in step 616, it is determined that there are further individual data components to be transformed, then in step 620 the translation rules 156 are used to translate the data components into the desired format. Subsequently, step 612 is again encountered. Thus, step 612 iteratively activates step 620 until all data components have been transformed. Once all data components have been transformed, step 624 is performed wherein the sub-interpreter rules 128 are used to construct the output in the desired format.

As an example of the process of FIG. 6, if the interpreter-converter module 108 inputs the tuple "er(1, 1, 7, 9, 4, d(3, 1, 9, 0, 3))," with a command to convert this tuple into a metalanguage equivalent, then the interpreter rules 120 parse the data into 1, 1, 7, 9, 4 and d(3, 1, 9, 0, 3). Subsequently, the interpreter rules 120 cause the appropriate sub-interpreter rules 128 to be activated based on the "event type" code contained in the first element location. The sub-interpreter rules 128 cause the appropriate translation rules 136 to be activated for each individual data component. Therefore, for example, the translation of "1","1","7","9", "4" to metalanguage format yields "EVENT:fail; DEVICE:DD#1; SENSOR:7; MONTH:sep; DAY:1." Similarly, the translation of the "d(3, 1, 9, 0, 3)" yields "TIME:03:19:03." Given these translations, the sub-interpreter rules 128 combine the metalanguage terms to form the complete metalanguage expression: "EVENT:fail; DEVICE:DD#1; SENSOR:7; MONTH:sep; DAY:1; TIME:03:19:03," which indicates a failure of disk drive #1 occurred on September 1 at 3:19:03 AM at sensor location 7. Once the sub-interpreter rules 128 have been activated to organize the data produced by the translator rules 136, the transformed data is output to the transcriber-interpreter module 112 which, in turn, outputs the metalanguage data to the interpreter-converter module 108.

As a further example of the process of FIG. 6, if the interpreter-converter module 108 inputs the metalanguage statement "EVENT:fail; DEVICE:DD#1; SENSOR:7; MONTH:sep; DAY:1; TIME:03:19:03," with a command to translate this metalanguage statement in an English equivalent, then the interpreter rules 120 are used to parse the statement into the following individual data components: "EVENT:fail," "DEVICE:DD#1," "SENSOR:7," "MONTH:sep," "DAY:1" and "TIME:03:19:03." Subsequently, the interpreter rules 120 cause the activation of the appropriate sub-interpreter rules 128 for outputting an English translation. The sub-interpreter rules 128 cause the activation of the translation rules 136 for translating each of the above data components into English phrases. The following English phrases are obtained: "a failure occurred," "on disk drive #1," "at sensor #7," "in September," "1st" and "at 3:19:03 AM." Subsequently, the sub-interpreter rules 128 combine and rearrange as necessary these English phrases. For example, the above English phrases yield: "A failure occurred on disk drive #1 at sensor #7 on Sep. 1st at 3:19:03 AM." Finally, this result is output to the interpreter-converter module 108.

The following example further illustrates the operation of the translation system 100. The example relates to diagnosing errors occurring in a data storage system 172 such as a disk drive data storage system. More precisely, the disk drive data storage system consists of multiple disk drives and multiple sensors that output event records corresponding to failures of the components of the system. The attributes of each such event record are: the type of failure, the device affected, the name of the product family of the device, the time of the event, the version number of the software used to report the error, the sequence number of this event record in the error log database and the sensor data corresponding to the error. Therefore, assume the following data for event records is in the error log database 168:

| | | |
|---|---|---|
| 0916890000003035 | 3039370026DB0001 | 01A40005000CD006 |
| 000C000100040002 | 0000D00600010000 | ... |
| 0921960000003035 | 3937310014DB000D | 01A5000A000CD006 |
| 000B000000010001 | 000AD00600010000 | 0000000140D40038 |
| 0A01002A90122108 | 0922040000003035 | 3937310014DB000D |
| 01A5010A000CD006 | 0002000000000000 | 3393D00600030000 |
| 0000FFFFD6EB0038 | 0A01002A90122108 | 0A01002E90122108 |
| 0922190000003035 | 3937310014DB000D | 01A5030A000EB006 |
| 0002000000000000 | 339313300235B006 | ... |

If translated by the translation system 100, there is an event record, E, within this data which translates to: "On Dec. 21, 1990 at 8:09 am in Library Storage Module 1, the Z mechanism motor stopped working. This caused the Z mechanism and the Library Storage Module 1 to become inoperative."

While the above error log data overwhelms and confuses an untrained person, the translation system 100 of the present invention can convert the data to a common format and subsequently translate the data for use by a system that can diagnose the cause of the system malfunction.

The translation of the error log data commences with the intelligent client database 104 sending a command and a metalanguage query to the translation system 100 requesting a metalanguage version of, for instance, the event record E. The interpreter-converter module 108 of the translation system 100 receives the command and interprets the command to mean that an event record is to be retrieved from error log database 168. The interpreter-converter module 108 subsequently invokes the transcriber-interpreter module 112 to transform the metalanguage query into a query tuple. Following this, the interpreter-converter module 108 invokes the converter-transcriber module 116 with the query tuple and any data describing the search location.

The converter-transcriber module 116 transforms the query tuple into a binary query to search the error log database 168 and retrieve the event record E. In accomplishing this, the converter-transcriber module 116 invokes the search module 118 to retrieve the event record E from the error log database 168. In this example, the event record E is: "0A01002A90122108 0922110000003035 3937310014DB000D 01A5020A000CD006 000400000000FFFF FFFF0350003A9004 00200007FCE0038." The search module 118 subsequently returns this event record to the converter-transcriber module 116 which, in turn, invokes the transcriber module 124 and conveys event record E.

The transcriber module 124 parses the event record E. For example, the event record E is first parsed into two areas: the header and the product specific data. The header data of this event record is 0A01002A90122108 092211000000. The product specific data is 3035 3937310014DB000D 01A5020A000CD006 000400000000FFFF FFFF0350003A9004 000200007FCE0038. Programmed with the composition and organization of the event record data, the transcriber module 124 can further parse the data into subsets to be converted by the conversion modules 152. For example, regarding the header data the transcriber module 124 invokes a converter module 152 to convert 0A, the first subset of data in the header data, from its hexadecimal value to 10, its decimal value. Similarly, 01 is converted to 1 and 002A is converted to 42. Since the remainder of the header data 90122108 09221100 is presently encoded in Binary Coded Decimal (BCD), the transcriber module 124 invokes a series of converter modules 152. Therefore, this remaining portion of the header is first converted to hexadecimal by a first converter module 152. This yields 5A0C150809160B00. This hexadecimal string is then converted to decimal by invoking a second converter module 152.

The transcriber module 124 also filters out any unnecessary data not needed for transcription. For example, the following product specific data 3035 3937310014DB00D 01A5020A000C is accounting data. Thus, most of this data is not needed during diagnosis. Therefore, most of this data is not processed. However, the 3035 39373100 portion of the accounting data is processed. This portion represents the Host Identifier number, that is, identification number of the disk data storage system. Programmed with the knowledge that the Host Identifier number is encoded in ASCII, the transcriber module 124 invokes an ASCII to Decimal converter module 152. The Host Identifier number is therefore converted from 3035 39373100 to 05971, i.e., the 30 is converted to a 0 and the 35 is converted to a 5, etc.

After also converting the product specific data of the event record E from its plurality of formats to a series of decimal numbers, the transcriber module 124 subsequently uses the output from each of the converter modules 152 to construct a tuple. Thus, the tuple for the event record E is: er (10, 1, 2, t(90, 12, 21, 08, 09, 22, 11), 0, 6, 2.3, d(98, 5971, s(208, 6, 4, 0, 0, 65535, 65535), e(3, 5, 58), s(144, 4, 2, 0, 32718))) . Note that the t(. . .) , d(. . .) , s(. . .) and e(. . ) terms in the tuple for E are also tuples. Further, note that the designations "er", "t", "d", "s" and "e" uniquely identify each (sub)tuple type.

In addition, if the command from the interpreter-converter module 108 requires it, the converter-transcriber module 116 can invoke the search module 164 to retrieve a second event record from the error log database 168 for conversion to a second tuple. If multiple event records are retrieved and transformed into tuples, the transcriber module 124 can combine the tuples to eliminate substantial redundancy, thereby reducing the number of tuples output. For example, if the following logical tuples are generated by transforming event records:

er(10, 1, 42, t(90, 12, 21, 8, 9, 21, 96), 0, 6, 2.3, d(96, 5971, s(208, 6, 11, 0, 1, 1, 10), s(208, 6, 1, 0, 0, 1, 16596)));

er(10, 1, 42, t(0, 12, 21, 8, 9, 22, 4), 0, 6, 2.3, d(97, 5971, s(208, 6, 2, 0, 0, 0, 13203), s(208, 6, 3, 0, 0, 65535, 55019))); and er(10, 1, 46, t(90, 12, 21, 8, 9, 22, 19), 0, 6, 2.3, d(99, 5971, s(176, 6, 2, 0, 0, 0, 13203), e(19, 3,565), s(176, 6, 11, 0, 1, 1, 10))).

Combining the "er" tuples to form one comprehensive tuple that eliminates redundancies, yields:

er(10, 1, 42, t(90, 12, 21, 08, 09, 21, 96), 0, 6, 2.3, d(96, 5971, s(208, 6, 11, 0, 1, 1, 10), s(208, 6, 1, 0, 0, 1, 16596), s(208, 6, 2, 0, 0, 0, 13203), s(208, 6, 3, 0, 0, 65535, 55019), s(208, 6, 4, 0, 0, 65535, 65535), e(3, 5, 58), s(144, 4, 2, 0, 32718, 56), s(176, 6, 2, 0, 0, 0, 13203), e(19, 3, 565), s(176, 6, 11, 0, 1, 1, 10))).

To fulfill the request of the intelligent client database 104 for event record E in metalanguage format, once the converter-transcriber module 116 outputs the tuple corresponding to event record E, the interpreter-converter module 108 invokes the transcriber-interpreter module 112 to translate the tuple corresponding to E into its metalanguage equivalent. Thus, the transcriber-interpreter module 112 first uses the interpreter rules 120 with the event record E tuple, hereinafter, E-tuple. The interpreter rules 120 parse the elements of the E-tuple. Subsequently, the sub-interpreter rules 128 operate on the parsed elements. However, not every element needs to be interpreted. Thus, some parsed elements are discarded. For example, the E-tuple generated is parsed into six elements: 10 in the first coordinate position; 1 in the second coordinate position, t(. . .) in the fourth coordinate position; 6 in the sixth coordinate position; 2.3 in the seventh coordinate position; and d( . . . ) in the eighth coordinate position. Note that the 42 and 0 elements are not used in this interpretation; i.e., they are ignored. Based on position, the elements are interpreted as follows:

10 is the Event Identifier;

1 is the Device Identifier;

t(90, 12, 21, 08, 09, 21, 96) is the Time Stamp;

6 is the Product Identifier;

2.3 is the Software Revision;

d(96, 5971, s(208, 6, 11, 0, 1, 1, 10), s(208, 6, 1, 0, 0, 1, 16596), s(208, 6, 2, 0, 0, 0, 13203), s(208, 6, 3, 0, 0, 65535, 55019), s(208, 6, 4, 0, 0, 65535, 65535), e(3, 5, 58), s(144, 4, 2, 0, 32718, 56), s(176, 6, 2, 0, 0, 0, 13203), e(19, 3,565), s(176, 6, 11, 0, 1, 1, 10)) is the Servo Response.

Subsequently, the sub-interpreter rules 128 cause activation of the translation rules 136 to transform the above data elements into metalanguage format. That is, by activating the sub-interpreter rules 128 that interpret "er" tuples, an interpretation is made of the six elements. That is, the "er" sub-interpreter 128 determines one or more translation rules 136 to be activated for each of the above listed six parsed elements to interpret the E-tuple. Thus, the Event Identifier value, 10, is provided to a translation rule 136 for outputting an attribute identifier, i.e., "event" in this case, followed by a value of the attribute, which corresponds to the value 10; i.e., "device_operation" in this case. Thus, the resulting output is the metalanguage term, "event:device_operation." Similarly, the "er" sub-interpreter rules 128 activates a "device_identifier" translation rule 136 for the second of the above six elements; i.e., the "1" which identifies the device to which the E-tuple applies. Thus, the metalanguage term, "device:lsm_1" is returned indicating that library storage module 1 was affected. Continuing, a time stamp translation rule 136 is activated for the fourth location t(90, 12, 21, 08, 09, 21, 96) and returns the metalanguage term, "year:90, month:12,day:21,hour:8, minute:9,second:21" representing the time when the event record E was generated. In regards to the fourth of the six elements; i.e., the "6", a translation rule 136 transforms this value to "product:acs4430." In regards to the fifth element, i.e., the "2.3," a translation rule 136 transforms this value to "revision:2.3." In regards to the sixth element; i.e., the Servo Response element, d(96, 5971, s(208, 6, 11, 0, 1, 1, 10), s(208, 6, 1, 0, 0, 1, 16596), s(208, 6, 2, 0, 0, 0, 13203), s(208, 6, 3, 0, 0, 65535, 55019), s(208, 6, 4, 0, 0, 65535, 65535), e(3, 5, 58), s(144, 4, 2, 0, 32718, 56), s(176, 6, 2, 0, 0, 0, 13203), e(19, 3, 565), s(176, 6, 11, 0, 1, 1, 10)), one or more translation rules 136 transform this subtuple into the two metalanguage terms, "servo_response:[mechanism: z,level:5,error: motor_failed]" and "serv_response[mechanism:arm, level:3error:move_failed]." Further, note that the value 96 in the first coordinate of the d(. . .) subtuple is transformed into the term "sequence:96" and the value 5971 of the second coordinate is transformed into the term "host:5971." Finally, note that the s(. . .) sub-subtuples are not used, therefore, they are ignored.

Thus, the E-tuple is transformed to the metalanguage statement "[event:device_operation, device:lsm_1, year:90, month:12, day:21, hour:8, minute:9, second:22, product:acs4430, sequence:98, host:5971, servo_response: [mechanism:z,level:5, error:motor_failed], servo_response:[mechanism:arm, level:3, error:move_failed]]" which is output to the intelligent client database 104.

As an example illustrating the use of the translation system 100 in translating from metalanguage input into one or more event records, if the interpreter-converter module 108 receives the metalanguage data "EVENT:fail; DEVICE:DD#1; SENSOR:7; MONTH:sep; DAY:1; TIME:03:19:03" with a command to convert this metalanguage statement to event record(s), then the interpreter-converter module 108 first invokes the transcriber-interpreter 112 with this metalanguage statement. Subsequently, the transcriber-interpreter 112 uses the interpreter rules 120 to parse the metalanguage statement into "EVENT:fail," "DEVICE:DD#1," "SENSOR:7," "MONTH:sep," "DAY:1," and "TIME:03:19:03." Subsequently, the interpreter rules 120 cause the appropriate sub-interpreter rules 128 to be activated. The activated sub-interpreter rules 128 cause the appropriate translation rules 136 to be activated for each individual data component. Thus, the following translations are obtained from the translation rules 136: er(1, _, _, _) from "DEVICE:DD#1"; er(_, 7, _, _)from "SENSOR:7"; er(_, _, 9, _) from "MONTH:sep"; er(_, _, _, 1) from "DAY:1"; d(3, 1, 9, 0, 3) from "TIME:03:19:03." The sub-interpreter rules 128 then are activated to combine the output of the translation rules 136 to produce the tuple: "er(1, 7, 9, 4, d(3, 1, 9, 3))" which is subsequently output to the interpreter-converter module 108.

The interpreter-converter module 108, in turn, supplies this newly generated tuple(s) to the converter-transcriber module 116 for converting to one or more event records. Thus, the transcriber module 124 is invoked to first determine the type of tuple input, in the current example an "er" tuple, and second, to invoke the appropriate sub-interpreter module 150 for parsing of the input tuple into the following tuple terms: "dv(1)" for device 1, "sn(7)" for sensor 7, "dt(9,1,_)" for the date (i.e., Sep. 1st), "tm (3,19,3)" for the time of day. Various converter modules 152 are invoked to translate each of the above tuple terms. Thus, upon translating each of the above tuple terms, the following event record terms are respectively obtained: 01, 07, 090100 and 031903 where the 090100 and 031903 terms are BCD (Binary Coded Decimal) formatted date and time terms, respectively. Subsequently, a sub-transcriber module 150 combines these event record terms into the event record: 01070901FF031903.

At this point, it is worth mentioning that typically an input metalanguage statement for translation into one or more event records will be a query for the error log database 168. Thus, the metalanguage query statement will have at least one variable or place holder where a value could be and this query statement will translate into one or more event record queries. Thus, if all failure events on device DD#1 on September 1 are desired the initial metalanguage statement input to the interpreter-converter module 108 would be: DEVICE:DD#1, MONTH:SEP, DAY:1, EVENT:[device_ operation, user_request, device_failure]. Subsequently, once this metalanguage query is translated, at least the following three lists of event record queries are obtained:

(4.1) a list of event queries corresponding to device DD#1 operation errors:

---
[EVENT:device_operation, DEVICE:DD#1, DATE:(9,1),
    SERVO_RESPONSE:[MECHANISM:z, LEVEL:5,
        ERROR:motor_failed],
    SERVO_RESPONSE:[MECHANISM:hand_0, LEVEL:3,
        ERROR:fetch_failed],
    SERVO_RESPONSE:[MECHANISM:finger0, LEVEL:3,
        ERROR:stuck_open],
    SERVO_RESPONSE:[. . .],
. . .
---

That is, this list queries for all SERVO_RESPONSE errors for which the error log database 168 is to be checked. In particular, the first three are: a motor failure in the motor that moves the robot arm in the vertical (i.e., "z") direction, a tape cartridge fetch failure by robot hand 0, and a failure in flexing finger 0 of a robot hand.

(4.2) a list of event queries corresponding to device DD#1 user request errors:

---
EVENT:user_request, DEVICE:DD#1, DATE:(9,1),
    COMMAND_RESPONSE:[get_failed, . . .],
    COMMAND_RESPONSE:[. . .],
. . .
---

That is, this list queries for all command responses for which a failure occurred;

(4.3) a list of event queries corresponding to device DD#1 device failures:

---
EVENT:device_failure, DEVICE:DD#1, DATE:(9,1),
    SERVO_RESPONSE:[MECHANISM:lamp0,
    LEVEL:5,ERROR:
        left_bulb_out],
    SERVO_RESPONSE:[. . .],
. . .
---

That is, this list queries for all servo_response failures, the first one being that the left bulb of lamp 0 is not lighting.

The event record queries are subsequently used by the search module 118 in a matching process whereby an event record is retrieved from the error log database 168 whenever it matches all the defined values within an event record query.

The foregoing discussion of the invention has been presented for purposes of illustration and description. Furthermore, the description is not intended to limit the invention to the form disclosed herein. Consequently, variation and modification commensurate with the above teachings, within the skill and knowledge of the relevant art are within the scope of the present invention. The embodiment described hereinabove is further intended to explain the best mode presently known of practicing the invention and to enable others skilled in the art to utilize the invention as such, or in other embodiments, and with various modification required by their particular application or uses of the invention. It is intended that the appended claims be construed to include alternative embodiments to the extent permitted by the prior art.

APPENDIX A

```
:- public uf_search_backward/1:far.
:- visible uf_search_backward/1.
/*                                                                   */
/*    2. Each filter in the list is processed, because there  may    */
/*  be more than one filter and the format of  the  file  is  the    */
/*   "EVENT" format.                                                 */
/*                                                                   */
uf_search_backward(ILfilters) :-
   member(event([x0A]),ILfilters),
   uf_search_backward(x0A,ILfilters).
/*                                                                   */
/*    1. The results of the search are returned, because the format  */
/*  of the file is the "EVENT" format  and  the  file  object  is    */
/*  retrieved from the database and the handle of the file  object   */
/*  tis used to search the file.  Also, the results of the  search   */
/*  are converted into a list of facts and the sequence number  of   */
/*  the event is used to update the file object.                     */
/*                                                                   */
uf_search_backward(ILfilters) :-
   rfs_SearchFacts(is_validated,ILfilters),
   dio_EventLog(filter(ILfilters),_Lfi1),
   dio_EventLog(seek_read(backward,_T1),_Lfi2),
   ee_interpret(_T1,_Lresults),
   is_updated_with(bbs_db,primary:_Lresults),
   [! recorda(udf_db,_Lresults,_) !].

:- public uf_search_backward/2:far.
:- visible uf_search_backward/2.
/*                                                                   */
/*    1. The results of the search are returned, because the format  */
/*  of the file is the "EVENT"  format  and  the  file  object  is   */
/*  retrieved from the database and the handle of the file  object   */
/*  tis used to search the file.  Also, the results of the  search   */
/*  are converted into a list of facts and the sequence number  of   */
/*  the event is used to update the file object.                     */
/*                                                                   */
uf_search_backward(x0A,ILfilters) :-
   rfs_SearchFacts(is_validated,ILfilters),
   dio_EventLog(filter(ILfilters),_Lfi1),
   dio_EventLog(seek_for_read(backward,x0A,_T1),_Lfi2),
   ee_interpret(_T1,_L1),
   is_updated_with(bbs_db,primary:_L1),
   [! recorda(udf_db,_L1,_) !].

:- public uf_search_forward/1:far.
:- visible uf_search_forward/1.
/*                                                                   */
/*    2. Each filter in the list is processed, because there  may    */
/*  be more than one filter and the format of  the  file  is  the    */
/*  "EVENT" format.                                                  */
/*                                                                   */
uf_search_forward(ILfilters) :-
   member(event([x0A]),ILfilters),
   uf_search_forward(x0A,ILfilters).
/*                                                                   */
/*    1. The results of the search are returned, because the format  */
/*  of the file is the "EVENT"  format  and  the  file  object  is   */
/*  retrieved from the database and the handle of the file  object   */
/*  tis used to search the file.  Also, the results of the  search   */
/*  are converted into a list of facts and the sequence number  of   */
/*  the event is used to update the file object.                     */
/*                                                                   */
uf_search_forward(ILfilters) :-
   rfs_SearchFacts(is_validated,ILfilters),
```

APPENDIX A

```
   dio_EventLog(filter(ILfilters),_Lfi1),
   dio_EventLog(seek_read(foreward,_T1),_Lfi2),
   ee_interpret(_T1,_Lresults),
   is_updated_with(bbs_db,primary:_Lresults),
   [! recorda(udf_db,_Lresults,_) !].

:- public uf_search_forward/2:far.
:- visible uf_search_forward/2.
/*                                                              */
/*  1. The results of the search are returned, because the format */
/*  of the file is the "EVENT" format and the file object is   */
/*  retrieved from the database and the handle of the file object */
/*  tis used to search the file. Also, the results of the search */
/*  are converted into a list of facts and the sequence number of */
/*  the event is used to update the file object.              */
/*                                                              */
uf_search_forward(x0A,ILfilters) :-
   rfs_SearchFacts(is_validated,ILfilters),
   dio_EventLog(filter(ILfilters),_Lfi1),
   dio_EventLog(seek_for_read(foreward,x0A,_T1),_Lfi2),
   ee_interpret(_T1,_L1),
   is_updated_with(bbs_db,primary:_L1),
   [! recorda(udf_db,_L1,_) !].

:- public uf_report/1:far.
:- visible uf_report/1.
/*                                                              */
/*  1. A successful response is returned, because a new file    */
/*  object was constructed and the information passed was recored */
/*  without any problems and the MIM header was updated without */
/*  any problems.                                               */
/*                                                              */
uf_report(ILtext) :-
   rfs_ReportFacts(is_validated,ILtext),
   recorded(cla_ELAParameter,_L1,_),
   member(-1:_Ncsn,_L1),
   dio_ReportFile(open_for(problem:_Ncsn),_Lfi2),
   dio_ReportFile(format_write(ILtext),_Lfi2),
   dio_ReportFile(close,_Lfi2),
   !.
```

APPENDIX B

```
/********************* START OF  PROLOGUE  *********************/
/*                                                              */
/* FUNCTION NAME:    ee_interpret(+T,?L)                        */
/*                                                              */
/* FUNCTION TITLE:  the Event Entry interpretation predicate.   */
/*                                                              */
/* FUNCTIONAL DESCRIPTION:                                      */
/* This predicate interprets each binary event entry  element to*/
/* it's symbolic form.                                          */
/*                                                              */
/* OPERATIONAL DESCRIPTION:                                     */
/*   1. The list of facts for a type 1 event is returned, because*/
/* the elements of the type 1 event entry could be translated.  */
/*   2. The list of facts for a type 9 event is returned, because*/
/* the elements of the type 9 event entry could be translated.  */
/*   3. The list of facts for a type A event is returned, because*/
/* the elements of the type A event entry could be translated.  */
/*   4. The list of facts for an event is returned, because the */
/* elements of the event entry could be translated and converted.*/
/*                                                              */
/*--------------------------------------------------------------*/
/*                                                              */
/*    +==================+                                      */
/*    | ee_interpret / 2 |                                      */
/*    +==================+                                      */
/*           |                                                  */
/*           |      +====================================+      */
/*         (*)->-| eep_SequenceNumber # is_interpretted_from |  */
/*           |      +====================================+      */
/*           |      +====================================+      */
/*         (*)->-| eep_Event # is_interpretted_from |          */
/*           |      +====================================+      */
/*           |      +====================================+      */
/*         (*)->-| eep_Device # is_interpretted_from |         */
/*           |      +====================================+      */
/*           |      +====================================+      */
/*         (*)->-| eep_LMUResponseCode # is_interpretted_from | */
/*           |      +====================================+      */
/*           |      +====================================+      */
/*         (*)->-| eep_DateTime # is_interpretted_from |       */
/*           |      +====================================+      */
/*           |      +=========================================+ */
/*         (*)->-| eep_ProductFamilyCode # is_interpretted_from | */
/*           |      +=========================================+ */
/*           |      +------------------+                         */
/*         (*)->-| ee_interpret / 3 |                            */
/*                  +------------------+                         */
/*    +==================+                                      */
/*    | ee_interpret / 2 |                                      */
/*    +==================+                                      */
/*           |                                                  */
/*           |      +====================================+      */
/*         (*)->-| eep_SequenceNumber # is_interpretted_from | */
/*           |      +====================================+      */
/*           |      +====================================+      */
/*         (*)->-| eep_Event # is_interpretted_from |          */
/*           |      +====================================+      */
/*           |      +====================================+      */
/*         (*)->-| eep_Device # is_interpretted_from |         */
/*           |      +====================================+      */
/*           |      +====================================+      */
/*         (*)->-| eep_DateTime # is_interpretted_from |       */
/*           |      +====================================+      */
/*           |      +=========================================+ */
```

APPENDIX B

```
/*         (*)->-| eep_ProductFamilyCode # is_interpretted_from |     */
/*            |      +=======================================+        */
/*            |      +-------------------+                             */
/*         (*)->-| ee_interpret / 3 |                                  */
/*            |      +-------------------+                             */
/*     +=================+                                             */
/*     | ee_interpret / 2 |                                            */
/*     +=================+                                             */
/*            |                                                        */
/*            |      +=======================================+         */
/*         (*)->-| eep_SequenceNumber # is_interpretted_from |        */
/*            |      +=======================================+        */
/*            |      +=======================================+        */
/*         (*)->-| eep_Event # is_interpretted_from |                  */
/*            |      +=======================================+        */
/*            |      +=======================================+        */
/*         (*)->-| eep_Device # is_interpretted_from |                 */
/*            |      +=======================================+        */
/*            |      +=======================================+        */
/*         (*)->-| eep_FaultSymptomCode # is_interpretted_from |       */
/*            |      +=======================================+        */
/*            |      +=======================================+        */
/*         (*)->-| eep_DateTime # is_interpretted_from |               */
/*            |      +=======================================+        */
/*            |      +=======================================+        */
/*         (*)->-| eep_ProductFamilyCode # is_interpretted_from |     */
/*            |      +=======================================+        */
/*            |      +-------------------+                             */
/*         (*)->-| ee_interpret / 3 |                                  */
/*            |      +-------------------+                             */
/*                                                                     */
/*                                                                     */
/************************   END OF PROLOGUE   **********************/
:- public ee_interpret/2:far.
:- visible ee_interpret/2.
/*                                                                     */
/*  1. The list of facts for a type 1 event is returned, because       */
/*  the elements of the type 1 event entry could be translated.        */
/*                                                                     */
ee_interpret(entry( event(1), ITdt, ITes, ITtod,
                    ITfsc, ITpfc, ITswr, data(INesn,ITeer) ),
             [OTet, OTdt, OTlrc, OTtod, OTesn,
              OTpfn|OLentry]  ) :- eep_SequenceNumber(is_interpretted_from(INesn),OTesn),
  eep_Event(is_interpretted_from(event(1)),OTet),
  eep_Device(is_interpretted_from(ITdt),OTdt),
  eep_LMUResponseCode(is_interpretted_from(ITfsc),OTlrc),
  eep_DateTime(is_interpretted_from(ITtod),OTtod),
  eep_ProductFamilyCode(is_interpretted_from(ITpfc),OTpfn),
  ee_interpret(event(1),ITeer,OLentry),
  !.
/*                                                                     */
/*  2. The list of facts for a type 9 event is returned, because       */
/*  the elements of the type 9 event entry could be translated.        */
/*                                                                     */
ee_interpret(entry( event(9), ITdt, ITes, ITtod,
                    ITfsc, ITpfc, ITswr, data(INesn,ITeer) ),
             [OTet, OTdt, OTtod, OTesn,
              OTpfn|OLentry]  ) :- eep_SequenceNumber(is_interpretted_from(INesn),OTesn),
  eep_Event(is_interpretted_from(event(9)),OTet),
  eep_Device(is_interpretted_from(ITdt),OTdt),
```

APPENDIX B

```
%   eep_FaultSymptomCode(is_interpretted_from(ITfsc),OTfsc),
    eep_DateTime(is_interpretted_from(ITtod),OTtod),
    eep_ProductFamilyCode(is_interpretted_from(ITpfc),OTpfn),
    ee_interpret(event(9),ITeer,OLentry),
    !.
/*                                                              */
/*  3. The list of facts for a type A event is returned, because */
/*  the elements of the type A event entry could be translated.  */
/*                                                              */
ee_interpret(entry( event(10), ITdt, ITes, ITtod,
                ITfsc, ITpfc, ITswr, data(INesn,ITeer) ),
            [OTet, OTdt, OTtod, OTesn,
             OTpfn|OLentry]    ) :- eep_SequenceNumber(is_interpretted_from(INesn),OTesn),
    eep_Event(is_interpretted_from(event(10)),OTet),
    eep_Device(is_interpretted_from(ITdt),OTdt),
%   eep_FaultSymptomCode(is_interpretted_from(ITfsc),OTfsc),
    eep_DateTime(is_interpretted_from(ITtod),OTtod),
    eep_ProductFamilyCode(is_interpretted_from(ITpfc),OTpfn),
    ee_interpret(event(10),ITeer,OLentry),
    !.
/*                                                              */
/*  4. The list of facts for an event is returned, because the  */
/*  elements of the event entry could be translated and converted. */
/*                                                              */
ee_interpret(entry( ITet, ITdt, ITes, ITtod,
                ITfsc, ITpfc, ITswr, data(INesn,ITeer) ),
            [OTet, OTdt, OTfsc, OTtod, OTesn,
             OTpfn|OLentry]    ) :- eep_SequenceNumber(is_interpretted_from(INesn),OTesn),
    eep_Event(is_interpretted_from(ITet),OTet),
    eep_Device(is_interpretted_from(ITdt),OTdt),
    eep_FaultSymptomCode(is_interpretted_from(ITfsc),OTfsc),
    eep_DateTime(is_interpretted_from(ITtod),OTtod),
    eep_ProductFamilyCode(is_interpretted_from(ITpfc),OTpfn),
    ee_interpret(ITet,ITeer,OLentry),
    !.

/*********************** START OF  PROLOGUE ********************/
/*                                                              */
/* FUNCTION NAME:   ee_interpret(+T,+T,?L)                      */
/*                                                              */
/* FUNCTION TITLE:  the Event Entry Date interpretation predicate */
/*                                                              */
/* FUNCTIONAL DESCRIPTION:                                      */
/* This predicate interprets each binary event entry date element */
/* to it's symbolic form.                                       */
/*                                                              */
/* OPERATIONAL DESCRIPTION:                                     */
/*   1. The list of facts for a type 1 event is returned, because */
/*   the host sequence number is found and translated.          */
/*   2. An empty list of facts for a type 5 event is returned,  */
/*   because there is no need to translate the remaining elements. */
/*   3. The list of facts for a type 9 event is returned, because */
/*   the host sequence number and the lsm ending status are found */
/*   and translated.                                            */
/*   4. The list of facts for a type A event is returned, because */
/*   the host sequence number and the servo error response are  */
/*   found and translated.                                      */
/*   5. The list of facts for any other event is not returned,  */
/*   because we only recognize 1s, 5s, 9s, and As events.       */
/*                                                              */
```

APPENDIX B

```
/*-------------------------------------------------------------------*/
/*                                                                   */
/*     +------------------+                                          */
/*     | ee_interpret / 3 |                                          */
/*     +------------------+                                          */
/*     +------------------+                                          */
/*     | ee_interpret / 3 |                                          */
/*     +------------------+                                          */
/*              |                                                    */
/*              |    +=========================================+     */
/*          (*)->-| eep_LSMEndingStatus # is_interpretted_from |     */
/*              |    +=========================================+     */
/*     +------------------+                                          */
/*     | ee_interpret / 3 |                                          */
/*     +------------------+                                          */
/*              |                                                    */
/*              |    +=========================================+     */
/*          (*)->-| eep_ServoErrorResponseList #               |     */
/*              |                       is_interpretted_from   |     */
/*              |    +=========================================+     */
/*     +------------------+                                          */
/*     | ee_interpret / 3 |                                          */
/*     +------------------+                                          */
/*                                                                   */
/*                                                                   */
/*********************   END OF PROLOGUE   **********************/
:- public ee_interpret/3:far.
%% :- visible ee_interpret/3.
/*                                                                   */
/*   1. The list of facts for a type 1 event is returned, because    */
/*   the host sequence number is found and translated.               */
/*                                                                   */
ee_interpret(event(1),ITeer,[ hsn([_Nhsn]) ]) :-
    ITeer =.. [led,_Nhsn|_].
/*                                                                   */
/*   2. An empty list of facts for a type 5 event is returned,       */
/*   because there is no need to translate the remaining elements.   */
/*                                                                   */
ee_interpret(event(5),ITeer,[]).
/*                                                                   */
/*   3. The list of facts for a type 9 event is returned, because    */
/*   the host sequence number and the lsm ending status are found    */
/*   and translated.                                                 */
/*                                                                   */
ee_interpret(event(9),ITeer,[ hsn([_Nhsn]), OAles ]) :-
    ITeer =.. [led,_Nhsn,_Nert,_Terd],
    eep_LSMEndingStatus(is_interpretted_from(_Terd),OAles),
    !.
/*                                                                   */
/*   4. The list of facts for a type A event is returned, because    */
/*   the host sequence number and the servo error response are       */
/*   found and translated.                                           */
/*                                                                   */
ee_interpret(event(10),ITeer,[ hsn([_Nhsn])|OLser ]) :-
    ITeer =.. [led,_Nhsn|_Lerd],
    eep_ServoErrorResponseList(is_interpretted_from(_Lerd),OLser),
    !.
/*                                                                   */
/*   5. The list of facts for any other event is not returned,       */
/*   because we only recognize 1s, 5s, 9s, and As events.            */
/*                                                                   */
ee_interpret(event(_),ITeer,[]) :-
    !.
```

APPENDIX C

```
/*********************** START OF PROLOGUE ********************/
/*                                                              */
/*  FUNCTION NAME:    eep_Device(+A,?L)                         */
/*                    eep_Device(+T,?L)                         */
/*                                                              */
/*  FUNCTION TITLE:   The Device object                         */
/*                                                              */
/*  FUNCTIONAL DESCRIPTION:                                     */
/*  The following functions can be preformed on this object.    */
/*  is_validated                                                */
/*  is_Englishized_to                                           */
/*  is_interpretted _from                                       */
/*                                                              */
/*  OPERATIONAL DESCRIPTION:                                    */
/*  The syntax/semantic of a Device                             */
/*  The interpretation of a Device                              */
/*  _                                                           */
/*                                                              */
/*------------------------------------------------------------- */
/*                                                              */
/*     +===========================+                            */
/*     | eep_Device # is_validated |                            */
/*     +===========================+                            */
/*     +===========================+                            */
/*     | eep_Device # is_validated |                            */
/*     +===========================+                            */
/*           |                                                  */
/*           |    +==================================+          */
/*           +->-| eep_Device # is_transcribed_from |           */
/*                +==================================+          */
/*     +==================================+                     */
/*     | eep_Device # is_interpretted_from |                    */
/*     +==================================+                     */
/*           |                                                  */
/*           |    +==================================+          */
/*           +->-| eep_Device # is_transcribed_from |           */
/*                +==================================+          */
/*                                                              */
/*                                                              */
/*********************** END OF PROLOGUE ********************/
:- public eep_Device/2:far.
:- visible eep_Device/2.
/*                                                              */
/*  The syntax/semantic of a Device                             */
/*                                                              */
eep_Device(is_validated,ILdvc) :-
    var(ILdvc),
    !.
eep_Device(is_validated,[ITdvc]) :-
    var(ITdvc), !.
eep_Device(is_validated,[IAdvc:INdvc]) :-
    ( var(IAdvc);
      eep_Device(is_transcribed_from(_),IAdvc:0) ),
    ( var(INdvc);
      integer(INdvc) ),
    !.
eep_Device(is_validated,[ITdvc]) :-
    dio_ConsoleFile(open,_Lcfil),
    dio_ConsoleFile(write([(ITdvc,$ Invalided syntax/semantics $)]),
                _Lcfil),
%   nl, write(ITdvc), write($ Invalided syntax/semantics $),
%   nl,
    !,
    fail.
```

APPENDIX C

```
/*                                                                    */
/*  The interpretation of a Device                                    */
/*                                                                    */
eep_Device(is_interpretted_from(device(INdvc)),device([OTdvc])) :-
    eep_Device(is_transcribed_from(INdvc),OTdvc).

/*********************   START OF  PROLOGUE  *********************/
/*                                                                    */
/*  FUNCTION NAME:    eep_ServoErrorResponseList(+A,?L)               */
/*                    eep_ServoErrorResponseList(+T,?L)               */
/*                                                                    */
/*  FUNCTION TITLE:  The Servo Error Response List object             */
/*                                                                    */
/*  FUNCTIONAL DESCRIPTION:                                           */
/*  The following functions can be preformed on this object.          */
/*  is_interpretted_from                                              */
/*  _                                                                 */
/*  _                                                                 */
/*                                                                    */
/*  OPERATIONAL DESCRIPTION:                                          */
/*  _                                                                 */
/*                                                                    */
/*--------------------------------------------------------------*/
/*                                                                    */
/*     +======================================================+       */
/*     | eep_ServoErrorResponseList # is_interpretted_from |          */
/*     +======================================================+       */
/*     +======================================================+       */
/*     | eep_ServoErrorResponseList # is_interpretted_from |          */
/*     +======================================================+       */
/*           |                                                        */
/*           |    +=========+                                         */
/*        (*)->-| for_all |                                           */
/*           |    +=========+                                         */
/*           |    +======================================================+  */
/*        (*)->-| eep_ServoErrorResponse # is_interpretted_from |          */
/*                +======================================================+  */
/*                                                                    */
/*                                                                    */
/*                                                                    */
/*********************    END OF  PROLOGUE   *********************/
:- public eep_ServoErrorResponseList/2:far.
:- visible eep_ServoErrorResponseList/2.
/*                                                                    */
/*   1. A list of servo errors is returned, because  one  of  the     */
/*   servo error responses can  be  translated  and  the  remaining   */
/*   servo error responses are converted.                             */
/*                                                                    */
eep_ServoErrorResponseList(is_interpretted_from([]),[]).
eep_ServoErrorResponseList(is_interpretted_from(ILser),OLser) :-
    for_all( _T1,
             ILser,
             ( eep_ServoErrorResponse(is_interpretted_from(_T1),_T2),
                 asserta('2=eep_ser=2'(_T2));
               true ) ),
    findall(_A1,'2=eep_ser=2'(_A1),OLser),
    retract_all('2=eep_ser=2'(_A1)),
    !.

/*********************   START OF  PROLOGUE  *********************/
/*                                                                    */
/*  FUNCTION NAME:   eep_ServoErrorResponse(+A,?L)                    */
```

APPENDIX C

```
/*                eep_ServoErrorResponse(+T,?L)                    */
/*                                                                 */
/* FUNCTION TITLE: The Servo Error Response object                 */
/*                                                                 */
/* FUNCTIONAL DESCRIPTION:                                         */
/* The following functions can be preformed on this object.        */
/* is_validated                                                    */
/* is_interpretted_from                                            */
/*                                                                 */
/* _                                                               */
/*                                                                 */
/* OPERA.IONAL DESCRIPTION:                                        */
/* The interpretation of the Servo Error Response.                 */
/* The syntax/semantic of a Servo Error Response.                  */
/*                                                                 */
/* _                                                               */
/*                                                                 */
/*-----------------------------------------------------------------*/
/*                                                                 */
/*    +=======================================+                    */
/*    | eep_ServoErrorResponse # is_validated |                    */
/*    +=======================================+                    */
/*    +=======================================+                    */
/*    | eep_ServoErrorResponse # is_validated |                    */
/*    +=======================================+                    */
/*         |                                                       */
/*         |     +================================+                */
/*      (*)->-|  eep_Mechanism # is_validated |                    */
/*         |     +================================+                */
/*         |     +================================+                */
/*      (*)->-|  eep_Error # is_validated |                        */
/*            +================================+                   */
/*    +============================================+               */
/*    | eep_ServoErrorResponse # is_interpretted_from |            */
/*    +============================================+               */
/*         |                                                       */
/*         |     +====================================+            */
/*      (*)->-|  eep_Mechanism # is_transcribed_from |             */
/*         |     +====================================+            */
/*         |     +====================================+            */
/*      (*)->-|  eep_Error # is_transcribed_from |                 */
/*            +====================================+               */
/*                                                                 */
/*                                                                 */
/*                                                                 */
/********************  END OF  PROLOGUE  ********************/
:- public eep_ServoErrorResponse/2:far.
:- visible eep_ServoErrorResponse/2.
/*                                                                 */
/*    The interpretation of the Servo Error Response.              */
/*                                                                 */
eep_ServoErrorResponse(is_interpretted_from(e(INmch,INlvl,INerr)),
                      ser([OTmch,level:INlvl,error:OAerr])) :-
   eep_Mechanism(is_transcribed_from(INmch),OTmch),
   eep_Error(is_transcribed_from(INerr),OAerr).
eep_ServoErrorResponse(is_written_to(ITfh),
                      ser([ITmch,ITlvl,error:IAerr])) :-
   eep_Mechanism(is_written_to(ITfh),ITmch),
   eep_Error(is_written_to(ITfh),IAerr).
/*                                                                 */
/*    The syntax/semantic of a Servo Error Response.               */
/*                                                                 */
eep_ServoErrorResponse(is_validated,ILser) :-
   var(ILser),
   !.
eep_ServoErrorResponse(is_validated,[ITmch,ITlvl,ITerr]) :-
```

APPENDIX C

```
    eep_Mechanism(is_validated,[ITmch]),
  ( var(ITlvl);
    ITlvl = level:_N1,
        ( var(_N1);
            integer(_N1) ) ),
  ( var(ITerr);
    ITerr = error:_A1,
        eep_Error(is_validated,_A1) ),
  !.

/********************  START OF  PROLOGUE  ********************/
/*                                                             */
/* FUNCTION NAME:   eep_Mechanism                              */
/*                                                             */
/* FUNCTION TITLE:  Teh Mechanism object                       */
/*                                                             */
/* FUNCTIONAL DESCRIPTION:                                     */
/* The following functions can be preformed on this object.    */
/* is_validated                                                */
/* is_interpretted_from                                        */
/*                                                             */
/* OPERATIONAL DESCRIPTION:                                    */
/*  _                                                          */
/*                                                             */
/*-----------------------------------------------------------*/
/*                                                             */
/*     +==============================+                        */
/*     | eep_Mechanism # is_validated |                        */
/*     +==============================+                        */
/*     +==============================+                        */
/*     | eep_Mechanism # is_validated |                        */
/*     +==============================+                        */
/*        |                                                    */
/*        |    +======================================+        */
/*        (*)->-| eep_Mechanism # is_transcribed_from |        */
/*             +======================================+        */
/*     +======================================+                */
/*     | eep_Mechanism # is_interpretted_from |                */
/*     +======================================+                */
/*        |                                                    */
/*        |    +======================================+        */
/*        (*)->-| eep_Mechanism # is_transcribed_from |        */
/*             +======================================+        */
/*                                                             */
/*                                                             */
/*                                                             */
/********************   END OF  PROLOGUE   ********************/
:- public eep_Mechanism/2:far.
:- visible eep_Mechanism/2.
/*                                                             */
/* The syntax/semantic of a Mechanism Element                  */
/*                                                             */
eep_Mechanism(is_validated,ILmch) :-
    var(ILmch),
    !.
eep_Mechanism(is_validated,[ITmch]) :-
    var(ITmch), !.
eep_Mechanism(is_validated,[IAmch:INmch]) :-
    ( var(IAmch);
      eep_Mechanism(is_transcribed_from(_),IAmch:_) ),
    ( var(INmch);
      integer(INmch) ),
    !.
```

APPENDIX C

```
eep_Mechanism(is_validated,[ITmch]) :-
    ( var(ITmch);
      eep_Mechanism(is_transcribed_from(_),ITmch) ),
    !.
/*                                                                    */
/* The interpretation of the Mechanism component.                     */
/*                                                                    */
eep_Mechanism(is_interpretted_from(INmch),
              mechanism([OTmch])) :-
    eep_Mechanism(is_transcribed_from(INmch),OTmch).

/********************** START OF PROLOGUE *********************/
/*                                                                    */
/* FUNCTION NAME:    eep_Error(+A,?L)                                 */
/*                   eep_Error(+T,?L)                                 */
/*                                                                    */
/* FUNCTION TITLE:   The Error object                                 */
/*                                                                    */
/* FUNCTIONAL DESCRIPTION:                                            */
/* The following functions can be preformed on this object.           */
/* is_validated                                                       */
/* is_interpretted_from                                               */
/*                                                                    */
/* OPERATIONAL DESCRIPTION:                                           */
/*  _                                                                 */
/*                                                                    */
/*--------------------------------------------------------------------*/
/*                                                                    */
/*    +==================================+                            */
/*    | eep_Error # is_interpretted_from |                            */
/*    +==================================+                            */
/*        |                                                           */
/*        |     +==================================+                  */
/*        (*)->-| eep_Error # is_transcribed_from  |                  */
/*              +==================================+                  */
/*    +===========================+                                   */
/*    | eep_Error # is_validated  |                                   */
/*    +===========================+                                   */
/*                                                                    */
/*                                                                    */
/*                                                                    */
/********************** END OF PROLOGUE *********************/
:- public eep_Error/2:far.
:- visible eep_Error/2.
/*                                                                    */
/* The syntax/semantic of an Error Element.                           */
/*                                                                    */
eep_Error(is_validated,OAfc) :-
    var(OAfc),
    !.
eep_Error(is_validated,OAfc) :-
    string_length(OAfc,5),
    integer_hexadecimal(_,OAfc),
    !.
/*                                                                    */
/* The interpretation of the Error Element.                           */
/*                                                                    */
eep_Error(is_interpretted_from(INfc),error:OAfc) :-
    eep_Error(is_transcribed_from(INfc),OAfc).
eep_Error(is_interpreted_from(INfc),error([OAfc])) :-
    eep_Error(is_transcribed_from(INfc),OAfc).
```

APPENDIX D

```
/********************* START OF PROLOGUE *********************/
/*                                                            */
/* FUNCTION NAME:   eep_Device(+A,?L)                         */
/*                  eep_Device(+T,?L)                         */
/*                                                            */
/* FUNCTION TITLE:  The Device object                         */
/*                                                            */
/* FUNCTIONAL DESCRIPTION:                                    */
/* The following functions can be preformed on this object.   */
/* is_tramscribed_from                                        */
/*                                                            */
/* OPERATIONAL DESCRIPTION:                                   */
/* The translation of a Device                                */
/* The English version of the Device phrase.                  */
/*                                                            */
/* _                                                          */
/*                                                            */
/*------------------------------------------------------------*/
/*                                                            */
/*   +==================================+                     */
/*   | eep_Device # is_transcribed_from |                     */
/*   +==================================+                     */
/*   +==================================+                     */
/*   | eep_Device # is_Englishized_to   |                     */
/*   +==================================+                     */
/*                                                            */
/*                                                            */
/********************* END OF PROLOGUE  **********************/
:- public eep_Device/2:far.
:- visible eep_Device/2.
/*                                                            */
/* The translation of a Device                                */
/*                                                            */
eep_Device(is_transcribed_from(16),lmu:0).
eep_Device(is_transcribed_from(17),lmu:1).
eep_Device(is_transcribed_from(INdvc),lsm:INdvc) :-
    INdvc >= 0, INdvc =< 15.
/*                                                            */
/* The English version of the Device phrase.                  */
/*                                                            */
eep_Device(is_Englishized_to($any device address $),ILdvc) :-
    ( var(ILdvc);
      ILdvc = [_Advc],
      var(_Advc) ),
    !.
eep_Device(is_Englishized_to(OAdvc),[IAdvc:IAadr]) :-
    not var(IAdvc),
    var(IAadr),
    string_term(_A11,IAdvc),
    concat([$any $,_A11,$ device $],OAdvc),
    !.
eep_Device(is_Englishized_to(OAdvc),[IAdvc:IAadr]) :-
    var(IAdvc),
    not var(IAadr),
    string_term(_A11,IAadr),
    concat([$any $,_A11,$ device $],OAdvc),
    !.
eep_Device(is_Englishized_to(OAdvc),[IAdvc:IAadr]) :-
    not var(IAdvc),
    not var(IAadr),
    string_term(_A11,IAdvc),
    string_term(_A12,IAadr),
    concat([$the $,_A12,$ $,_A11,$ device $],OAdvc),
    !.
```

APPENDIX D

```
/********************* START OF  PROLOGUE  *********************/
/*                                                              */
/*   FUNCTION NAME:    eep_ServoErrorResponse(+A,?L)             */
/*                     eep_ServoErrorResponse(+T,?L)             */
/*                                                              */
/*   FUNCTION TITLE:   The Servo Error Response object          */
/*                                                              */
/*   FUNCTIONAL DESCRIPTION:                                    */
/*   The following functions can be preformed on this object.   */
/*   is_Englishized_to                                          */
/*   -                                                          */
/*                                                              */
/*   OPERATIONAL DESCRIPTION:                                   */
/*   The English version of the Servo Error Response phrase.    */
/*   -                                                          */
/*                                                              */
/*--------------------------------------------------------------*/
/*                                                              */
/*      +===============================================+       */
/*      | eep_ServoErrorResponse # is_Englishized_to |          */
/*      +===============================================+       */
/*              |                                               */
/*              |    +====================================+     */
/*         (*)->-| eep_Mechanism # is_Englishized_to |          */
/*              +====================================+          */
/*                                                              */
/*                                                              */
/*                                                              */
/********************* END OF  PROLOGUE  *********************/
:- public eep_ServoErrorResponse/2:far.
:- visible eep_ServoErrorResponse/2.
/*                                                              */
/*  The English version of the Servo Error Response phrase.     */
/*                                                              */
eep_ServoErrorResponse(is_Englishized_to($any servo error $),
                    ILser) :-
    ( var(ILser);
      ILser = [_Asem,_Asel,_Asee],
         var(_Asem),
         var(_Asel),
         var(_Asee) ),
    !.
eep_ServoErrorResponse(is_Englishized_to(OAser),
                    [IAsem,IAsll:IAslv,IAsel:IAsev]) :-
    eep_Mechanism(is_Englishized_to(_A11),[IAsem]),
    ( var(IAslv),
         _A12 = $any level$;
      string_term(_A22,IAslv),
         concat([$level $,_A22],_A12) ),
    ( var(IAsev),
         _A13 = $any error$;
      string_term(_A23,IAsev),
         concat([$error $,_A23],_A13) ),
    concat([_A11,$ at $,_A12,$ with $,_A13,$ $],OAser),
    !.

/********************* START OF  PROLOGUE  *********************/
/*                                                              */
/*   FUNCTION NAME:    eep_Mechanism                            */
/*                                                              */
/*   FUNCTION TITLE:   Teh Mechanism object                     */
/*                                                              */
/*   FUNCTIONAL DESCRIPTION:                                    */
```

APPENDIX D

```
/* The following functions can be preformed on this object.   */
/* is_transcribed_from                                         */
/* is_Englishized_to                                           */
/*                                                             */
/* OPERATIONAL DESCRIPTION:                                    */
/*                                                             */
/*                                                             */
/*-----------------------------------------------------------*/
/*                                                             */
/*    +======================================                  */
/*    | eep_Mechanism # is_transcribed_from |                  */
/*    +=====================================+                  */
/*    +=====================================+                  */
/*    | eep_Mechanism # is_Englishized_to |                    */
/*    +===================================+                    */
/*                                                             */
/*                                                             */
/*                                                             */
/*********************   END OF  PROLOGUE   *********************/
:- public eep_Mechanism/2:far.
:- visible eep_Mechanism/2.
/*                                                             */
/* The transcription of the Mechanism component.               */
/*                                                             */
eep_Mechanism(is_transcribed_from(10),ptp:1).
eep_Mechanism(is_transcribed_from(9),ptp:0).
eep_Mechanism(is_transcribed_from(21),hand:1).
eep_Mechanism(is_transcribed_from(20),hand:0).
eep_Mechanism(is_transcribed_from(19),arm).
eep_Mechanism(is_transcribed_from(18),door:cap).
eep_Mechanism(is_transcribed_from(17),door:access).
eep_Mechanism(is_transcribed_from(16),right_lamp:1).
eep_Mechanism(is_transcribed_from(15),left_lamp:1).
eep_Mechanism(is_transcribed_from(14),right_lamp:0).
eep_Mechanism(is_transcribed_from(13),left_lamp:0).
eep_Mechanism(is_transcribed_from(12),camera:1).
eep_Mechanism(is_transcribed_from(11),camera:0).
eep_Mechanism(is_transcribed_from(10),master_ptp:1).
eep_Mechanism(is_transcribed_from(9),master_ptp:0).
eep_Mechanism(is_transcribed_from(8),reach:1).
eep_Mechanism(is_transcribed_from(7),reach:0).
eep_Mechanism(is_transcribed_from(6),roll:1).
eep_Mechanism(is_transcribed_from(5),roll:0).
eep_Mechanism(is_transcribed_from(4),wrist).
eep_Mechanism(is_transcribed_from(3),z).
eep_Mechanism(is_transcribed_from(2),theta).
eep_Mechanism(is_transcribed_from(1),finger:1).
eep_Mechanism(is_transcribed_from(0),finger:0).
/*                                                             */
/* The English version of the Mechanism phrase.                */
/*                                                             */
eep_Mechanism(is_Englishized_to($any mechanism $),ILmch) :-
    ( var(ILmch);
      ILmch = [_Amch],
      var(_Amch) ),
    !.
eep_Mechanism(is_Englishized_to(OAmch),[ITmch]) :-
    not var(ITmch),
    string_term(_All,ITmch),
    concat([$the $,_All,$ mechanism $],OAmch),
    !.

/*********************   START OF  PROLOGUE   *********************/
```

APPENDIX D

```
/*                                                                    */
/*   FUNCTION NAME:    eep_Error(+A,?L)                                */
/*                     eep_Error(+T,?L)                                */
/*                                                                    */
/*   FUNCTION TITLE:   The Error object                                */
/*                                                                    */
/*   FUNCTIONAL DESCRIPTION:                                           */
/*   The following functions can be preformed on this object.          */
/*   is_transcribed_from                                               */
/*                                                                    */
/*   OPERATIONAL DESCRIPTION:                                          */
/*   _                                                                 */
/*                                                                    */
/*--------------------------------------------------------------------*/
/*                                                                    */
/*      +==================================+                           */
/*      | eep_Error # is_transcribed_from |                           */
/*      +==================================+                           */
/*                                                                    */
/*                                                                    */
/********************   END OF  PROLOGUE   ********************/
:- public eep_Error/2:far.
:- visible eep_Error/2.
/*                                                                    */
/*   The translation of an Error Element.                              */
/*                                                                    */
eep_Error(is_transcribed_from(INfc),OAfc) :-
   integer_hexadecimal(INfc,OAfc),
   string_length(OAfc,5).
eep_Error(is_transcribed_from(INfc),OAfc) :-
   integer_hexadecimal(INfc,_Afc),
   name(_Afc,[_A1|_L1]),
   name(OAfc,[_A1,48,48|_L1]),
   string_length(OAfc,5).
```

APPENDIX E

```
/********************** START OF  PROLOGUE  *********************/
/*                                                              */
/*  FUNCTION NAME:    dio_EventLog(+A,?L)                       */
/*                    dio_EventLog(+T,?L)                       */
/*                                                              */
/*  FUNCTION TITLE:  Event Log file object.                     */
/*                                                              */
/*  FUNCTIONAL DESCRIPTION:                                     */
/*  The following functions can be performed by the MIMHeader   */
/*  object.                                                     */
/*  open_for (a specific product),                              */
/*  close                                                       */
/*  change                                                      */
/*  seek_read                                                   */
/*  seek_for_read                                               */
/*  seek_for                                                    */
/*  filter                                                      */
/*  erase_all                                                   */
/*                                                              */
/*  OPERATIONAL DESCRIPTION:                                    */
/*  The file information is returned, because the file is  already */
/*  opened for the specific problem.                            */
/*  The file information is returned, because the  problem  number */
/*  is used to construct an file path name and the file  was  open */
/*  _successfully.                                              */
/*  However, if an error occred, nothing is returned and an  error */
/*  message is displayed.                                       */
/*  The file is closed, because the file information exist and the */
/*  file was closed sucessfully and all remaining  information  of */
/*  the file is erased.                                         */
/*   3. A successful response is returned, because  the  attribute */
/*  of the event log object is used to construct a  new  attribute */
/*  list and the new attribute list was saved without any problems. */
/*   4. A failing response is returned, because  backtracking  has */
/*  begun and the new objects have to be undone.                */
/*  The event log seeks and reads the  event  entry,  because  the */
/*  event log is opened and the event log search is successful and */
/*  the event log position update is successful.                */
/*  The event log seeks for a type x0A event and  reads  the  type */
/*  x0A event entry, because the first occurance of the  type  x0A */
/*  event data is found and other type x0A event data is found and */
/*  the type event data is expanded to the event entry.         */
/*  The event log seeks forward for a type x0A event, because  the */
/*  event log is opened and each following event  entry  is  read, */
/*  until a non type x0A event is read.                         */
/*  The event log seeks backwards for a type  x0A  event,  because */
/*  the event log is opened and each previous event entry is read, */
/*  until a non type x0A event is read.                         */
/*  The event log is filtered by the Filter Element List,  because */
/*  the event log is opened and the Filter Element List is set for */
/*  the event log.                                              */
/*  The event log file information is erased, because  each  event */
/*  log change is erased.                                       */
/*                                                              */
/*     +==========================+                             */
/*     | dio_EventLog  # open_for |                             */
/*     +==========================+                             */
/*           |                                                  */
/*           |     +========+                                   */
/*         (*)->-| member |                                     */
/*               +========+                                     */
/*     +==========================+                             */
/*     | dio_EventLog  # open_for |                             */
```

APPENDIX E

```
/*      +=========================+                                        */
/*      |                         |                                        */
/*      |         +========+                                               */
/*      (*)->-| member |                                                   */
/*      |         +========+                                               */
/*      |         +----------+                                             */
/*      (*)->-| za_open |                                                  */
/*      |         +----------+                                             */
/*   +===========================+                                         */
/*   | dio_EventLog  # open_for |                                          */
/*   +===========================+                                         */
/*      |                                                                  */
/*      |         +===========================+                            */
/*      (*)->-| wio_StatusWindow # write |                                 */
/*      |         +===========================+                            */
/*   +========================+                                            */
/*   | dio_EventLog  # close |                                             */
/*   +========================+                                            */
/*      |                                                                  */
/*      |         +----------+                                             */
/*      (*)->-| za_close |                                                 */
/*      |         +----------+                                             */
/*      |         +===========================+                            */
/*      (*)->-| dio_EventLog  # erase_all |                                */
/*      |         +===========================+                            */
/*   +=========================+                                           */
/*   | dio_EventLog  # change |                                            */
/*   +=========================+                                           */
/*      |                                                                  */
/*      |         +-------------+                                          */
/*      (*)->-| dio_change |                                               */
/*      |         +-------------+                                          */
/*   +=========================+                                           */
/*   | dio_EventLog  # change |                                            */
/*   +=========================+                                           */
/*      |                                                                  */
/*      |         +----------+                                             */
/*      (*)->-| za_srch |                                                  */
/*      |         +----------+                                             */
/*   +============================+                                        */
/*   | dio_EventLog  # seek_read |                                         */
/*   +============================+                                        */
/*      |                                                                  */
/*      |         +----------+                                             */
/*      (*)->-| za_srch |                                                  */
/*      |         +----------+                                             */
/*      |         +========================+                               */
/*      (*)->-| dio_EventLog # change |                                    */
/*      |         +========================+                               */
/*   +================================+                                    */
/*   | dio_EventLog  # seek_for_read |                                     */
/*   +================================+                                    */
/*      |                                                                  */
/*      |         +===========================+                            */
/*      (*)->-| dio_EventLog # seek_read |                                 */
/*      |         +===========================+                            */
/*      |         +===========================+                            */
/*      (*)->-| dio_EventLog # seek_for |                                  */
/*      |         +===========================+                            */
/*      |         +========================================+               */
/*      (*)->-| dio_EventLogEntry # verify_for_retain |                    */
/*      |         +========================================+               */
/*      |         +================================+                      */
/*      (*)->-| dio_EventLogEntry # expand_to |                            */
```

APPENDIX E

```
/*               +===============================+                    */
/*       +=============================+                               */
/*       | dio_EventLog  # seek_for    |                               */
/*       +=============================+                               */
/*            |                                                        */
/*            |      +===============================+                 */
/*         (*)->-| dio_EventLog # seek_read          |                 */
/*            |      +===============================+                 */
/*            |      +=============================================+   */
/*         (*)->-| dio_EventLogEntry # verify_for_retain           |   */
/*            |      +=============================================+   */
/*       +=============================+                               */
/*       | dio_EventLog  # filter      |                               */
/*       +=============================+                               */
/*            |                                                        */
/*            |      +======================================+          */
/*         (*)->-| dio_FilterElementList # is_set_for       |          */
/*                   +======================================+          */
/*       +=============================+                               */
/*       | dio_EventLog  # erase_all   |                               */
/*       +=============================+                               */
/*                                                                     */
/*                                                                     */
/*                                                                     */
/********************  END OF  PROLOGUE   **********************/
:- public dio_EventLog/2:far.
:- visible dio_EventLog/2.
/*                                                                     */
/* The file information is returned, because the file is  already      */
/* opened for the specific problem.                                    */
/*                                                                     */
dio_EventLog(open_for(problem:INcsn),[ITfi|ILfi]) :-
    fileerrors(_,off),
    recorded(dio_EventLog,[ITfi|ILfi],_),
    member(status:open_read_only,[ITfi|ILfi]),
    !.
/*                                                                     */
/* The file information is returned, because the  problem  number      */
/* is used to construct an file path name and the file  was  open      */
/* successfully.                                                       */
/*                                                                     */
dio_EventLog(open_for(problem:INcsn),[ITfi|ILfi]) :-
    fileerrors(_,off),
    concat([INcsn,$.evt$],_Afpn),
    [! member(name:_Afpn,[ITfi|ILfi]),
    member(handle:_Nfhi,[ITfi|ILfi]) !],
    za_open(_Afpn,_Nfhi),
    member(status:open_read_only,[ITfi|ILfi]),
    member(position:1,[ITfi|ILfi]),
    recorda(dio_EventLog,[ITfi|ILfi],_),
    !.
/*                                                                     */
/* However, if an error occred, nothing is returned and an  error      */
/* message is displayed.                                               */
/*                                                                     */
dio_EventLog(open_for(_),[ITfi|ILfi]) :-
    fileerrors(_,off),
%%  wio_StatusWindow(write([$ELA can not open the Event Log file$]),
%%                  _),
    dio_ConsoleFile(open,_Lfi1),
    dio_ConsoleFile(write([$ELA can not open the Event Log file$]),
                    _Lfi1),
    !,
    fail.
```

APPENDIX E

```
/*                                                                  */
/* The file is closed, because the file information exist and the   */
/* file was closed sucessfully and all remaining  information  of   */
/* the file is erased.                                              */
/*                                                                  */
dio_EventLog(close,[ITfi|ILfi]) :-
    recorded(dio_EventLog,[ITfi|ILfi],_Nr1),
    member(name:_Afpn,[ITfi|ILfi]),
    member(handle:_Nfhi,[ITfi|ILfi]),
    !,
    za_close(_Afpn,_Nfhi),
    erase(_Nr1),
    dio_EventLog(erase_all(name:_Afpn,handle:_Nfhi),_L1),
    !.
/*                                                                  */
/*   3. A successful response is returned, because  the  attribute  */
/*  of the event log object is used to construct a  new  attribute  */
/*  list and the new attribute list was saved without any problems. */
/*                                                                  */
dio_EventLog(change(IAfat:ITfav),[ITfi1|ILfi1]) :-
    dio_change(IAfat:ITfav,[ITfi1|ILfi1],[_Tfi2|_Lfi2]),
    recorda(dio_EventLog,[_Tfi2|_Lfi2],_).
/*                                                                  */
/*   4. A failing response is returned, because  backtracking  has  */
/*  begun and the new objects have to be undone.                    */
/*                                                                  */
dio_EventLog(change(IAfat:ITfav),[ITfi1|ILfi1]) :-
    recorded(dio_EventLog,[_Tfi|_Lfi],_Nr1),
    erase(_Nr1),
    member(handle:_Nfhi,[ITfi1|ILfi1]),
    member(position:_Nfp,[ITfi1|ILfi1]),
    !,
    za_srch(_Nfhi,_Nfp,_),
    !, fail.

/*                                                                  */
/* The event log seeks and reads the  event  entry,  because  the   */
/* event log is opened and the event log search is successful and   */
/* the event log position update is successful.                     */
/*                                                                  */
dio_EventLog(seek_read(IAfd,OTed),[ITfi1|ILfi1]) :-
    recorded(dio_EventLog,[_Tfi1|_Lfi1],_Nr1),
    member(handle:_Nfhi,[_Tfi1|_Lfi1]),
    !,
    za_srch(_Nfhi,IAfd,OTed),
    arg(8,OTed,data(_N1,_)),
    dio_EventLog(change(position:_N1),[_Tfi1|_Lfi1]).

/*                                                                  */
/* The event log seeks for a type x0A event and  reads  the  type   */
/* x0A event entry, because the first occurance of the  type  x0A   */
/* event data is found and other type x0A event data is found and   */
/* the type event data is expanded to the event entry.              */
/*                                                                  */
dio_EventLog(seek_for_read(IAfd,x0A,OTee),[ITfi1|ILfi1]) :-
    dio_EventLog(seek_read(IAfd,_T1),_Lfi1),
    dio_EventLog(seek_for(IAfd,x0A),_Lfi1),
    dio_EventLogEntry(verify_for_retain(_T1,x0A),_Lei1),
    dio_EventLogEntry(expand_to(_T1,OTee),_Lei1).
/*                                                                  */
/* The event log seeks forward for a type x0A event, because the    */
/* event log is opened and each following event  entry  is  read,   */
/* until a non type x0A event is read.                              */
/*                                                                  */
```

APPENDIX E

```
dio_EventLog(seek_for(foreward,x0A),[ITfi1|ILfi1]) :-
    recorded(dio_EventLog,[_Tfi1|_Lfi1],_Nr1),
    member(position:_Nfp,[_Tfi1|_Lfi1]),
    inc(_Nfp,_N1),
    ctr_set(31,_N1),
    repeat,
      ctr_inc(31,_N2),
      dio_EventLog(seek_read(_N2,_T1),_Lfi1),
      not dio_EventLogEntry(verify_for_retain(_T1,x0A),_Lei1),
    recorded(dio_EventLog,_,_Nr2),
    erase(_Nr2),
    !.
/*                                                            */
/* The event log seeks backwards for a type x0A event, because */
/* the event log is opened and each previous event entry is read, */
/* until a non type x0A event is read.                         */
/*                                                            */
dio_EventLog(seek_for(backward,x0A),[ITfi1|ILfi1]) :-
    recorded(dio_EventLog,[_Tfi1|_Lfi1],_Nr1),
    member(position:_Nfp,[_Tfi1|_Lfi1]),
    dec(_Nfp,_N1),
    ctr_set(31,_N1),
    repeat,
      ctr_dec(31,_N2),
      dio_EventLog(seek_read(_N2,_T1),_Lfi1),
      not dio_EventLogEntry(verify_for_retain(_T1,x0A),_Lei1),
    recorded(dio_EventLog,_,_Nr2),
    erase(_Nr2),
    !.

/*                                                            */
/* The event log is filtered by the Filter Element List, because */
/* the event log is opened and the Filter Element List is set for */
/* the event log.                                             */
/*                                                            */
dio_EventLog(filter(ILelf),[ITfi1|ILfi1]) :-
    recorded(dio_EventLog,[_Tfi1|_Lfi1],_Nr1),
    member(handle:_Nfhi,[_Tfi1|_Lfi1]),
    !,
    dio_FilterElementList(is_set_for(handle:_Nfhi),ILelf),
    !.

/*                                                            */
/* The event log file information is erased, because each event */
/* log change is erased.                                      */
/*                                                            */
dio_EventLog(erase_all(ITfpn,ITfhi),[ITfi1|ILfi1]) :-
    recorded(dio_EventLog,[ITfi1|ILfi1],_Nr1),
    [! member(ITfpn,[ITfi1|ILfi1]),
       member(ITfhi,[ITfi1|ILfi1]),
       erase(_Nr1)
       !],
    fail,
    !.
dio_EventLog(erase_all(ITfpn,ITfhi),[ITfi1|ILfi1]).

/*                                                            */
/* The event log file information is erased, because each event */
/* log change is erased.                                      */
/*                                                            */
dio_EventLog(find_read(fsc:IAfsc,OLtxt),[ITfi1|ILfi1]) :-
    recorded(dio_EventLog,[ITfi1|ILfi1],_Nr1),
    eep_Error(is_interpretted_from(_Nfsc),error:IAfsc),
    [! ( za_fsclookup(0,_Nfsc,_Ttxt),
```

APPENDIX E

```
            _Ttxt =.. [text|OLtxt];
        za_fsclookup(1,_Nfsc,_Ttxt),
            _Ttxt =.. [text|OLtxt];
        OLtxt = [$There is no English translation for this FSC.$] )
       !],
    !.
dio_EventLog(find_read(lrc:IAfsc,OLtxt),[ITfil|ILfil]) :-
    recorded(dio_EventLog,[ITfil|ILfil],_Nr1),
    eep_Error(is_interpretted_from(_Nfsc),error:IAfsc),
    [! ( za_fsclookup(2,_Nfsc,_Ttxt),
            _Ttxt =.. [text|OLtxt];
        OLtxt = [$There is no English translation for this LRC.$] )
       !],
    !.

/*********************** START OF  PROLOGUE  *********************/
/*                                                                */
/*  FUNCTION NAME:    dio_EventLogEntry(+A,?L)                    */
/*                    dio_EventLogEntry(+T,?L)                    */
/*                                                                */
/*  FUNCTION TITLE:  Event Log Entry object.                      */
/*                                                                */
/*  FUNCTIONAL DESCRIPTION:                                       */
/*  The following functions can be performed by the EventLogEntry */
/*  object.                                                       */
/*  verify_for_retain                                             */
/*  expand_to                                                     */
/*                                                                */
/*  OPERATIONAL DESCRIPTION:                                      */
/*  The Event Log Entry is verified for the  type  x0A  event and */
/*  is retained, because the event type of the entry is 10 and the*/
/*  entry data is retained.                                       */
/*  The Event Log E..ry is expanded to  an  event  entry, because */
/*  all previous entry data is retrieved and a new event entry is */
/*  constructed from the data given.                              */
/*                                                                */
/*     +========================================+                */
/*     | dio_EventLogEntry # verify_for_retain  |                 */
/*     +========================================+                */
/*          |                                                     */
/*          |   +==========================+                      */
/*         (*)->-| dio_EntryData # retain  |                      */
/*              +==========================+                      */
/*     +================================+                         */
/*     | dio_EventLogEntry # expand_to  |                         */
/*     +================================+                         */
/*          |                                                     */
/*          |   +=========+                                       */
/*         (*)->-| findall |                                      */
/*          |   +=========+                                       */
/*          |   +=============+                                   */
/*         (*)->-| retract_all |                                  */
/*              +=============+                                   */
/*                                                                */
/*                                                                */
/*                                                                */
/*********************** END OF  PROLOGUE  *********************/
:- public dio_EventLogEntry/2:far.
:- visible dio_EventLogEntry/2.
/*                                                                */
/*  The Event Log Entry is verified for the  type  x0A  event and */
/*  is retained, because the event type of the entry is 10 and the*/
/*  entry data is retained.                                       */
/*                                                                */
```

APPENDIX E

```
dio_EventLogEntry(verify_for_retain(ITee,x0A),[ITfi1|ILfi1]) :-
    arg(1,ITee,event(10)),
    arg(8,ITee,_T1),
    dio_EntryData(retain(_T1),_),
    !.
/*                                                              */
/*  The Event Log Entry is expanded to an  event  entry, because */
/*  all previous entry data is retrieved and a new event entry is */
/*  constructed from the data given.                             */
/*                                                              */
dio_EventLogEntry(expand_to(ITee,OTee),[ITfi1|ILfi1]) :-
    findall(_T1,'1=dio_eld=1'(_T1),_L1),
    retract_all('1=dio_eld=1'(_T1)),
    _T2 =.. [led|_L1],
    arg(8,ITee,_T3),
    argrep(_T3,2,_T2,_Tt1),
    argrep(ITee,8,_Tt1,OTee),
    !.

/********************  START OF  PROLOGUE  ********************/
/*                                                              */
/*  FUNCTION NAME:   dio_EntryData(+A,?L)                       */
/*                   dio_EntryData(+T,?L)                       */
/*                                                              */
/*  FUNCTION TITLE:  Entry Data object.                         */
/*                                                              */
/*  FUNCTIONAL DESCRIPTION:                                     */
/*  The following functions can  be  performed  by  the EntryData */
/*  object.                                                     */
/*  retain                                                      */
/*                                                              */
/*  OPERATIONAL DESCRIPTION:                                    */
/*  The data form the Event Entry is retained, because all of the */
/*  data elements are temporary saved.                          */
/*                                                              */
/*    +=======================+                                 */
/*    | dio_EntryData # retain |                                */
/*    +=======================+                                 */
/*        |                                                     */
/*        |    +=========+                                      */
/*       (*)->-| for_all |                                      */
/*            +=========+                                       */
/*                                                              */
/*                                                              */
/*                                                              */
/********************  END OF  PROLOGUE  ********************/
:- public dio_EntryData/2:far.
:- visible dio_EntryData/2.
/*                                                              */
/*  The data form the Event Entry is retained, because all of the */
/*  data elements are temporary saved.                          */
/*                                                              */
dio_EntryData(retain(data(_,ITed)),[ITfi1|ILfi1]) :-
    for_all( _T1,
             ITed,
             assertz('1=dio_eld=1'(_T1)) ),
    !.

/********************  START OF  PROLOGUE  ********************/
/*                                                              */
/*  FUNCTION NAME:   dio_ReportFile(+A,?L)                      */
/*                   dio_ReportFile(+T,?L)                      */
/*                                                              */
/*  FUNCTION TITLE:  the Report File object.                    */
```

APPENDIX E

```
/*                                                                       */
/*  FUNCTIONAL DESCRIPTION:                                               */
/*  The following functions can be performed by the ReportFile            */
/*  object.                                                               */
/*  open_for                                                              */
/*  close                                                                 */
/*  format_write                                                          */
/*                                                                       */
/*  OPERATIONAL DESCRIPTION:                                              */
/*    1. The list of attributes for the Report File is returned,          */
/*  because the file path name is formed from the call sequence           */
/*  number parameter and the previous report file generation index        */
/*  and the file is opened and the attributes of the file are             */
/*  saved.                                                                */
/*    2. The file is closed successfully and the attributes of the        */
/*  file are deleted.                                                     */
/*  The report file formats the report text and writes the text to        */
/*  the report file.                                                      */
/*    4. The other messages are processed as default text file            */
/*  messages.                                                             */
/*                                                                       */
/*      +=============================+                                   */
/*      | dio_ReportFile # open_for   |                                   */
/*      +=============================+                                   */
/*           |                                                            */
/*           |     +=========+                                            */
/*        (*)->-| member   |                                              */
/*           |     +=========+                                            */
/*           |     +==================================================+   */
/*        (*)->-| dio_ReportGeneration # is_constructed_from |           */
/*           |     +==================================================+   */
/*           |     +=========================================+            */
/*        (*)->-| dio_ReportName # is_constructed_from |                  */
/*           |     +=========================================+            */
/*      +=============================+                                   */
/*      | dio_ReportFile # close      |                                   */
/*      +=============================+                                   */
/*           |                                                            */
/*           |     +=========+                                            */
/*        (*)->-| member   |                                              */
/*           |     +=========+                                            */
/*      +===================================+                             */
/*      | dio_ReportFile # format_write     |                             */
/*      +===================================+                             */
/*           |                                                            */
/*           |     +=========+                                            */
/*        (*)->-| member   |                                              */
/*           |     +=========+                                            */
/*           |     +================================+                     */
/*        (*)->-| dio_ReportTextList # format   |                         */
/*           |     +================================+                     */
/*           |     +==============================+                       */
/*        (*)->-| dio_ReportText # write_to   |                           */
/*           |     +==============================+                       */
/*      +================================+                                */
/*      | dio_ReportFile # ANY_MESSAGE   |                                */
/*      +================================+                                */
/*           |                                                            */
/*           |     +=========+                                            */
/*        (*)->-| member   |                                              */
/*           |     +=========+                                            */
/*           |     +==============================+                       */
/*        (*)->-| dio_TextFile # ANY_MESSAGE |                            */
/*           |     +==============================+                       */
```

APPENDIX E

```
/*                                                                        */
/*                                                                        */
/*                                                                        */
/*********************   END OF   PROLOGUE   **********************/
:- public dio_ReportFile/2:far.
:- visible dio_ReportFile/2.
/*                                                                        */
/*   1. The list of attributes for the Report  File  is  returned,       */
/*   because the file path name is formed from  the  call  sequence       */
/*   number parameter and the previous report file generation index       */
/*   and the file is opened and the  attributes  of  the  file  are       */
/*   saved.                                                               */
/*                                                                        */
dio_ReportFile(open_for(problem:INcsn),OLrfa) :-
    fileerrors(_,off),
    recorded(dio_ReportFile,_Lrfa,_),
    member(generation:_N1,_Lrfa),
    member(generation:_Nfgi,OLrfa),
    dio_ReportGeneration(is_constructed_from(_N1),_Nfgi),
    member(name:_Afpn,OLrfa),
    dio_ReportName(is_constructed_from(INcsn,_Lrfa),_Afpn),
    member(handle:_Nfhi,OLrfa),
    member(type:report,OLrfa),
    !,
    create(_Nfhi,_Afpn),
    member(status:open_write_only,OLrfa),
    asserta('1=dio_rpt=1'(_,_,_,_)),
    recorda(dio_ReportFile,OLrfa,_),
    !.
dio_ReportFile(open_for(problem:INcsn),OLrfa) :-
    fileerrors(_,off),
    not recorded(dio_ReportFile,OLrfa,_),
    member(name:_Afpn,OLrfa),
    dio_ReportName(is_constructed_from(INcsn,OLrfa),_Afpn),
    member(handle:_Nfhi,OLrfa),
    member(type:report,OLrfa),
    !,
    create(_Nfhi,_Afpn),
    member(status:open_write_only,OLrfa),
    asserta('1=dio_rpt=1'(_,_,_,_)),
    recorda(dio_ReportFile,OLrfa,_),
    !.
/*                                                                        */
/*   2. The file is closed successfully and the attributes of  the       */
/*   file are deleted.                                                    */
/*                                                                        */
dio_ReportFile(close,[ITfi|ILfi]) :-
    recorded(dio_ReportFile,[ITfi|ILfi],_),
    member(handle:_Nfhi,[ITfi|ILfi]),
    !,
    close(_Nfhi),
    retract('1=dio_rpt=1'(_,_,_,_)),
    !.
/*                                                                        */
/*   The report file formats the report text and writes the text to      */
/*   the report file.                                                     */
/*                                                                        */
dio_ReportFile(format_write(ILri),ILfi) :-
    recorded(dio_ReportFile,ILfi,_),
    member(handle:_Nfh,ILfi),
    !,
    dio_ReportTextList(format(ILri),_Lrti1),
    dio_ReportText(write_to(handle:_Nfh),_Lrti2).
/*                                                                        */
```

APPENDIX E

```
/*    4. The other messages are  processed  as   default   text   file  */
/*    messages.                                                         */
/*                                                                      */
dio_ReportFile(ITmt,[ITfi|ILfi]) :-
    member(type:report,[ITfi|ILfi]),
    !,
    dio_TextFile(ITmt,[ITfi|ILfi]).

/*********************   START OF   PROLOGUE   *********************/
/*                                                                      */
/*   FUNCTION NAME:    dio_FilterElementList(+A,?L)                     */
/*                     dio_FilterElementList(+T,?L)                     */
/*                                                                      */
/*   FUNCTION TITLE:   the Filter Element List object.                  */
/*                                                                      */
/*   FUNCTIONAL DESCRIPTION:                                            */
/*   the following functions are performed on  the  Filter  Element     */
/*   List object.                                                       */
/*   is_set_for                                                         */
/*                                                                      */
/*   OPERATIONAL DESCRIPTION:                                           */
/*   The Filter-Element-List is set for the file, because there  is     */
/*   nothing to do.                                                     */
/*   The Filter-Element-List is set  for  the   file,   because  each   */
/*   each Filter Element is set for the file.                           */
/*                                                                      */
/*      +====================================+                         */
/*      | dio_FilterElementList # is_set_for |                          */
/*      +====================================+                         */
/*      +====================================+                         */
/*      | dio_FilterElementList # is_set_for |                          */
/*      +====================================+                         */
/*           |                                                          */
/*           |    +=========+                                           */
/*         (*)->-| for_all |                                            */
/*           |    +=========+                                           */
/*           |    +===============================+                     */
/*         (*)->-| dio_FilterElement # is_set_for |                     */
/*                +===============================+                    */
/*                                                                      */
/*                                                                      */
/*                                                                      */
/*********************   END OF   PROLOGUE   *********************/
:- public dic_FilterElementList/2:far.
:- visible dic_FilterElementList/2.
/*                                                                      */
/*   The Filter-Element-List is set for the file, because there  is     */
/*   nothing to do.                                                     */
/*                                                                      */
dio_FilterElementList(is_set_for(ITfh),[]) :-
    !.
/*                                                                      */
/*   The Filter-Element-List is set  for  the   file,   because  each   */
/*   each Filter Element is set for the file.                           */
/*                                                                      */
dio_FilterElementList(is_set_for(ITfh),ILfel) :-
    for_all( _T1,
             ILfel,
             dio_FilterElement(is_set_for(ITfh),[_T1]) ),
    !.

/*********************   START OF   PROLOGUE   *********************/
```

APPENDIX E

```
/*                                                                   */
/* FUNCTION NAME:   dio_FilterElement(+A,?L)                         */
/*                  dio_FilterElement(+T,?L)                         */
/*                                                                   */
/* FUNCTION TITLE:  the Filter Element object.                       */
/*                                                                   */
/* FUNCTIONAL DESCRIPTION:                                           */
/* the following functions are performed on  the  Filter  Element    */
/* object.                                                           */
/* is_set_for                                                        */
/*                                                                   */
/* OPERATIONAL DESCRIPTION:                                          */
/* The Filter-Element is set for the File, because the Filter was    */
/* the device filter.                                                */
/* The Filter-Element is set for the File, because the Filter was    */
/* the event filter.                                                 */
/* The Filter-Element is set for the File, because the Filter was    */
/* the hsn filter.                                                   */
/* The Filter-Element is set for the File, because the Filter was    */
/* the fsc filter.                                                   */
/* The Filter-Element is set for the File, because the Filter was    */
/* the lrc filter.                                                   */
/* The Filter-Element is set for the File, because the Filter was    */
/* the mechanism filter.                                             */
/* The Filter-Element is set for the File, because the Filter was    */
/* the level filter.                                                 */
/* The Filter-Element is set for the File, because the Filter was    */
/* the error filter.                                                 */
/* The Filter-Element is set for the File, because the Filter was    */
/* the ser filter.                                                   */
/* The Filter-Element is set for the File, because the Filter was    */
/* the no filters.                                                   */
/*                                                                   */
/*    +================================+                             */
/*    | dio_FilterElement # is_set_for |                             */
/*    +================================+                             */
/*         |                                                         */
/*         |    +====================================+               */
/*        (*)->-| eep_Device # is_interpretted_from |                */
/*         |    +====================================+               */
/*         |    +=========+                                          */
/*        (*)->-| za_fltr |                                          */
/*              +=========+                                          */
/*    +================================+                             */
/*    | dio_FilterElement # is_set_for |                             */
/*    +================================+                             */
/*         |                                                         */
/*         |    +====================================+               */
/*        (*)->-| eep_Event  # is_interpretted_from |                */
/*         |    +====================================+               */
/*         |    +=========+                                          */
/*        (*)->-| za_fltr |                                          */
/*              +=========+                                          */
/*    +================================+                             */
/*    | dio_FilterElement # is_set_for |                             */
/*    +================================+                             */
/*         |                                                         */
/*         |    +===========================================+        */
/*        (*)->-| eep_HostSequenceNo # is_interpretted_from |        */
/*         |    +===========================================+        */
/*         |    +=========+                                          */
/*        (*)->-| za_fltr |                                          */
/*              +=========+                                          */
/*    +================================+                             */
```

APPENDIX E

```
/*      | dio_FilterElement # is_set_for |                              */
/*      +================================+                              */
/*          |                                                           */
/*          |      +==============================================+     */
/*          (*)->-| eep_FaultSymptomCode # is_interpretted_from |       */
/*          |      +==============================================+     */
/*          |      +=========+                                          */
/*          (*)->-| za_fltr |                                            */
/*                 +=========+                                          */
/*      +================================+                              */
/*      | dio_FilterElement # is_set_for |                              */
/*      +================================+                              */
/*          |                                                           */
/*          |      +==============================================+     */
/*          (*)->-| eep_LMUResponseCode # is_interpretted_from |        */
/*          |      +==============================================+     */
/*          |      +=========+                                          */
/*          (*)->-| za_fltr |                                            */
/*                 +=========+                                          */
/*      +================================+                              */
/*      | dio_FilterElement # is_set_for |                              */
/*      +================================+                              */
/*          |                                                           */
/*          |      +======================================+             */
/*          (*)->-| eep_Mechanism # is_interpretted_from |              */
/*          |      +======================================+             */
/*          |      +=========+                                          */
/*          (*)->-| za_fltr |                                            */
/*                 +=========+                                          */
/*      +================================+                              */
/*      | dio_FilterElement # is_set_for |                              */
/*      +================================+                              */
/*          |                                                           */
/*          |      +=========+                                          */
/*          (*)->-| za_fltr |                                            */
/*                 +=========+                                          */
/*      +================================+                              */
/*      | dio_FilterElement # is_set_for |                              */
/*      +================================+                              */
/*          |                                                           */
/*          |      +==================================+                 */
/*          (*)->-| eep_Error # is_transcribed_from |                   */
/*          |      +==================================+                 */
/*          |      +=========+                                          */
/*          (*)->-| za_fltr |                                            */
/*                 +=========+                                          */
/*      +================================+                              */
/*      | dio_FilterElement # is_set_for |                              */
/*      +================================+                              */
/*          |                                                           */
/*          |      +================================+                   */
/*          (*)->-| dio_FilterElement # is_set_for |                    */
/*          |      +================================+                   */
/*          |      +================================+                   */
/*          (*)->-| dio_FilterElement # is_set_for |                    */
/*          |      +================================+                   */
/*          |      +================================+                   */
/*          (*)->-| dio_FilterElement # is_set_for |                    */
/*                 +================================+                   */
/*      +================================+                              */
/*      | dio_FilterElement # is_set_for |                              */
/*      +================================+                              */
/*                                                                      */
/*                                                                      */
```

APPENDIX E

```
/*                                                              */
/*********************  END OF   PROLOGUE  *********************/
:- public dio_FilterElement/2:far.
:- visible dio_FilterElement/2.
/*                                                              */
/* The Filter-Element is set for the File, because the Filter was */
/* the device filter.                                           */
/*                                                              */
dio_FilterElement(is_set_for(handle:INfh),[device(ILdvc)]) :-
    eep_Device(is_interpretted_from(_Tdvc),device(ILdvc)),
    za_fltr(INfh,_Tdvc),
    !.
/*                                                              */
/* The Filter-Element is set for the File, because the Filter was */
/* the event filter.                                            */
/*                                                              */
dio_FilterElement(is_set_for(handle:INfh),[event(ILvnt)]) :-
    eep_Event(is_interpretted_from(_Tvnt),event(ILvnt)),
    za_fltr(INfh,_Tvnt),
    !.
/*                                                              */
/* The Filter-Element is set for the File, because the Filter was */
/* the hsn filter.                                              */
/*                                                              */
dio_FilterElement(is_set_for(handle:INfh),[hsn(ILhsn)]) :-
    eep_HostSequenceNo(is_interpretted_from(_Thsn),hsn(ILhsn)),
    za_fltr(INfh,_Thsn),
    !.
/*                                                              */
/* The Filter-Element is set for the File, because the Filter was */
/* the fsc filter.                                              */
/*                                                              */
dio_FilterElement(is_set_for(handle:INfh),[fsc(ILfsc)]) :-
    eep_FaultSymptomCode(is_interpretted_from(_Tfsc),fsc(ILfsc)),
    za_fltr(INfh,_Tfsc),
    !.
/*                                                              */
/* The Filter-Element is set for the File, because the Filter was */
/* the lrc filter.                                              */
/*                                                              */
dio_FilterElement(is_set_for(handle:INfh),[lrc(ILlrc)]) :-
    eep_LMUResponseCode(is_interpretted_from(_Tlrc),lrc(ILlrc)),
    za_fltr(INfh,_Tlrc),
    !.
/*                                                              */
/* The Filter-Element is set for the File, because the Filter was */
/* the mechanism filter.                                        */
/*                                                              */
dio_FilterElement(is_set_for(handle:INfh),[mechanism(ILmch)]) :-
    eep_Mechanism(is_interpretted_from(_Nmch),mechanism(ILmch)),
    za_fltr(INfh,mec(_Nmch)),
    !.
/*                                                              */
/* The Filter-Element is set for the File, because the Filter was */
/* the level filter.                                            */
/*                                                              */
dio_FilterElement(is_set_for(handle:INfh),[level(ILlvl)]) :-
    ILlvl = [level:INlvl],
    za_fltr(INfh,lev(_Nlvl)),
    !.
/*                                                              */
/* The Filter-Element is set for the File, because the Filter was */
/* the error filter.                                            */
/*                                                              */
```

APPENDIX E

```
dio_FilterElement(is_set_for(handle:INfh),[error(ILerr)]) :-
    ILerr = [error:IAerr],
    eep_Error(is_transcribed_from(_Nerr),IAerr),
    za_fltr(INfh,cod(_Nerr)),
    !.
/*                                                             */
/*  The Filter-Element is set for the File, because the Filter was  */
/*  the ser filter.                                            */
/*                                                             */
dio_FilterElement(is_set_for(ITfh),
                  [ser([ITmch,ITlvl,ITerr])]) :-
    dio_FilterElement(is_set_for(ITfh),[mechanism([ITmch])]),
    dio_FilterElement(is_set_for(ITfh),[level([ITlvl])]),
    dio_FilterElement(is_set_for(ITfh),[error([ITerr])]),
    !.
/*                                                             */
/*  The Filter-Element is set for the File, because the Filter was  */
/*  the no filters.                                            */
/*                                                             */
dio_FilterElement(is_set_for(ITfh),ILff) :-
    dio_ConsoleFile(open,_Lfi1),
    dio_ConsoleFile(write([(ILff,$ fails$)]),
                    _Lfi1),
%   write(ILff),write($ fails$),nl,
    fail,
    !.
```

APPENDIX F

```
/******************** START OF FILE DESCRIPTOR     *****************/
/*                                                                  */
/*  File Name:   P_ELI2AP.C                                         */
/*                                                                  */
/*  File Title:  Event Log Interface to Arity Prolog                */
/*                                                                  */
/*  Functional Description:                                         */
/*  This file contains functions  to interface the Library's event  */
/*  log with Arity Prolog.  The interface is solely written with C. */
/*  The reason why C was chosen as primary language for the inter-  */
/*  face is 1) it is currently, engineering's standard development  */
/*  language; 2) Arity Prolog provides  C callable routines to in-  */
/*  terface C with Prolog.  The interface  between C and Prolog is  */
/*  some what difficult  to explain without  going into relational  */
/*  database and logic programming concepts and disciplines.  Bas-  */
/*  icly Prolog data types  are referenced by  an address pointing  */
/*  to a term  (or variable),  that is  located  in it's  internal  */
/*  database.  Access of the Prolog terms are preformed by put??_c  */
/*  and get??_c functions that  converts the Prolog term to it's C  */
/*  equivalent (and vice versa).                                    */
/*                                                                  */
/*  Operational Description:                                        */
/*  The basic princples of the conversion are 1) get an event rec-  */
/*  ord; 2) determine what type of event it is; 3) attempt to con-  */
/*  vert the data,  if not successful then  leave the variable un-  */
/*  defined; 4) exit with Prolog structure built.                   */
/*                                                                  */
/*  A hierarchical structure of the functions in this file.  Func-  */
/*  tions that have a double boarder  "===" are invoked from other  */
/*  modules (source files).  Functions that have  a single boarder  */
/*  "---" are invoked within this module and should not be invoked  */
/*  from other modules.                                             */
/*                                                                  */
/*     +==============+     +==============+      +==============+  */
/*     | eli_elsrch_3 |     | eli_elfltr_2 |      | eli_elopen   |  */
/*     +==============+     +==============+      +==============+  */
/*            |                    |                                */
/*            |   +--------------+ |   +--------------+  +==============+ */
/*            +->-| eli_ele2pf   | +->-| eli_pf2elf   |  | eli_mimupdate| */
/*                +--------------+     +--------------+  +==============+ */
/*                                            |                     */
/*                        |   +--------------+      +==============+*/
/*                        +->-| eli_hst2pf   |      | eli_ellookup |*/
/*                        |   +--------------+      +==============+*/
/*                        |                                         */
/*                        |   +--------------+      +==============+*/
/*                        +->-| eli_lmu2pf   |      | eli_elclose  |*/
/*                        |   +--------------+      +==============+*/
/*                        |                                         */
/*                        |   +--------------+                      */
/*                        +->-| eli_lsm2pf   |                      */
/*                        |   +--------------+                      */
/*                        |         |                               */
/*                        |         |   +--------------+            */
/*                        |         +->-| eli_sei2pf   |            */
/*                        |         |   +--------------+            */
/*                        |         |                               */
/*                        |         |   +--------------+            */
/*                        |         +->-| eli_sem2pf   |            */
/*                        |         |   +--------------+            */
/*                        |         |                               */
/*                        |         |   +--------------+            */
/*                        |         +->-| eli_sec2pf   |            */
/*                        |         |   +--------------+            */
```

APPENDIX F

```
/*              |         |                           */
/*              |         |  +---------------+        */
/*              |         +->-| eli_sep2pf  |         */
/*              |         |   +---------------+       */
/*              |         |                           */
/*              |         |   +---------------+       */
/*              |         +->-| eli_set2pf  |         */
/*              |         |   +---------------+       */
/*              |         |                           */
/*              |         |   +---------------+       */
/*              |         +->-| eli_ses2pf  |         */
/*              |         |   +---------------+       */
/*              |         |                           */
/*              |         |   +---------------+       */
/*              |         +->-| eli_sed2pf  |         */
/*              |         |   +---------------+       */
/*              |         |                           */
/*              |         |   +---------------+       */
/*              |         +->-| eli_svs2pf  |         */
/*              |         |   +---------------+       */
/*              |         |                           */
/*              |         |   +---------------+       */
/*              |         +->-| eli_sve2pf  |         */
/*              |         |   +---------------+       */
/*              |         |                           */
/*              |         |   +---------------+       */
/*              |         +->-| eli_sri2pf  |         */
/*              |         |   +---------------+       */
/*              |         |                           */
/*              |         |   +---------------+       */
/*              |         +->-| eli_src2pf  |         */
/*              |         |   +---------------+       */
/*              |         |                           */
/*              |         |   +---------------+       */
/*              |         +->-| eli_sro2pf  |         */
/*              |         |   +---------------+       */
/*              |                                     */
/*              |  +---------------+                  */
/*              +->-| eli_dgn2pf |                    */
/*                 +---------------+                  */
/*                                                    */
/*                                                    */
/*  Function Names:                                   */
/*  eli_elsrch_3    - Event Log SeaRCH will preform a search of  */
/*                    the event log. The search can be either    */
/*                    foreward or backward as well as absolute.  */
/*  eli_elfltr_2    - Event Log FiLTeR will place filtering cri- */
/*                    teria on the event log search.             */
/*  eli_pf2elf      - Prolog Functor to Event Log Filters will   */
/*                    convert Prolog data types to C data types, */
/*                    invoke the proper Event Log filter, etc.   */
/*  eli_ele2pf      - Event Log Entry to Prolog Functor will     */
/*                    convert C data types to Prolog data types, */
/*  eli_hst2pf      - Data's Host Event to Prolog Functor will   */
/*                    convert the C structure err_pkg to the     */
/*                    equivalent Prolog Functor (host).          */
/*  eli_lmu2pf      - Data's lMu Event to Prolog Functor will    */
/*                    convert the C structures ipl_log and sens  */
/*                    _ipm to the equivalent Prolog Functor      */
/*                    (lmu).                                     */
/*  eli_lsm2pf      - Data's lSm Event to Prolog Functor will    */
/*                    convert the C structures inrsp, rsp_mot,   */
/*                    rsp_cap, rsp_port, rsp_driv, lstatrsp, dg_ */
/*                    rsp, evnt_buf, rsp_com, lscnfg, intrnrsp,  */
```

APPENDIX F

```
/*    .                  and unsl_msg to the equivalent Prolog Fun-   */
/*                       tor (lsm).                                   */
/*  eli_dgn2pf           - Data's Diagnostic Event  to Prolog Functor */
/*                       will convert  the C  structure  err_log to   */
/*                       equivalent Prolog Functor (diagnose).        */
/*  eli_sei2pf                                                        */
/*  eli_sem2pf                                                        */
/*  eli_sec2pf                                                        */
/*  eli_sep2pf                                                        */
/*  eli_set2pf                                                        */
/*  eli_ses2pf                                                        */
/*  eli_sed2pf                                                        */
/*  eli_svs2pf                                                        */
/*  eli_sve2pf                                                        */
/*  eli_sri2pf                                                        */
/*  eli_src2pf                                                        */
/*  eli_sro2pf                                                        */
/*                                                                    */
/********************  END OF FILE DESCRIPTOR   ********************/

/**********************  START OF PROLOGUE      **********************/
/*                                                                    */
/*  FUNCTION NAME:   ELI_ELSRCH_3                                     */
/*                                                                    */
/*  Function Title:  Event Log SeaRCH                                 */
/*                                                                    */
/*  Functional Description:                                           */
/*  Provide a means to access the  event log(s) data in such a way    */
/*  that the Prolog system can use the data.  This would mean that    */
/*  the function must have the capability to be called from Prolog    */
/*  and must support the Prolog syntax, semantics and discipline.     */
/*                                                                    */
/*  Operational Description:                                          */
/*  The arguments in the function header are defined as "reftype".    */
/*  The data type  "reftype"  is used by  Arity Prolog  for all of    */
/*  it's data types when it interfaces with another language (such    */
/*  as C).  "reftype"  is a  pointer to an  Arity Prolog  term (or    */
/*  variable)  located in  it's internal database.                    */
/*  The argument File must  be an integer.  If File  is not an in-    */
/*  teger then the function fails.                                    */
/*  The argument Type can  be either  the strings  "f oreward", or    */
/*  "b"ackward or  an integer.  If Type  is an integer  then it is    */
/*  assumed that an absolute search will be preformed.  If Type is    */
/*  an atom or string  then it is assumed that  a relative  search    */
/*  will be preformed. If the return status of the absolute search    */
/*  is either  RET_OK or E_NOT_FOUND then  the event entry is con-    */
/*  verted to  a prolog  functor and a  successful  status  is re-    */
/*  turned.  If the return status of the relative search is RET_OK    */
/*  then the event entry is converted to prolog functor and a suc-    */
/*  cessful status  is returned.  Otherwise,  the return status of    */
/*  either search would indicate that there is an i/o error or the    */
/*  entry does not exist, so a failing status is returned.            */
/*                                                                    */
/*  A hierarchical structure of the functions in this file.  Func-    */
/*  tions that have a double boarder  "===" are invoked from other    */
/*  modules (source files).  Functions that have  a single boarder    */
/*  "---" are invoked within this module and should not be invoked    */
/*  from other modules.                                               */
/*                                                                    */
/*      +=============+                                               */
/*      | eli_elsrch_3 |                                              */
/*      +=============+                                               */
/*            |                                                       */
```

APPENDIX F

```
/*          |   +--------------+                                    */
/*          +->-| cp_message#  |                                    */
/*          |   +--------------+                                    */
/*          |                                                       */
/*          |   +--------------+                                    */
/*          +->-| position     |                                    */
/*          |   +--------------+                                    */
/*          |                                                       */
/*          |   +--------------+                                    */
/*          +->-| strnicmp     |                                    */
/*          |   +--------------+                                    */
/*          |                                                       */
/*          |   +--------------+                                    */
/*          +->-| strlen       |                                    */
/*          |   +--------------+                                    */
/*          |                                                       */
/*          |   +--------------+                                    */
/*          +->-| search       |                                    */
/*          |   +--------------+                                    */
/*          |                                                       */
/*          |   +--------------+                                    */
/*          +->-| eli_ele2pf   |                                    */
/*              +--------------+                                    */
/*                                                                  */
/*                                                                  */
/*                                                                  */
/*********************   END OF PROLOGUE  *********************/
/*                                                                  */
/* note : reftype is also known as "ref".                           */
/*------------------------------------------------------------------*/
/* File   file handle pointed to by eli_open_2.                     */
/* Type   number abs position in log, atom implies forward or       */
/* backward searching                                               */
/* Event  Nested functor has all components of event data found,    */
/*        functor containing event header with the data being a     */
/*        variable.                                                 */
/*                                                                  */
/*------------------------------------------------------------------*/
int eli_elsrch()
    {

//#if ((EL_DEBUG & EL_DELSRCH) == EL_DELSRCH)        /* debug */ char          cName[10];
    unsigned int  iCount;
    unsigned int  iSequence;
    unsigned int  iFile;
    struct err_log *psEntry;

/*--------------------------------------------------------------*/
    /* Retrieve the file handle, because the file should be opened. */
    /*--------------------------------------------------------------*/
    if ((! cp_message3((CP_RETRIEVE | AP_INTEGER),
                        File, (union any_type *)(&iFile)) )
        return(AP_FAILURE);

/*--------------------------------------------------------------*/
    /* Retrieve the  sequence number, if the  data type of  the Type*/
    /* argument is an integer.                                      */
    /*--------------------------------------------------------------*/
    if (cp_message3((CP_RETRIEVE | AP_INTEGER),
                        Type, (union any_type *)(&iSequence)) )
        {
```

APPENDIX F

```
       /*---------------------------------------------------------------*/
       /* Invoke the position function (absolute search) and process    */
       /* the event entry that resulted from the search.                */
       /*---------------------------------------------------------------*/
       switch( iCount = files[ iFile ].D.position( iSequence ) )
          {
          /*---------------------------------------------------------------*/
          /*  Convert the event log entry to a Prolog functor and          */
          /*  return the appropriate status.                               */
          /*---------------------------------------------------------------*/
          case RET_OK :
          case E_NOT_FOUND:
             psEntry   = files[ iFile ].D.entry;
             iSequence = files[ iFile ].D.sequence_number;

if(! eli_ele2pf(EL_FENTRY,Event,psEntry,iSequence,iFile))
                {
                return(AP_FAILURE);
                }
             break;
          /*---------------------------------------------------------------*/
          /* Return failing status because of an unrecoverable             */
          /* file error.                                                   */
          /*---------------------------------------------------------------*/
          default :
//           printf("File %d could not be read successfully,",iFile);
//           printf(" because of error condition %d \n",iCount);
             return(AP_FAILURE);
          }
       }

/*---------------------------------------------------------------*/
    /* Retrieve the  search direction, if  the data type  of the Type*/
    /* argument is an atom.                                          */
    /*---------------------------------------------------------------*/
    else if (cp_message3((CP_RETRIEVE | AP_ATOM),
                           Type, (union any_type *)(&cName)) )
       {
       /*---------------------------------------------------------------*/
       /*  Forward relative search, if requested.                       */
       /*---------------------------------------------------------------*/
       if( strcmp( cName,"foreward" ) == 0 )
          switch(iCount = files[ iFile ].D.search( FORWARD ) )
             {
             /*---------------------------------------------------------------*/
             /*  Convert the event log entry to a Prolog functor              */
             /*  and return the appropriate status.                           */
             /*---------------------------------------------------------------*/
             case RET_OK :
                psEntry   = files[ iFile ].D.entry;
                iSequence = files[ iFile ].D.sequence_number;
                if(!eli_ele2pf(EL_FENTRY,Event,psEntry,iSequence,
                                                              iFile))
                   {
                   return(AP_FAILURE);
                   }
                break;

/*---------------------------------------------------------------*/
             /* Return failing status because of an unrecoverable file*/
             /* error.                                                        */
             /*---------------------------------------------------------------*/
             default :
//              printf("File %d could not be read successfully,",iFile);
```

APPENDIX F

```
//              printf(" because of error condition %d \n",iCount);
                return(AP_FAILURE);
              }

/*----------------------------------------------------------*/
      /* Backward relative search, if requested.                  */
      /*----------------------------------------------------------*/
      else
        if (strncmp(cName,"backward",strlen(cName)) == 0)
          switch( iCount= files[ iFile ].D.search( BACKWARD ) )
            {
            /*------------------------------------------------------*/
            /* Convert the event log entry to a Prolog functor      */
            /* and return the appropriate status.                   */
            /*------------------------------------------------------*/ case RET_OK:
               psEntry = files[ iFile ].D.entry;
               iSequence = files[ iFile ].D.sequence_number;
               if (! eli_ele2pf(EL_FENTRY,Event,psEntry,iSequence,
                                                            iFile))
                 {
                 return(AP_FAILURE);
                 } break;
            /*------------------------------------------------------*/
            /* Return failing status because of an unrecoverable    */
            /* file error.                                          */
            /*------------------------------------------------------*/
            default:
//              printf("File %d could not be read successfully,",
//                                                          iFile);
//              printf(" because of error condition %d \n",iCount);
               return(AP_FAILURE);
            }
        /*----------------------------------------------------------*/
        /* Return failing status because relative search type is    */
        /* invalid.                                                 */
        /*----------------------------------------------------------*/
        else
          {
          return(AP_FAILURE);
          }
      }
  /*--------------------------------------------------------------*/
  /* Return failing status because the datatype is invalid.       */
  /*--------------------------------------------------------------*/
  else
    {
    return(AP_FAILURE);
    }

//#endif /* debug */ return(AP_SUCCESS);
   };

/********************** START OF PROLOGUE   *********************/
/*                                                              */
/* FUNCTION NAME:   ELI_ELFLTR_2                                */
/*                                                              */
/* Function Title: Event Log FiLTeR                             */
```

APPENDIX F

```
/*                                                                      */
/* Functional Description:                                              */
/* Provide a means to filter the  event log(s) data in such a way       */
/* that the Prolog system can use the data.  This would mean that       */
/* the function must have the capability to be called from Prolog       */
/* and must support the Prolog syntax, semantics and discipline.        */
/*                                                                      */
/* Operational Description:                                             */
/* The arguments in the function header are defined as "reftype".       */
/* The data type  "reftype"  is used by  Arity Prolog  for all of       */
/* it's data types when it interfaces with another language (such       */
/* as C).  "reftype"  is a   pointer to an  Arity Prolog  term (or      */
/* variable)  located in  it's internal database.                       */
/* The argument  Filter can be  either an undefine  variable or a       */
/* functor.  If Filter is an  undefine variable  then nothing is        */
/* done.  If it is a  functor then  call the function  to convert       */
/* the functor to an event log filter.  If the function processes       */
/* the functor  successfully return a   successful status.  Other-      */
/* wise return a failing status.                                        */
/*                                                                      */
/* A hierarchical structure of the functions in this file.  Func-       */
/* tions that have a double boarder  "===" are invoked from other       */
/* modules (source files).  Functions that have  a single boarder       */
/* "---" are invoked within this module and should not be invoked       */
/* from other modules.                                                  */
/*                                                                      */
/*      +==============+                                                */
/*      | eli_elfltr_2 |                                                */
/*      +==============+                                                */
/*          |                                                           */
/*          |   +--------------+                                        */
/*          +->-| cp_message#  |                                        */
/*          |   +--------------+                                        */
/*          |                                                           */
/*          |   +--------------+                                        */
/*          +->-| eli_pf2elf   |                                        */
/*              +--------------+                                        */
/*                                                                      */
/*                                                                      */
/*                                                                      */
/************************   END OF PROLOGUE    ********************/
/*                                                                      */
/* note : reftype is also known as "ref".                               */
/*----------------------------------------------------------------------*/
/* File Handle to eli_open_2 file opened.                               */
/* Filter  Classification functor for filters (event, fsc, ... )        */
/*----------------------------------------------------------------------*/
int eli_elfltr()
    {

//  #if ((EL_DEBUG & EL_DELFLTR) == EL_DELFLTR)             /* debug */
    union any_type  uFile;
    int             fh;
    int             iCount;

/*------------------------------------------------------------------*/
    /*  Retrieve the file handle, because the file should be opened.*/
    /*------------------------------------------------------------------*/ if( ! cp_message3( ( CP_RETRIEVE | AP_INTEGER), File, &uFile ) )
        return( AP_FAILURE );

fh = uFile.i;
```

APPENDIX F

```
   /*-------------------------------------------------------------*/
   /*  Convert functor to event log filter.                       */
   /*-------------------------------------------------------------*/
   for( iCount = 1; iCount <= EL_FTOTAL; iCount++ )
     {
     if( eli_pf2elf( iCount, Filter, fh ) )
        return( AP_SUCCESS );
     }

//#endif    /* debug */ return( AP_FAILURE );
   }
```

APPENDIX G

```
/********************** START OF PROLOGUE **********************/
/*                                                              */
/* FUNCTION NAME:   ELI_PF2ELF                                  */
/*                                                              */
/* Function Title: Prolog Functor to Event Log Filter           */
/*                                                              */
/* Functional Description:                                      */
/* Abstracts the arguments of the Prolog functor "filters" and  */
/* invokes the associated filter functions.                     */
/*                                                              */
/* Operational Description:                                     */
/* The operations in this function is based on the message pass-*/
/* ed in the parameter list. The message indicates which argu-  */
/* ment in the functor is to be processed. The process of the   */
/* functor and it's arguments follows a basic design such as, 1)*/
/* match the name and arity of the functor; 2) abstract the argu-*/
/* ment from the functor; 3) based on the datatype of the argu- */
/* ment preform the necessary operations, such as: do nothing, if*/
/* the argument is undefined; convert to an integer and invoke  */
/* the filtering function, if the argument is an integer; invoke*/
/* this function (again), if the argument is a functor; or return*/
/* a failing status, if the argument is not an integer or a func-*/
/* tor.  For the functors with two arguments the final operation*/
/* of the filter depends on the second argument.                */
/*                                                              */
/* A hierarchical structure of the functions in this file. Func-*/
/* tions that have a double boarder "===" are invoked from other*/
/* modules (source files). Functions that have a single boarder */
/* "---" are invoked within this module and should not be invoked*/
/* from other modules.                                          */
/*                                                              */
/*    +---------------+                                         */
/*    | eli_pf2elf    |                                         */
/*    +---------------+                                         */
/*        |                                                     */
/*        |   +---------------+                                 */
/*        +->-| cp_message#   |                                 */
/*        |   +---------------+                                 */
/*        |                                                     */
/*        |   +---------------+                                 */
/*        +->-| eli_pf2elf    |                                 */
/*        |   +---------------+                                 */
/*        |                                                     */
/*        |   +---------------+                                 */
/*        +->-' et_filter     |                                 */
/*        |   +---------------+                                 */
/*        |                                                     */
/*        |   +---------------+                                 */
/*        +->-| dev_filter    |                                 */
/*        |   +---------------+                                 */
/*        |                                                     */
/*        |   +---------------+                                 */
/*        +->-| fsc_filter    |                                 */
/*        |   +---------------+                                 */
/*        |                                                     */
/*        |   +---------------+                                 */
/*        +->-| lrc_filter    |                                 */
/*        |   +---------------+                                 */
/*        |                                                     */
/*        |   +---------------+                                 */
/*        +->-| hid_filter    |                                 */
/*            +---------------+                                 */
/*                                                              */
/*                                                              */
```

APPENDIX G

```
/*                                                                    */
/********************** END OF PROLOGUE *****************************/
/*--------------------------------------------------------------------*/
/* Mdef  Message definition defined in eli2ap.h file                  */
/*                                                                    */
/* Pref  Prolog idb pointer to functor, data types, classification    */
/*       functors.                                                    */
/*                                                                    */
/*--------------------------------------------------------------------*/ int eli_pf2elf( int Mdef, ref Pref, int fh )
    {

//#if ((EL_DEBUG & EL_DPF2ELF) == EL_DPF2ELF)   /* debug */ union any_type uTmp1;
    union any_type uTmp2;
    union any_type uTmp3;

/*----------------------------------------------------------------*/
    /* Process filters based on the message.                          */
    /*----------------------------------------------------------------*/
    switch(Mdef)
        {
        /*------------------------------------------------------------*/
        /* Process the event filter . . .                             */
        /*------------------------------------------------------------*/
        case EL_FEVENT :
            strncpy(uTmp2.c,"event\0",6);
            if (! cp_message4((CP_COMPARE | AP_FUNCTOR),Pref, &uTmp2, 1))
                return(AP_FAILURE);

/*--------------------------------------------------------*/
            /* Get the argument of the functor and process it.        */
            /*--------------------------------------------------------*/
            if (! cp_message4((CP_RETRIEVE | AP_ARGUMENT | AP_INTEGER),
                                                    Pref, &uTmp1 , 1))
                return(AP_FAILURE);
            files[ fh ].D.et_filter( ( char ) uTmp1.i );
            return(AP_SUCCESS);
            break;

/*------------------------------------------------------------*/
        /* Process the device filter . .                              */
        /*------------------------------------------------------------*/
        case EL_FDEVICE :
            strncpy(uTmp2.c,"device\0",7);
            if ( !cp_message4((CP_COMPARE | AP_FUNCTOR), Pref, &uTmp2,1))
                return(AP_FAILURE);

/*--------------------------------------------------------*/
            /* Get the argument of the functor and process it.        */
            /*--------------------------------------------------------*/
            if (! cp_message4((CP_RETRIEVE | AP_ARGUMENT | AP_INTEGER),
                                                    Pref, &uTmp1 , 1))
                return(AP_FAILURE);
            files[ fh ].D.dev_filter( ( char ) uTmp1.i );
            return(AP_SUCCESS);
            break;

/*------------------------------------------------------------*/
        /* These are not implemented yet.                             */
        /*------------------------------------------------------------*/
        case EL_FLENGTH :
```

APPENDIX G

```
        case EL_FTIME :
            return(AP_FAILURE);
            break;

/*------------------------------------------------------------*/
        /* Process the fsc filter . . .                              */
        /*------------------------------------------------------------*/
        case EL_FFSC :
            strncpy(uTmp2.c,"fsc\0",4);
            if (!cp_message4((CP_COMPARE | AP_FUNCTOR), Pref, &uTmp2,2))
                return(AP_FAILURE);

/*------------------------------------------------------------*/
            /* Get the 1st and 2nd arguments of the functor and process*/
            /* them.                                                    */
            /*------------------------------------------------------------*/
            if (! cp_message4((CP_RETRIEVE | AP_ARGUMENT | AP_LONG),
                                                    Pref, &uTmp3 , 1))
                return(AP_FAILURE);

// printf("\n*** argument 1   =  %x \n",uTmp3.l);
// the following is required, because of a stack problem with ZTC
// the value of uTmp1 is 0 when this function is called the 2nd time
            cp_message4((CP_RETRIEVE | AP_ARGUMENT | AP_LONG),
                                                    Pref, &uTmp1 , 2);
            if (uTmp1.l == 0)
                {
// ... and the correct value is set the 3rd time.
// printf("\nargument 2   =  %x \n",uTmp1.l);

if (! cp_message4((CP_RETRIEVE | AP_ARGUMENT | AP_LONG),
                                                    Pref, &uTmp1 , 2))
                    return(AP_FAILURE);

// printf("\n*** argument 2   =  %x \n",uTmp1.l);
                }
            /*------------------------------------------------------------*/
            /* Complete conversion process.                              */
            /*------------------------------------------------------------*/
            files[ fh ].D.fsc_filter( ( unsigned int ) uTmp3.l,
                                      ( unsigned int ) uTmp1.l );
            return(AP_SUCCESS);
            break;

/*------------------------------------------------------------*/
        /* Process the lrc filter . . .                              */
        /*------------------------------------------------------------*/
        case EL_FLRC :
            strncpy(uTmp2.c,"lrc\0",4);
            if (!cp_message4((CP_COMPARE | AP_FUNCTOR), Pref, &uTmp2,2))
                return(AP_FAILURE);

/*------------------------------------------------------------*/
            /* Get the 1st and 2nd arguments of the functor and process*/
            /* them.                                                    */
            /*------------------------------------------------------------*/
            if (! cp_message4((CP_RETRIEVE | AP_ARGUMENT | AP_LONG),
                                                    Pref, &uTmp1 , 1))
                return(AP_FAILURE);

// the following is required, because of a stack problem with ZTC
            cp_message4((CP_RETRIEVE | AP_ARGUMENT | AP_LONG),
                                                    Pref, &uTmp3 , 2);
            if (uTmp3.l == 0)
```

APPENDIX G

```
         {
// see the above desription for details.

if (! cp_message4((CP_RETRIEVE | AP_ARGUMENT | AP_LONG),
                                             Pref, &uTmp3 , 2))
               return(AP_FAILURE);
            }

/*-----------------------------------------------------------*/
         /* Complete conversion process.                              */
         /*-----------------------------------------------------------*/
         files[ fh ].D.lrc_filter( (unsigned int ) uTmp1.1,
                                       ( unsigned int ) uTmp3.1 );
         return(AP_SUCCESS);
         break;

/*-----------------------------------------------------------*/
      /* Process the hid filter  . . .                             */
      /*-----------------------------------------------------------*/
      case EL_FHID :
         strncpy(uTmp2.c,"hid\0",4);
         if (!cp_message4((CP_COMPARE | AP_FUNCTOR), Pref, &uTmp2,2))
            return(AP_FAILURE);

/*-----------------------------------------------------------*/
         /* Get the 1st and 2nd arguments of the functor and process*/
         /* them.                                                     */
         /*-----------------------------------------------------------*/
         if (! cp_message4((CP_RETRIEVE | AP_ARGUMENT | AP_LONG),
                                          Pref, &uTmp1 , 1))
            return(AP_FAILURE);
         uTmp1.1 = zm_i2bl((int)uTmp1.1);

// printf("\n*** argument 1   =   %x:%i  ",uTmp1.1,uTmp1.1);
// the following is required, because of a stack problem with ZTC
         cp_message4((CP_RETRIEVE | AP_ARGUMENT | AP_LONG),
                                          Pref, &uTmp3 , 2);
         uTmp3.1 = zm_i2bl((int)uTmp3.1);
// printf("\n*** argument 2   =   %x:%i  ",uTmp3.1,uTmp3.1);
         if (uTmp3.1 == 0)
            {
// see the above desription for details.

if (! cp_message4((CP_RETRIEVE | AP_ARGUMENT | AP_LONG),
                                             Pref, &uTmp3 , 2))
               return(AP_FAILURE);
            uTmp3.1 = zm_i2bl((int)uTmp3.1);
// printf("\n+++ argument 2   =   %x:%i  ",uTmp3.1,uTmp3.1);
            }

/*-----------------------------------------------------------*/
         /* Complete conversion process.                              */
         /*-----------------------------------------------------------*/
         files[ fh ].D.hid_filter( (unsigned long) uTmp1.1,
                                       (unsigned long) uTmp3.1 );
         return(AP_SUCCESS);
         break;

/*-----------------------------------------------------------*/
      /* Process the cod filter  . . .                             */
      /*-----------------------------------------------------------*/
      case EL_FCOD :
         strncpy(uTmp2.c,"cod\0",4);
         if (! cp_message4((CP_COMPARE | AP_FUNCTOR),Pref, &uTmp2, 2))
```

APPENDIX G

```
        return(AP_FAILURE);

/*------------------------------------------------------------*/
    /* Get the 1st and 2nd arguments of the functor and process*/
    /* them.                                                    */
    /*------------------------------------------------------------*/
        if (! cp_message4((CP_RETRIEVE | AP_ARGUMENT | AP_LONG),
                                            Pref, &uTmp1 , 1))
            return(AP_FAILURE);

// the following is required, because of a stack problem with ZTC
        cp_message4((CP_RETRIEVE | AP_ARGUMENT | AP_LONG),
                                            Pref, &uTmp3 , 2);
        if (uTmp3.1 == 0)
           {
// see the above desription for details.

if (! cp_message4((CP_RETRIEVE | AP_ARGUMENT | AP_LONG),
                                            Pref, &uTmp3 , 2))
           return(AP_FAILURE);
         }

/*------------------------------------------------------------*/
    /*  Complete conversion process.                             */
    /*------------------------------------------------------------*/
        files[ fh ].D.cod_filter( (unsigned int ) uTmp1.1,
                                        ( unsigned int ) uTmp3.1 );
        return(AP_SUCCESS);
        break;

/*------------------------------------------------------------*/
    /*  Process the mec filter  . . .                            */
    /*------------------------------------------------------------*/
    case EL_FMEC :
        strncpy(uTmp2.c,"mec\0",4);
        if (!cp_message4((CP_COMPARE | AP_FUNCTOR), Pref, &uTmp2,1))
            return(AP_FAILURE);
    /*------------------------------------------------------------*/
    /* Get the 1st and 2nd arguments of the functor and process*/
    /* them.                                                    */
    /*------------------------------------------------------------*/
            if (! cp_message4((CP_RETRIEVE | AP_ARGUMENT | AP_SHORT),
                        Pref, &uTmp1 , 1))
               return(AP_FAILURE);

/*------------------------------------------------------------*/
    /*  Complete conversion process.                             */
    /*------------------------------------------------------------*/
        files[ fh ].D.mec_filter( ( unsigned int ) uTmp1.1 );
        return(AP_SUCCESS);
        break;

/*------------------------------------------------------------*/
    /*  Process the lev filter  . . .                            */
    /*------------------------------------------------------------*/
    case EL_FLEV :
           strncpy(uTmp2.c,"lev\0",4);
           if (! cp_message4((CP_COMPARE | AP_FUNCTOR),
                          Pref, &uTmp2, 1))
              return(AP_FAILURE);
    /*------------------------------------------------------------*/
    /* Get the 1st and 2nd arguments of the functor and process*/
    /* them.                                                    */
```

APPENDIX G

```
        /*------------------------------------------------------------*/
            if (! cp_message4((CP_RETRIEVE | AP_ARGUMENT | AP_SHORT),
                         Pref, &uTmp1 , 1))
                 return(AP_FAILURE);
        /*------------------------------------------------------------*/
        /* Complete conversion process.                               */
        /*------------------------------------------------------------*/
            files[ fh ].D.lev_filter( ( unsigned int ) uTmp1.1 );
            return(AP_SUCCESS);
            break;

/*------------------------------------------------------------*/
    /* Invalid message, filtering not done.                       */
    /*------------------------------------------------------------*/
    default :
        return(AP_FAILURE);
    }

//#endif /* debug */

/*------------------------------------------------------------*/
    /* Successfully processed all arguments of the functor.       */
    /*------------------------------------------------------------*/
    return(AP_SUCCESS);
    }

/********************** START OF PROLOGUE    *********************/
/*                                                                */
/* FUNCTION NAME:   ELI_ELE2PF                                    */
/*                                                                */
/* Function Title:  Event Log Entry to Prolog Functor             */
/*                                                                */
/* Functional Description:                                        */
/* Converts the event log entry into a Prolog functor.            */
/*                                                                */
/* Operational Description:                                       */
/* The operations in this function is based on  the message pass- */
/* ed in  the parameter list.  The message  indicates which argu- */
/* ment in the functor  is to be  processed.  The process  of the */
/* functor and it's arguments  follows a basic design such as, 1) */
/* match the name and arity of the functor; 2) abstract the argu- */
/* ment from the  functor; 3) convert the event log entry element */
/* to the argument  and return  if successful,  otherwise  return */
/* with the argument  being undefined.  If the  message indicates */
/* that the entire entry is to be converted then invoke this fun- */
/* ction again with a new message.  If the message indicates that */
/* the event data (not the header)  is to converted  then process */
/* the event's sequence  number using the method  described above */
/* and depending on the  event type in the header  invoke the ap- */
/* propriate function  to complete the  conversion.  Otherwise if */
/* message indicates one of the event header elements (except for */
/* data) then process the header element as described above.      */
/*                                                                */
/* A hierarchical structure of the functions in this file.  Func- */
/* tions that have a double boarder  "===" are invoked from other */
/* modules (source files).  Functions that have  a single boarder */
/* "---" are invoked within this module and should not be invoked */
/* from other modules.                                            */
/*                                                                */
/*     +--------------+                                           */
/*     | eli_ele2pf   |                                           */
/*     +--------------+                                           */
/*            |                                                   */
```

APPENDIX G

```
/*          |   +--------------+                                        */
/*       +->-| cp_message#  |                                           */
/*          |   +--------------+                                        */
/*          |                                                           */
/*          |   +--------------+                                        */
/*       +->-| zm_swapi     |                                           */
/*          |   +--------------+                                        */
/*          |                                                           */
/*          |   +--------------+                                        */
/*       +->-| zm_bi2i      |                                           */
/*          |   +--------------+                                        */
/*          |                                                           */
/*          |   +--------------+                                        */
/*       +->-| eli_ele2pf   |                                           */
/*          |   +--------------+                                        */
/*          |                                                           */
/*          |   +--------------+                                        */
/*       +->-| eli_hst2pf   |                                           */
/*          |   +--------------+                                        */
/*          |                                                           */
/*          |   +--------------+                                        */
/*       +->-| eli_lmu2pf   |                                           */
/*          |   +--------------+                                        */
/*          |                                                           */
/*          |   +--------------+                                        */
/*       +->-| eli_lsm2pf   |                                           */
/*          |   +--------------+                                        */
/*          |                                                           */
/*          |   +--------------+                                        */
/*       +->-| eli_dgn2pf   |                                           */
/*              +--------------+                                        */
/*                                                                      */
/*                                                                      */
/*   Prerequisites:                                                     */
/*                                                                      */
/*   Special Considerations:                                            */
/*   _                                                                  */
/*                                                                      */
/*   Additional Variable name prefixes for this file are :              */
/*      ar   - arity prolog reference data types                        */
/*                                                                      */
/*                                                                      */
/*   Function Description                                               */
/*  Components        |Type      |Name          |Range/Description      */
/* ------------------+----------+--------------+--------------------    */
/*  Parameters In    |int       |Mdef          |message definition      */
/*                   |reftype   |Pref          |Prolog idb pointer      */
/*                   |struct    |              |                        */
/*                   |err_log * |Cref          |event log pointer       */
/*                   |int       |Cint          |sequence number of      */
/*                   |          |              |the event.              */
/*                   |          |              |                        */
/*  Returning Values |int       |AP_SUCCESS    | 1                      */
/*                   |          |AP_FAILURE    | 0                      */
/*                   |          |              |                        */
/*  External Variables|         |              |                        */
/*                   |          |              |                        */
/*  H/W Registers    |          |              |                        */
/*                   |          |              |                        */
/*  Function Calls   |int       |cp_message    |external(u_cpiutl.c)    */
/*                   |int       |zm_swapi      |external(u_zmcutl.c)    */
/*                   |int       |zm_bi2i       |external(u_zmcutl.c)    */
/*                   |int       |eli_ele2pf    |internal(itself)        */
/*                   |int       |eli_hst2pf    |internal                */
```

APPENDIX G

```
/*                  |int      |eli_lmu2pf     |internal        */
/*                  |int      |eli_lsm2pf     |internal        */
/*                  |int      |eli_dgn2pf     |internal        */
/*                  |         |               |                */
/*                                                             */
/* History:                                                    */
/* Prologue Created    02/24/89 tlp                            */
/* Prologue Reviewed   --/--/-- ---                            */
/* Code Completed      06/15/89 tlp                            */
/* Code Updated        09/14/89 tlp  added the cp_message function */
/*                                   to reduce the amount of test- */
/*                                   ing prolog data  types and to */
/*                                   reduce the size  of the func- */
/*                                   tion (memory space).     */
/* Code Updated        --/--/-- ---                            */
/*                                                             */
/*                                                             */
/*********************   END OF PROLOGUE   *********************/
/*------------------------------------------------------------*/
/* Mdef   Message definition defined in eli2ap.h              */
/* Pref   Prolog to classification functors                   */
/* Cref   Pointer to errlog information defined in M_STRUCT.H */
/* Cint   sequence number of the event in the event log       */
/*------------------------------------------------------------*/ int eli_ele2pf(int Mdef,ref Pref,struct err_log *Cref,int Cint,ref fh)
   {

//#if ((EL_DEBUG & EL_DELE2PF) == EL_DELE2PF) /* debug */
   ref arI1;
   union any_type uTmp1;
   unsigned int   iInt1;
   unsigned long  lInt1;
   int i = 0;

for( i = 0; i < 80; i++ )
      uTmp1.c[ i ] = 0x00;

/*---------------------------------------------------------*/
   /*  For each message, process the Prolog reference according. */
   /*---------------------------------------------------------*/
   switch(Mdef)
      {
      /*------------------------------------------------------*/
      /*  Message is T_ENTRY.                                 */
      /*------------------------------------------------------*/
      case EL_FENTRY :

/*---------------------------------------------------*/
         /*Clear storage area                                 */
         /*---------------------------------------------------*/
         for( i = 0; i < 80; i++ )
            uTmp1.c[ i ] = 0x00;

strncpy( uTmp1.c, "entry\0", 6 );
         if(cp_message4((CP_COMPARE | AP_FUNCTOR),
                         Pref, &uTmp1, 8 ) )
            {
            /*------------------------------------------------*/
            /*  For each element of this functor call the  function */
            /*  again (recursively)                           */
            /*  with a message  that coresponse to the        */
            /*  position of                                   */
```

APPENDIX G

```
      /* the argument in the functor.                         */
      /*----------------------------------------------------------*/
      for(iInt1 = 1; iInt1 <= 8; iInt1++)
         {
         if (! cp_message4((CP_RETRIEVE | AP_ARGUMENT),
                           Pref, (union any_type *)(&arI1),
                                                         iInt1))
            {
            return(AP_FAILURE);
            } if (! eli_ele2pf((EL_FENTRY+iInt1),arI1,Cref,Cint,fh))
            {
            return(AP_FAILURE);
            }

}
      return(AP_SUCCESS);
      }
   else
      return(AP_FAILURE);

break;

/*----------------------------------------------------------*/
/* Message is T_EVENT.                                      */
/*----------------------------------------------------------*/
case EL_FEVENT :

/*----------------------------------------------------------*/
   /*Clear storage area                                        */
   /*----------------------------------------------------------*/
   for( i = 0; i < 80; i++ )
      uTmp1.c[ i ] = 0x00;

strncpy( uTmp1.c, "event\0", 6 );
   if( cp_message4((CP_COMPARE | AP_FUNCTOR), Pref, &uTmp1, 1))
      {
      /*----------------------------------------------------------*/
      /* For the argument of this functor, get the                */
      /* argument from the                                        */
      /* the functor, recast the event type to an integer,        */
      /* then convert                                             */
      /* the integer to a Prolog integer.                         */
      /*----------------------------------------------------------*/
         iInt1 = (unsigned char) Cref -> e_type;
         if (! cp_message4((CP_RETRIEVE | AP_ARGUMENT |
                            CP_COMPARE | AP_INTEGER), Pref,
                              (union any_type *)(&iInt1),1))
            return(AP_FAILURE);
         }
      else
         return(AP_FAILURE);
   break;

/*----------------------------------------------------------*/
/* Message is T_DEVICE.                                     */
/*----------------------------------------------------------*/
case EL_FDEVICE :

/*----------------------------------------------------------*/
   /*Clear storage area                                        */
   /*----------------------------------------------------------*/
   for( i = 0; i < 80; i++ )
```

APPENDIX G

```
      uTmp1.c[ i ] = 0x00;

strncpy( uTmp1.c, "device\0", 7 );
   if (cp_message4((CP_COMPARE | AP_FUNCTOR),
                 Pref, &uTmp1, 1))
      {
      /*---------------------------------------------------------*/
      /* For the  argument of this functor,  get the            */
      /* argument  from the                                     */
      /* the functor,  recast the device type to an integer,    */
      /* then convert the integer to a Prolog integer.          */
      /*---------------------------------------------------------*/
      iInt1 = (unsigned char) Cref -> dev;
      if (! cp_message4((CP_RETRIEVE | AP_ARGUMENT |
                         CP_COMPARE | AP_INTEGER), Pref,
                         (union any_type *)(&iInt1), 1))
         return(AP_FAILURE);
      }
   else
      return(AP_FAILURE);

break;

/*---------------------------------------------------------------*/
/* Message is T_FSC.                                            */
/*---------------------------------------------------------------*/
case EL_FFSC :

/*---------------------------------------------------- ----*/
   /*Clear storage area                                       */
   /*---------------------------------------------------------*/
   for( i = 0; i < 80; i++ )
      uTmp1.c[ i ] = 0x00;

strncpy( uTmp1.c, "fsc\0", 4 );
   if (cp_message4((CP_COMPARE | AP_FUNCTOR),
                 Pref, &uTmp1, 1))
      {
      /*---------------------------------------------------------*/
      /* For the  argument of this functor,  get the            */
      /* argument  from the                                     */
      /* the functor, transpose then recast the fsc code        */
      /* into an integer, then convert the integer to a         */
      /* Prolog integer.                                        */
      /*---------------------------------------------------------*/
      lInt1 = (unsigned long)zm_swapi(Cref -> fsc);
      if (! cp_message4((CP_RETRIEVE | AP_ARGUMENT |
                         CP_COMPARE | AP_LONG), Pref,
                         (union any_type *)(&lInt1), 1))
         return(AP_FAILURE);
      }
   else
      return(AP_FAILURE);
   break;

/*---------------------------------------------------------------*/
/* Message is T_LENGTH.                                         */
/*---------------------------------------------------------------*/
case EL_FLENGTH :

/*---------------------------------------------------------*/
   /*Clear storage area                                       */
   /*---------------------------------------------------------*/
```

APPENDIX G

```c
    for( i = 0; i < 80; i++ )
        uTmp1.c[ i ] = 0x00;

strncpy( uTmp1.c, "length\0", 7 );
    if (cp_message4((CP_COMPARE | AP_FUNCTOR),
                Pref, &uTmp1, 1))
        {
        /*-----------------------------------------------------------*/
        /* For the  argument of this functor,  get the               */
        /* argument  from the                                        */
        /* the functor, transpose  then recast the entry's           */
        /* length into an                                            */
        /* integer, then convert the integer to a Prolog             */
        /* integer.                                                  */
        /*-----------------------------------------------------------*/
        iInt1 = (unsigned int)zm_swapi(Cref -> len);
        cp_message4((CP_RETRIEVE | AP_ARGUMENT | CP_COMPARE |
              AP_INTEGER), Pref, (union any_type *)(&iInt1), 1);
        }
    else
        return(AP_SUCCESS);
    break;

/*-----------------------------------------------------------------*/
/* Message is T_TIME.                                              */
/*-----------------------------------------------------------------*/
case EL_FTIME :

/*-----------------------------------------------------------------*/
    /*Clear storage area                                               */
    /*-----------------------------------------------------------------*/
    for( i = 0; i < 80; i++ )
        uTmp1.c[ i ] = 0x00;

strncpy( uTmp1.c, "time\0", 5 );
    if (cp_message4((CP_COMPARE | AP_FUNCTOR),
                Pref, &uTmp1, 7))
        {
        /*-----------------------------------------------------------*/
        /* For each argument of this functor,  get the               */
        /* argument  from the                                        */
        /* the functor, convert the BCD  to an integer,              */
        /* then convert the                                          */
        /* integer to a Prolog integer.                              */
        /*                                                           */
        /* Convert entry's year date to a Prolog integer.            */
        /*-----------------------------------------------------------*/
        iInt1 = (unsigned char)zm_bi2i((int)(Cref -> tod.year));
        cp_message4((CP_RETRIEVE | AP_ARGUMENT | CP_COMPARE |
              AP_INTEGER), Pref, (union any_type *)(&iInt1), 1);

/*-----------------------------------------------------------*/
        /* Convert entry's month date to a Prolog integer.           */
        /*-----------------------------------------------------------*/ iInt1 = (unsigned char)zm_bi2i((int)(Cref -> tod.month));
        cp_message4((CP_RETRIEVE | AP_ARGUMENT | CP_COMPARE |
              AP_INTEGER), Pref, (union any_type *)(&iInt1), 2);

/*-----------------------------------------------------------*/
        /* Convert entry's day  date to a Prolog integer.            */
        /*-----------------------------------------------------------*/
```

APPENDIX G

```
        iInt1 = (unsigned char)zm_bi2i((int)(Cref -> tod.day));
        cp_message4((CP_RETRIEVE | AP_ARGUMENT | CP_COMPARE |
            AP_INTEGER), Pref, (union any_type *)(&iInt1), 3);

/*-------------------------------------------------------*/
        /* Convert entry's hour  time to a Prolog integer.       */
        /*-------------------------------------------------------*/
        iInt1 = (unsigned char)zm_bi2i((int)(Cref -> tod.hour));
        cp_message4((CP_RETRIEVE | AP_ARGUMENT | CP_COMPARE |
            AP_INTEGER), Pref, (union any_type *)(&iInt1), 4);

/*-------------------------------------------------------*/
        /* Convert entry's minute time to a Prolog integer.      */
        /*-------------------------------------------------------*/
        iInt1 = (unsigned char)zm_bi2i((int)(Cref->tod.minute));
         cp_message4((CP_RETRIEVE | AP_ARGUMENT | CP_COMPARE |
            AP_INTEGER), Pref, (union any_type *)(&iInt1), 5);

/*-------------------------------------------------------*/
        /* Convert entry's second time to a Prolog integer.      */
        /*-------------------------------------------------------*/
        iInt1 = (unsigned char)zm_bi2i((int)(Cref->tod.second));
        cp_message4((CP_RETRIEVE | AP_ARGUMENT | CP_COMPARE |
            AP_INTEGER), Pref, (union any_type *)(&iInt1), 6);

/*-------------------------------------------------------*/
        /* Convert entry's second time to a Prolog integer.      */
        /*-------------------------------------------------------*/
        iInt1 = (unsigned char)zm_bi2i((int)(Cref->tod.hundsec));
          cp_message4((CP_RETRIEVE | AP_ARGUMENT | CP_COMPARE |
              AP_INTEGER), Pref, (union any_type *)(&iInt1), 7);
        }
     else
        return(AP_FAILURE);
     break;

/*-----------------------------------------------------------------*/
/* Message is EL_TFC                                               */
/*-----------------------------------------------------------------*/
case EL_TFC :

/*-------------------------------------------------------------*/
    /*Clear storage area                                           */
    /*-------------------------------------------------------------*/
    for( i = 0; i < 80; i++ )
        uTmp1.c[ i ] = 0x00;

strncpy( uTmp1.c, "product\0", 8 );
    if (cp_message4((CP_COMPARE | AP_FUNCTOR),
                 Pref, &uTmp1, 1))
       {
       /*----------------------------------------------------------*/
       /* For the  argument of this functor,  get the              */
       /* argument   from the                                      */
       /* the functor, recast the event type to an integer,        */
       /* then convert                                             */
       /* the integer to a Prolog integer.                         */
       /*----------------------------------------------------------*/
         iInt1 = files[ fh ].D.pfc;
         if (! cp_message4((CP_RETRIEVE | AP_ARGUMENT |
                              CP_COMPARE | AP_INTEGER), Pref,
                                (union any_type *)(&iInt1),1))
             return(AP_FAILURE);
```

APPENDIX G

```
          }
       else
          return(AP_FAILURE);
       break;

/*-----------------------------------------------------------*/
   /*  Message is EL_TSRC.                                      */
   /*-----------------------------------------------------------*/
   case EL_TSRC :

/*-----------------------------------------------------------*/
       /*Clear storage area                                         */
       /*-----------------------------------------------------------*/
       for( i = 0; i < 80; i++ )
          uTmp1.c[ i ] = 0x00;

strncpy( uTmp1.c, "src\0", 4 );

if (cp_message4((CP_COMPARE | AP_FUNCTOR),
                   Pref, &uTmp1, 1))
          {
          /*-----------------------------------------------------------*/
          /*  For the  argument of this functor,  get the              */
          /*  argument  from the                                       */
          /*  the functor, recast the event type to an integer,        */
          /*  then convert                                             */
          /*  the integer to a Prolog integer.                         */
          /*-----------------------------------------------------------*/
          strncpy( uTmp1.c, "2.3 \0", 6 );

// old code   if (! cp_message4((CP_RETRIEVE | AP_ARGUMENT |
//                                CP_COMPARE | AP_ATOM ), Pref,
//                                     &uTmp1, 1 ))
//              return(AP_FAILURE);

if( !cp_message4((CP_RETRIEVE | AP_ARGUMENT | CP_CONSTRUCT
                             | AP_ATOM ), Pref, &uTmp1, 1 ))

{
//printf( "uTmp1.c = %s\n", uTmp1.c );
              return(AP_FAILURE);
              }

}
       else
          return(AP_FAILURE);
       break;

/*-----------------------------------------------------------*/
   /*  Message is T_DATA . . .                                  */
   /*-----------------------------------------------------------*/
   case EL_TDATA :

/*-----------------------------------------------------------*/
       /*Clear storage area                                         */
       /*-----------------------------------------------------------*/
       for( i = 0; i < 80; i++ )
          uTmp1.c[ i ] = 0x00;
```

APPENDIX G

```
strncpy( uTmp1.c, "data\0", 5 );
if (cp_message4((CP_COMPARE | AP_FUNCTOR),
            Pref, &uTmp1, 2))
  {
  /*------------------------------------------------------------*/
  /* For this argument of the  functor, convert the            */
  /* sequence number                                           */
  /* of the event to a Prolog integer.                         */
  /*------------------------------------------------------------*/ cp_message4((CP_RETRIEVE | AP_ARGUMENT | CP_COMPARE |
       AP_INTEGER), Pref, (union any_type *)(&Cint), 1);

/*------------------------------------------------------------*/
  /* From the event type, determine  which function will       */
  /* finish the                                                */
  /* processing of the functor's  element. If an event         */
  /* occurs that                                               */
  /* is not listed below return an undefined variable.         */
  /*------------------------------------------------------------*/
  cp_message4((CP_RETRIEVE | AP_ARGUMENT),
                       Pref, (union any_type *)(&arI1), 2);

switch(Cref -> e_type)
      {
      /*------------------------------------------------------------*/
      /* HOST event.                                               */
      /*------------------------------------------------------------*/
      case ET_HOST:
         eli_hst2pf(arI1,Cref);
         break;

/*------------------------------------------------------------*/
      /* LMU event.                                                */
      /*------------------------------------------------------------*/
      case ET_IERR:
      case ET_MIPL:
      case ET_MINT:
      case ET_MIPM:
         eli_lmu2pf(arI1,Cref);
         break;

/*------------------------------------------------------------*/
      /* LSM event.                                                */
      /*------------------------------------------------------------*/
      case ET_SIOR:
      case ET_SERR:
      case ET_EVNT:
      case ET_SRSP:
      case ET_RQDP:
      case ET_OPDR:
      case ET_CLDR:
      case ET_GOHM:
      case ET_OPRT:
      case ET_IPLC:
      case ET_CLLA:
      case ET_OPLA:
      case ET_INTV:
      case ET_CILG:
         eli_lsm2pf(arI1,Cref);
         break;

/*------------------------------------------------------------*/
      /* DIAGNOSTIC event.                                         */
```

APPENDIX G

```
              /*-----------------------------------------------------*/
              case ET_DGON:
              case ET_DGOF:
                  eli_dgn2pf(arI1,Cref);
                  break;

/*-----------------------------------------------------*/
              /*  Unkown event.                                      */
              /*-----------------------------------------------------*/
              default:
                  iInt1 = 0;
                  cp_message3((CP_COMPARE | AP_INTEGER),
                              arI1, (union any_type *)(&iInt1) );
              }
          }
          break;
      /*---------------------------------------------------------------*/
      /*  Invalid message.                                             */
      /*---------------------------------------------------------------*/
      default :
          return(AP_FAILURE);
      }

//#endif /* debug */

/*-----------------------------------------------------------------*/
    /*   If there wasn't any major problems in the conversions         */
    /*   return ok                                                     */
    /*-----------------------------------------------------------------*/
    return(AP_SUCCESS);
    };

/*********************  START OF PROLOGUE    *********************/
/*                                                                 */
/*  FUNCTION NAME:   ELI_LMU2PF                                    */
/*                                                                 */
/*  Function Title: LMU Events to Prolog Functor                   */
/*                                                                 */
/*  Functional Description:                                        */
/*  Converts the lmu event data to one of the Prolog Functors -    */
/*  led(IE1,...,IEn)                                               */
/*  led(IPM,FSC)                                                   */
/*  led(FSC)                                                       */
/*  led(ISD,MCL,SCB,WES,HES,MES,MMS,MMM)                           */
/*  where:                                                         */
/*     IE?  Ipl Error(s)                                           */
/*     IPM                                                         */
/*     FSC  Fault Symtom Code                                      */
/*     ISD  Ipm Sense data iD                                      */
/*     MCL  Micro Code Level                                       */
/*     SCB  Status Code Byte                                       */
/*     WES  Wakeup Error Sense                                     */
/*     HES  Hardware Error Sense                                   */
/*     MES  Micro code Error Sense                                 */
/*     MMS  Master Mode Status                                     */
/*     MMM  Master Mode Message                                    */
/*                                                                 */
/*  Operational Description:                                       */
/*  First recast the  information into  a lmu response  structures */
/*  union, so that the information can be process correctly.  Then */
/*  match the Prolog  reference with the lmu  functor description. */
/*  If the match is  successful, then get the  first argument from */
/*  the functor, recast  the event type into a  temporary variable */
/*  and convert it to a  Prolog integer.  Then get the second arg- */
```

APPENDIX G

```
/* ument from the functor and  for each LMU event  type complete  */
/* the conversion.                                                 */
/* For the LMU IPL Errors event, determine the number of ipl err-  */
/* ors the unit had and  compare the number with  the maximum al-  */
/* lowed.  If the ipl errors  exceed the maximum allow then reas-  */
/* sign the  number of  ipl errors to  the maximum  number of ipl  */
/* errors.  Using the number of ipl errors, match the argument of  */
/* the functor  with the ipl  error functor  description.  If the  */
/* match is successful,  then for each ipl error,  transpose then  */
/* recast the error into the temporary  variable and convert that  */
/* into a Prolog integer.                                          */
/* For the LMU's  IPM Error event,  match the  ipm error  functor  */
/* description with  the argument  from the  LMU functor.  If the  */
/* match is  successful,  then get the  first argument  from that  */
/* functor, transpose and recast  the ipm unit id into the tempo-  */
/* rary variable and convert that  to a Prolog integer.  Next get  */
/* the second argument from the ipm functor, transpose and recast  */
/* the fsc (Fault  Symptom Code) into the  temporary variable and  */
/* convert that to a Prolog integer.                               */
/* For the  LMU Internal  Error event,  match the  internal error  */
/* functor description with the argument from the lmu functor. If  */
/* the match is successful,  then the argument from  the internal  */
/* error functor, transpose and recast the fsc into the temporary  */
/* variable and convert that to a Prolog integer.                  */
/* For the LMU's  IPM sense data  dump event,  match the argument  */
/* from the LMU functor with the  ipm sense data functor descrip-  */
/* tion.  If the match was successful,  then for each byte in the  */
/* sense data,  recast the  byte into the  temporary variable and  */
/* convert that to a Prolog integer.                               */
/*                                                                 */
/* A hierarchical structure of the functions in this file.  Func-  */
/* tions that have a double boarder  "===" are invoked from other  */
/* modules (source files).  Functions that have  a single boarder  */
/* "---" are invoked within this module and should not be invoked  */
/* from other modules.                                             */
/*                                                                 */
/*     +---------------+                                           */
/*     | eli_lmu2pf    |                                           */
/*     +---------------+                                           */
/*         |                                                       */
/*         |     +---------------+                                 */
/*         +->-| cp_message#   |                                   */
/*         |     +---------------+                                 */
/*         |                                                       */
/*         |     +---------------+                                 */
/*         +->-| zm_swapi      |                                   */
/*               +---------------+                                 */
/*                                                                 */
/*                                                                 */
/*                                                                 */
/*********************   END OF PROLOGUE   *********************/
/*-----------------------------------------------------------------*/
/* Pref   prolog classification pointer                            */
/* Cref   Pointer to event in error log as defined in m_struct.h   */
/*-----------------------------------------------------------------*/ int eli_lmu2pf( ref Pref, struct err_log *Cref )
    {

//    #if ((EL_DEBUG & EL_DLMU2PF) == EL_DLMU2PF)   /* debug */ ref   arI1;
      unsigned int   iCnt;
      unsigned int   iIplErr;
```

APPENDIX G

```
    unsigned long lTint1;
    unsigned int  iTint1;
    union LMU_RSP far *puLMUrsp;

/*-------------------------------------------------------------------*/
/* Recast the information into a structure that can be some sense*/
/* out of the event.                                              */
/*-------------------------------------------------------------------*/ puLMUrsp = (union LMU_RSP far *)(Cref -> data);

/*-------------------------------------------------------------------*/
/* For each LMU event type  match the event's functor description*/
/* with the argument of the LMU functor.                          */
/*-------------------------------------------------------------------*/
switch(Cref -> e_type)
    {

/*-------------------------------------------------------------------*/
    /* LMU ipl errors event.                                          */
    /*-------------------------------------------------------------------*/
    case ET_MIPL:

/*-------------------------------------------------------------------*/
        /* Determine how many errors to process.                          */
        /*-------------------------------------------------------------------*/
        iIplErr = (unsigned int)zm_swapi(puLMUrsp -> l.offset) / 2;
        if (iIplErr > IPL_ERRS)
           iIplErr = IPL_ERRS;

/*-------------------------------------------------------------------*/
        /* Using the number  of ipl errors,  match the ipl  error     */
        /* functor with the argument from the LMU functor.             */
        /*-------------------------------------------------------------------*/
        if (iIplErr == 0)
            cp_message4((CP_COMPARE | AP_FUNCTOR), Pref,
                                     ( union any_type * )"led", 1);
        else
            cp_message4((CP_COMPARE | AP_FUNCTOR), Pref,
                              ( union any_type * )"led", iIplErr);

/*-------------------------------------------------------------------*/
        /* For each argument  of the ipl  error functor  convert      */
        /* it to a Prolog integer.                                    */
        /*-------------------------------------------------------------------*/
        for(iCnt = 0; iCnt <= iIplErr; iCnt++)
            {
            if (iIplErr < iCnt)
               lTint1 = 0;
            else
               lTint1 = (long)zm_swapi(puLMUrsp->l.errors[iCnt]);
            cp_message4((CP_RETRIEVE | AP_ARGUMENT | CP_COMPARE |
                        AP_LONG), Pref,
                        ( union any_type * )&lTint1, iCnt+1);
            } break;

/*-------------------------------------------------------------------*/
    /* LMU ipm error event.                                           */
```

APPENDIX G

```
/*-------------------------------------------------------------*/
case ET_IERR:
    if (cp_message4((CP_COMPARE | AP_FUNCTOR), Pref,
                                    ( union any_type * )"led", 2))
    {
        /*-------------------------------------------------------------*/
        /* Convert the ipm unit id to a Prolog integer.          */
        /*-------------------------------------------------------------*/
        iTint1 = (unsigned int)zm_swapi((int)(puLMUrsp -> i));
        cp_message4((CP_RETRIEVE | AP_ARGUMENT | CP_COMPARE |
                    AP_INTEGER), Pref,
                    ( union any_type * )&iTint1, 1);

/*-------------------------------------------------------------*/
        /* Convert the FSC to a Prolog integer.                  */
        /*-------------------------------------------------------------*/
        lTint1 = (long)zm_swapi(Cref -> fsc);
        cp_message4((CP_RETRIEVE | AP_ARGUMENT | CP_COMPARE |
                    AP_LONG), Pref,
                    ( union any_type * )&lTint1, 2);
    }
    break;

/*-------------------------------------------------------------*/
/* LMU internal error event.                                   */
/*-------------------------------------------------------------*/
case ET_MINT:
    if (cp_message4((CP_COMPARE | AP_FUNCTOR), Pref,
                                    ( union any_type * )"led", 1))
    {
        /*-------------------------------------------------------------*/
        /* Convert the FSC to a Prolog integer.                  */
        /*-------------------------------------------------------------*/
        lTint1 = (long)zm_swapi(Cref -> fsc);
        cp_message4((CP_RETRIEVE | AP_ARGUMENT | CP_COMPARE |
                    AP_LONG), Pref,
                    ( union any_type * )&lTint1, 1);
    }
    break;

/*-------------------------------------------------------------*/
/* LMU ipm sense data dump event.                              */
/*-------------------------------------------------------------*/
case ET_MIPM:
    if (cp_message4((CP_COMPARE | AP_FUNCTOR), Pref,
                                    ( union any_type * )"led", 8))
    {
        /*-------------------------------------------------------------*/
        /* Convert the ipm sense logging id to a Prolog integer.*/
        /*-------------------------------------------------------------*/
        iTint1 = (unsigned int)(puLMUrsp -> s.log_id & 0x1F);
        cp_message4((CP_RETRIEVE | AP_ARGUMENT | CP_COMPARE |
                    AP_INTEGER), Pref,
                    ( union any_type * )&iTint1, 1);

/*-------------------------------------------------------------*/
        /* Convert the ipm micro code level to a Prolog integer.*/
        /*-------------------------------------------------------------*/
        iTint1 = (unsigned int)(puLMUrsp -> s.micr_lev);
        cp_message4((CP_RETRIEVE | AP_ARGUMENT | CP_COMPARE |
                    AP_INTEGER), Pref,
                    ( union any_type * )&iTint1, 2);
```

APPENDIX G

```
        /*----------------------------------------------------------*/
        /* Convert the ipm status code byte to a Prolog integer.*/
        /*----------------------------------------------------------*/
        iTint1 = (unsigned int)(puLMUrsp -> s.ipm_stat);
        cp_message4((CP_RETRIEVE | AP_ARGUMENT | CP_COMPARE |
                    AP_INTEGER), Pref,
                    ( union any_type * )&iTint1, 3);

/*----------------------------------------------------------*/
        /*Convert the ipm wakeup error byte to a Prolog integer */
        /*----------------------------------------------------------*/
        iTint1 = (unsigned int)(puLMUrsp -> s.wakup_er);
        cp_message4((CP_RETRIEVE | AP_ARGUMENT | CP_COMPARE |
                    AP_INTEGER), Pref,
                    ( union any_type * )&iTint1, 4);

/*----------------------------------------------------------*/
        /* Convert the ipm hardware error byte to a Prolog      */
        /* integer.                                             */
        /*----------------------------------------------------------*/
        iTint1 = (unsigned int)(puLMUrsp -> s.hdwr_er);
        cp_message4((CP_RETRIEVE | AP_ARGUMENT | CP_COMPARE |
                    AP_INTEGER), Pref,
                    ( union any_type * )&iTint1, 5);

/*----------------------------------------------------------*/
        /* Convert the ipm micro code error byte to a Prolog    */
        /* integer.                                             */
        /*----------------------------------------------------------*/
        iTint1 = (unsigned int)(puLMUrsp -> s.micr_er);
        cp_message4((CP_RETRIEVE | AP_ARGUMENT | CP_COMPARE |
                    AP_INTEGER), Pref,
                    ( union any_type * )&iTint1, 6);

/*----------------------------------------------------------*/
        /*  Convert the ipm master mode status byte to a Prolog */
        /*  integer.                                            */
        /*----------------------------------------------------------*/
        iTint1 = (unsigned int)(puLMUrsp -> s.mipm_sta);
        cp_message4((CP_RETRIEVE | AP_ARGUMENT | CP_COMPARE |
                    AP_INTEGER), Pref,
                    ( union any_type * )&iTint1, 7);

/*----------------------------------------------------------*/
        /*  Convert the ipm master mode message to a Prolog     */
        /*  integer                                             */
        /*----------------------------------------------------------*/
        iTint1 = (unsigned int)(puLMUrsp -> s.mipm_msg);
        cp_message4((CP_RETRIEVE | AP_ARGUMENT | CP_COMPARE |
                    AP_INTEGER), Pref,
                    ( union any_type * )&iTint1, 8);

}
    break;

/*----------------------------------------------------------------*/
/* Otherwise the Prolog reference is not a functor.            */
/*----------------------------------------------------------------*/
default:
    break;
}
```

APPENDIX G

```
//#endif /* debug */ return(AP_SUCCESS);
   }

/********************* START OF PROLOGUE    *********************/
/*                                                               */
/* FUNCTION NAME:    ELI_LSM2PF                                  */
/*                                                               */
/* Function Title:   LSM events to Prolog Functor                */
/*                                                               */
/* Functional Description:                                       */
/* Converts the lsm event data to one of the Prolog Functors -   */
/* led(HSN,ERT,ERD)                                              */
/* led(HSN,ED1,...,EDn)                                          */
/* led(HSN,ERT,ERD)                                              */
/* led(DT)                                                       */
/* led(DT,IMS)                                                   */
/* led(DT)                                                       */
/* led(DT,IE1,...,IEn)                                           */
/* where:                                                        */
/*     ERT  Event Response Type                                  */
/*     ERD  Event Response Data                                  */
/*     HSN  Host Sequence Number                                 */
/*     ED?  Event Dataum                                         */
/*     DT   Device Type                                          */
/*     IMS  Inopoerative mechanisms                              */
/*     IE?  Ipl Errors                                           */
/*                                                               */
/* Operational Description:                                      */
/* Based on the type of event,  match the lsm functor description*/
/* that is associate that event with the Prolog reference. If the*/
/* match is  successful,  then get  the  first argument  from that*/
/* functor, recast the event type into the temporary variable and*/
/* convert that to  a Prolog integer.  Next get  the second argu- */
/* ment from the lsm functor and based on the event type, process*/
/* the argument according.                                       */
/* For the LSM error  response  (with event buffers),  recast the*/
/* information into the lsm response  structures union so that it*/
/* can  be  interpreted  correctly.   Then  get  the  third argument*/
/* from the lsm functor, translate the host sequence id to an in-*/
/* teger and assign it  to a temporary variable  and convert that*/
/* to a Prolog integer.  Next, match  the error  response functor*/
/* description  with the 2nd  argument from  the lsm functor.  If*/
/* the match was  successful  then get the  1st argument from the*/
/* error response functor, recast the response type (found as the*/
/* function id in the response preamble), compare it with the re-*/
/* sponse CAPMODE,  if the compare is successful reassign the re-*/
/* sponse type with one of the CAP  responses and convert the re-*/
/* sponse  type to a  Prolog integer.  Then get the  2nd argument*/
/* from the error  response functor  and with the  response type,*/
/* process the argument by invoking  the function that is associ-*/
/* ated the response type in question.                           */
/* For the LSM error events response, recast the information into*/
/* the event buffer structures so that it can be interpreted cor-*/
/* rectly.   Then get the  third argument  from the  lsm functor,*/
/* translate the host sequence id  to an integer and assign it to*/
/* temporary variable and convert that to a Prolog integer.  Next*/
/* transpose  the event buffer  length into a  temporary variable*/
/* and set counter  variables to  0 and 1.  Then enter  a loop to*/
/* count the number of events that are in the buffer. Next trans-*/
/* late the number of events to  a character string and match the*/
/* event buffer functor  description (using the  number of events*/
```

APPENDIX G

```
/*  as part of the  description) with the 2nd  argument of the lsm    */
/*  functor. If the match  is successful, then  for each argument     */
/*  in the event buffer functor,  transpose the integer located at    */
/*  offset specified  to a temporary variable  and assign the add-    */
/*  ress of the buffer  (starting  at the offset  specified) to an    */
/*  address variable.  Then determine  which event buffer function    */
/*  to invoke based on the value of the temporary variable.           */
/*  For the LSM error response (without event buffers), recast the    */
/*  information into  the lsm  response structures  union, get the    */
/*  3rd argument from the lsm functor, translate the host sequence    */
/*  number string to  an integer and convert  that to a Prolog in-    */
/*  teger.  Next match the error  response (without event buffers)    */
/*  with the 2nd  argument from the  lsm functor.  If the match is    */
/*  successful, then get the 1st argument from the functor, recast    */
/*  the response type and convert it to a Prolog integer.  Get the    */
/*  2nd argument from the functor  and for each response type, in-    */
/*  voke the function that is associated with that response.          */
/*  For the LSM inoperative reset response,  match the inoperative    */
/*  reset functor  description with the 2nd  argument from the lsm    */
/*  functor. If the match succeeds  then get the argument from the    */
/*  inoperative reset functor,  recast the device into a temporary    */
/*  variable and convert it to a Prolog integer.                      */
/*  For the LSM  operational change response,  recast the informa-    */
/*  tion into the unsolicated messages, match the unsolicated mes-    */
/*  sages functor  description with the 2nd  argument from the lsm    */
/*  functor.  If the match succeeds, get the 1st argument from the    */
/*  unsolicated messages functor,  recast the  device type  into a    */
/*  temporary variable  and convert it to a  Prolog integer.  Next    */
/*  get the 2nd argument from the unsolicated message functor, re-    */
/*  cast the mechanism id into a temporary variable and convert it    */
/*  to a Prolog integer.                                              */
/*  For the LSM ipl complete response, recast the information into    */
/*  the ipl log structure, transpose and recast the number of err-    */
/*  or into a temporary variable.  Then determine if the number of    */
/*  errors are greater than the  maximum limit, if so set the num-    */
/*  ber of errors to the maximum limit.  Next determine the number    */
/*  of arguments  to be  defined in  the ipl complete  functor de-    */
/*  scription and match  the argument reference  with the ipl com-    */
/*  plete functor description.  If the match succeeds, get the 1st    */
/*  argument from the ipl complete functor, recast the device type    */
/*  to a temporary  variable and  convert it to a  Prolog integer.    */
/*  Then for each remaining argument  of the ipl complete functor,    */
/*  get the argument from the  functor, determine if the number of    */
/*  errors are less than the current  argument index (this is only    */
/*  useful if there are no errors to process), if so then set the     */
/*  temporary  variable to 0,  otherwise transpose  and recast the    */
/*  ipl error into the temporary  variable.  Convert the temporary    */
/*  variable to a Prolog integer.                                     */
/*  For the LSM unsolicated  messages, match the  unsolicated mes-    */
/*  sage functor description with  the argument reference from the    */
/*  lsm functor.  If the match succeeds, get the argument from the    */
/*  unsolicated  message functor,  recast the  device  type into a    */
/*  temporary vari le and convert it to a Prolog integer.             */
/*  For the unknown LSM event, do nothing.                            */
/*                                                                    */
/*  A hierarchical structure of the functions in this file.  Func-    */
/*  tions that have a double boarder  "===" are invoked from other    */
/*  modules (source files).  Functions that have  a single boarder    */
/*  "---" are invoked within this module and should not be invoked    */
/*  from other modules.                                               */
/*                                                                    */
/*      +---------------+                                             */
/*      | eli_lsm2pf    |                                             */
/*      +---------------+                                             */
```

APPENDIX G

```
/*           |                          */
/*           |   +--------------+       */
/*        +->-|  cp_message#  |        */
/*           |   +--------------+       */
/*           |                          */
/*           |   +--------------+       */
/*        +->-|  zm_as2i      |        */
/*           |   +--------------+       */
/*           |                          */
/*           |   +--------------+       */
/*        +->-|  itoa         |        */
/*           |   +--------------+       */
/*           |                          */
/*           |   +--------------+       */
/*        +->-|  zm_swapi     |        */
/*           |   +--------------+       */
/*           |                          */
/*           |   +--------------+       */
/*        +->-|  eli_sei2pf   |        */
/*           |   +--------------+       */
/*           |                          */
/*           |   +--------------+       */
/*        +->-|  eli_sem2pf   |        */
/*           |   +--------------+       */
/*           |                          */
/*           |   +--------------+       */
/*        +->-|  eli_sec2pf   |        */
/*           |   +--------------+       */
/*           |                          */
/*           |   +--------------+       */
/*        +->-|  eli_sep2pf   |        */
/*           |   +--------------+       */
/*           |                          */
/*           |   +--------------+       */
/*        +->-|  eli_set2pf   |        */
/*           |   +--------------+       */
/*           |                          */
/*           |   +--------------+       */
/*        +->-|  eli_ses2pf   |        */
/*           |   +--------------+       */
/*           |                          */
/*           |   +--------------+       */
/*        +->-|  eli_sed2pf   |        */
/*           |   +--------------+       */
/*           |                          */
/*           |   +--------------+       */
/*        +->-|  eli_svs2pf   |        */
/*           |   +--------------+       */
/*           |                          */
/*           |   +--------------+       */
/*        +->-|  eli_sve2pf   |        */
/*           |   +--------------+       */
/*           |                          */
/*           |   +--------------+       */
/*        +->-|  eli_sri2pf   |        */
/*           |   +--------------+       */
/*           |                          */
/*           |   +--------------+       */
/*        +->-|  eli_src2pf   |        */
/*           |   +--------------+       */
/*           |                          */
/*           |   +--------------+       */
/*        +->-|  eli_sro2pf   |        */
/*               +--------------+       */
```

APPENDIX G

```c
/*                                                                      */
/*                                                                      */
/*                                                                      */
/*********************  END OF PROLOGUE   *********************/
/*----------------------------------------------------------------------*/
/* Pref   Prolog classification functor                                 */
/* Cref   Pointer to event data in error log as defined in m_struct.h   */
/*----------------------------------------------------------------------*/ int eli_lsm2pf( ref Pref, struct err_log *Cref )
    {

//#if ((EL_DEBUG & EL_DLSM2PF) == EL_DLSM2PF) /* debug */ ref arI1, arI2;      /* reference of arguments to class functor */ unsigned int  iInt2, iInt3, iInt4;
    unsigned int  iCnt;
    unsigned int  iTint1;
    unsigned long lTint1;

unsigned int     far *psInt;
    unsigned int         iFunctorArity;
    unsigned int         iOffsetCount;

struct unsl_msg far *psPtr1;
    struct ipl_log  far *psPtr2;
    struct err_rsp  far *psPtr4;
    struct lsm_err  far *psLSMerr;
    struct rsp_prea far *psRspPre;
    struct evnt_buf far *psEvent;

struct PO sF;
    union  LSM_RSP far *puLSMrsp;

/*------------------------------------------------------------------*/
    /* For each LSM event  type, match it's  functor description with   */
    /* the 2nd argument of the lsm functor.                             */
    /*------------------------------------------------------------------*/
    switch(Cref -> e_type)
        {
        /*--------------------------------------------------------------*/
        /* LSM error response (with events to follow). . .              */
        /*--------------------------------------------------------------*/
        case ET_SERR :
            {

/*----------------------------------------------------------*/
            /* Recast the information into the  following structures,   */
            /* so that                                                  */
            /* some sense can be made out of the event.                 */
            /*----------------------------------------------------------*/
            psLSMerr = (struct lsm_err far *)(Cref -> data);
            puLSMrsp = (union LSM_RSP far *)&(psLSMerr -> s);
            psRspPre = (struct rsp_prea far *)(puLSMrsp);

/*----------------------------------------------------------*/
            /* Convert the host sequence id to a Prolog integer.        */
            /*----------------------------------------------------------*/
            if (cp_message4((CP_COMPARE | AP_FUNCTOR), Pref,
                                        ( union any_type * )"led", 3))
                {
                lTint1 = (long)zm_as2i(psLSMerr -> sqnum,SQLEN);
```

APPENDIX G

```
cp_message4((CP_RETRIEVE | AP_ARGUMENT | CP_COMPARE |
             AP_LONG), Pref,
             ( union any_type * )&lTint1, 1);

/*------------------------------------------------------*/
/* Convert the response type to a Prolog integer.       */
/*------------------------------------------------------*/
iInt2 = (unsigned char)(psRspPre -> funcid & ~RECEIVE);
if (iInt2 == CAPMODE)
    iInt2 = (unsigned char)(puLSMrsp -> cr.misc);
cp_message4((CP_RETRIEVE | AP_ARGUMENT | CP_COMPARE |
             AP_INTEGER), Pref,
             ( union any_type * )&iInt2, 2);

/*------------------------------------------------------*/
/* For each error response type, invoke the function    */
/* that is as-                                          */
/* sociated with the response type.                     */
/*------------------------------------------------------*/
cp_message4((CP_RETRIEVE | AP_ARGUMENT), Pref,
                            ( union any_type * )&arI1, 3);

switch(iInt2)
    {
    /*------------------------------------------------------*/
    /*   Initialize LSM response.                           */
    /*------------------------------------------------------*/
    case INITLSM:
        eli_sei2pf(arI1,puLSMrsp);
        break;

/*------------------------------------------------------*/
    /* Move mechanism response.                             */
    /*------------------------------------------------------*/
    case GOHOME:
    case MVARM:
    case MVREAD:
    case MVPUT:
    case MVRDGET:
        eli_sem2pf(arI1,puLSMrsp);
        break;

/*------------------------------------------------------*/
    /* Cap mode response.                                   */
    /*------------------------------------------------------*/
    case UNLKCAP:
    case LOCKCAP:
    case CAPMODE:
    case CAP_ENTR:
    case CAP_EJCT:
    case CAP_IDLE:
        eli_sec2pf(arI1,puLSMrsp);
        break;

/*------------------------------------------------------*/
    /* Pass Through Port response.                          */
    /*------------------------------------------------------*/
    case PASTHRU :
        eli_sep2pf(arI1,puLSMrsp);
        break;

/*------------------------------------------------------*/
    /*   Tape Drive Command response.                       */
    /*------------------------------------------------------*/
```

APPENDIX G

```
        case TDCMD   :
            eli_set2pf(arI1,puLSMrsp);
            break;

/*------------------------------------------------------*/
        /*  Request system state response.                      */
        /*------------------------------------------------------*/
        case RQSTATE :
            eli_ses2pf(arI1,puLSMrsp);
            break;

/*------------------------------------------------------*/
        /*  Diagnotisc control response.                        */
        /*------------------------------------------------------*/
        case DIAG_CTL:
            eli_sed2pf(arI1,puLSMrsp);
            break;

/*------------------------------------------------------*/
        /*  Invalid response.                                   */
        /*------------------------------------------------------*/
        default :
            break;

}
    }
  }
  break;

/*----------------------------------------------------------------*/
/*  LSM event buffer response.                                    */
/*----------------------------------------------------------------*/
case ET_EVNT :
    {

/*------------------------------------------------------------*/
    /*  Recast the information into the  following structures,    */
    /*  so that some sense can be made out of the event.          */
    /*------------------------------------------------------------*/
    psLSMerr = (struct lsm_err far *)(Cref -> data);
    psPtr4   = (struct err_rsp far *)&(psLSMerr -> s.ebuf);
    psEvent  = (struct evnt_buf far *)&(psPtr4 -> evnt_r_b);

/*------------------------------------------------------------*/
    /*  Initialize loop conditional parameters.                   */
    /*------------------------------------------------------------*/
    iInt2 = (unsigned int)zm_swapi(psEvent -> evnt_cnt);
    iOffsetCount  = 0;
    iFunctorArity = 0;

/*------------------------------------------------------------*/
    /*  Count the number of events in the event buffer.           */
    /*------------------------------------------------------------*/
    while ((iOffsetCount < iInt2) && (iFunctorArity < 9))
        { iInt3 = (unsigned int)
                    zm_swapi(psEvent -> buffer[iOffsetCount]);

if (iInt3 & 0xC000)
```

// pre 2.3

APPENDIX G

```
//         iOffsetCount += (iInt3 & 0xFF00) >> 8;

iOffsetCount += (iInt3 & 0x00FF);
        else
           iOffsetCount += 2;

iFunctorArity++;
      }

/*----------------------------------------------------------*/
   /* Match the event functor description with the argument. */
   /*----------------------------------------------------------*/
   if (cp_message4((CP_COMPARE | AP_FUNCTOR),
                Pref,
                ( union any_type * )"led", iFunctorArity+1))
      {
      /*----------------------------------------------------------*/
      /* Convert the host sequence id to a Prolog integer.    */
      /*----------------------------------------------------------*/
      lTint1 = (long)zm_as2i(psLSMerr -> sqnum,SQLEN);
      cp_message4((CP_RETRIEVE | AP_ARGUMENT | CP_COMPARE |
                   AP_LONG), Pref,
                   ( union any_type * )&lTint1, 1);

/*----------------------------------------------------------*/
      /* For each argument  of the event functor,  invoke    */
      /* the  function that is associated with the type of   */
      /* event.                                              */
      /*----------------------------------------------------------*/
      for(iInt2 = 1,iOffsetCount = 0;
                     iInt2 <= iFunctorArity;
                                          iInt2++)
         {
         cp_message4((CP_RETRIEVE | AP_ARGUMENT), Pref,
                       ( union any_type * )&arI1, iInt2+1);

iInt3 = (unsigned int)
                       zm_swapi(psEvent->buffer[iOffsetCount]);

psInt = ( unsigned far * )
                 &(psEvent -> buffer[iOffsetCount]);

/*----------------------------------------------------------*/
         /* Operational (statistical) error event.           */
         /*----------------------------------------------------------*/
         if (iInt3 & 0xC000)
            {
            eli_svs2pf(arI1, ( union LSM_0A far * )psInt);
//2.3            iOffsetCount += (iInt3 & 0xFF00) >> 8;
                 iOffsetCount += (iInt3 & 0x00FF);
            }

/*----------------------------------------------------------*/
         /* Mechanism error event.                              */
         /*----------------------------------------------------------*/
         else
            {
            eli_sve2pf(arI1, ( union LSM_0A far * )psInt);
            iOffsetCount += 2;
            }
         }
      }
```

APPENDIX G

```
        /*------------------------------------------------------*/
        /*  If the functor  did not match the description  given,  */
        /*  return a failing status.                               */
        /*------------------------------------------------------*/
        } break;

/*------------------------------------------------------------*/
/*  LSM error response (without event buffers).               */
/*------------------------------------------------------------*/
case ET_SRSP:
    {
        /*------------------------------------------------------*/
        /*  Recast the information into the  following structures, */
        /*  so that some sense can be made out of the event.       */
        /*------------------------------------------------------*/
        psLSMerr = (struct lsm_err far *)(Cref -> data);
        puLSMrsp = (union LSM_RSP far *)&(psLSMerr -> s);
        psRspPre = (struct rsp_prea far *)(puLSMrsp);

/*------------------------------------------------------*/
        /*  Convert the host sequence id to a Prolog integer.     */
        /*------------------------------------------------------*/
        if (cp_message4((CP_COMPARE | AP_FUNCTOR), Pref,
                                    ( union any_type * )"led", 3))
            {
            lTint1 = (long)zm_as2i(psLSMerr -> sqnum,SQLEN);
            cp_message4((CP_RETRIEVE | AP_ARGUMENT | CP_COMPARE |
                        AP_LONG), Pref,
                        ( union any_type * )&lTint1, 1);

/*------------------------------------------------------*/
            /* Convert the response type to a Prolog integer.        */
            /*------------------------------------------------------*/
            iInt2 = (unsigned char)(psRspPre -> funcid & ~RECEIVE);
            cp_message4((CP_RETRIEVE | AP_ARGUMENT | CP_COMPARE |
                        AP_INTEGER), Pref,
                        ( union any_type * )&iInt2, 2);

/*------------------------------------------------------*/
            /*  For each error response type,  invoke the function   */
            /*  that is associated with that response.               */
            /*------------------------------------------------------*/
            cp_message4((CP_RETRIEVE | AP_ARGUMENT), Pref,
                                        ( union any_type * )&arI1, 3);
            switch(iInt2)
                {
                /*------------------------------------------------------*/
                /*  Request In-Transit response.                         */
                /*------------------------------------------------------*/
                case RQINTRN:
                    eli_sri2pf(arI1,puLSMrsp);
                    break;

/*------------------------------------------------------*/
                /*  Request configuration response.                      */
                /*------------------------------------------------------*/
                case RQCNFIG:
                    eli_src2pf(arI1,puLSMrsp);
                    break;

/*------------------------------------------------------*/
```

APPENDIX G

```c
        /* Reset door, vary online, offline or       */
        /* maintenance, or command nop responses.    */
        /*--------------------------------------------*/
        case RSTDOOR:
        case VRYONLN:
        case VRYOFLN:
        case VRYMANT:
        case CMNDNOP:
            eli_sro2pf(arIl,puLSMrsp);
            break;

/*--------------------------------------------*/
        /* Invalid response.                          */
        /*--------------------------------------------*/
        default:
            break;
        }
      }
    }
    break;

/*------------------------------------------------------*/
/* LSM inoperative reset response.                      */
/*------------------------------------------------------*/
case ET_SIOR :
    /*--------------------------------------------------*/
    /* Match the argument reference with the inoperative */
    /* reset functor description.                       */
    /*--------------------------------------------------*/
    if (cp_message4((CP_COMPARE | AP_FUNCTOR), Pref,
                                ( union any_type * )"led", 1))
        {
        /*----------------------------------------------*/
        /* Convert the device type to a Prolog integer. */
        /*----------------------------------------------*/
        iTint1 = (int)(Cref -> dev);
        cp_message4((CP_RETRIEVE | AP_ARGUMENT | CP_COMPARE |
                    AP_INTEGER), Pref,
                    ( union any_type * )&iTint1, 1);
        }
    break;

/*------------------------------------------------------*/
/* LSM operational change response.                     */
/*------------------------------------------------------*/
case ET_OPRT :
    {
    /*--------------------------------------------------*/
    /* Recast the information into the following structures, */
    /* so that some sense can be made out of the event. */
    /*--------------------------------------------------*/
    psPtr1 = (struct unsl_msg far *)(Cref -> data);

/*--------------------------------------------------*/
    /* Match the argument reference with the unsolicated */
    /* message functor description.                     */
    /*--------------------------------------------------*/
    if (cp_message4((CP_COMPARE | AP_FUNCTOR), Pref,
                                ( union any_type * )"led", 2))
        {

/*----------------------------------------------*/
        /* Convert the device type to a Prolog integer. */
```

APPENDIX G

```
        /*-------------------------------------------------------*/
        iTint1 = (int)(Cref -> dev);
        cp_message4((CP_RETRIEVE | AP_ARGUMENT | CP_COMPARE |
                    AP_INTEGER), Pref,
                    ( union any_type * )&iTint1, 1);

/*-------------------------------------------------------*/
        /* Convert the inoperative mechanism to a Prolog functor*/
        /*-------------------------------------------------------*/
        iTint1 = (int)(psPtr1 -> msg_mod);
        cp_message4((CP_RETRIEVE | AP_ARGUMENT | CP_COMPARE |
                    AP_INTEGER), Pref,
                    ( union any_type * )&iTint1, 2);
        }
    }
    break;

/*-----------------------------------------------------------------*/
/*  LSM ipl complete response.                                     */
/*-----------------------------------------------------------------*/
case ET_IPLC :
    {

/*-------------------------------------------------------------*/
    /*  Recast the information into the  following structures, */
    /*  so that some sense can be made out of the event.       */
    /*-------------------------------------------------------------*/
    psPtr1 = (struct unsl_msg far *)(Cref -> data);
    psPtr2 = (struct ipl_log  far *)(&(psPtr1 -> msg_data.ipl_c));

/*-------------------------------------------------------------*/
    /*  Determine the number of errors that occured in the ipl.*/
    /*-------------------------------------------------------------*/
    iInt2 = (unsigned int)zm_swapi(psPtr2 -> offset) / 2;
    if (iInt2 > IPL_ERRS)
        iInt2 = IPL_ERRS;

/*-------------------------------------------------------------*/
    /* Determine the number of arguments for the ipl complete  */
    /* functor description and match it with  the argument     */
    /* reference from the lsm functor.                         */
    /*-------------------------------------------------------------*/
    if (iInt2 == 0)
        iInt3 = 2;
    else
        iInt3 = iInt2 + 1;

if (cp_message4((CP_COMPARE | AP_FUNCTOR), Pref,
                                ( union any_type * )"led",iInt3))
        {
        /*---------------------------------------------------------*/
        /*  Convert the device type to a Prolog integer.       */
        /*---------------------------------------------------------*/
        iTint1 = (int)(Cref -> dev);
        cp_message4((CP_RETRIEVE | AP_ARGUMENT | CP_COMPARE |
                    AP_INTEGER), Pref,
                    ( union any_type * )&iTint1, 1);

/*---------------------------------------------------------*/
        /* For each  remaining  argument in  the functor       */
        /* convert then to Prolog integers.                    */
        /*---------------------------------------------------------*/
        for(iCnt = 2; iCnt <= iInt3; iCnt++)
```

APPENDIX G

```
            {
            if (iInt2 < (iCnt-1))
               iInt4 = 0;
            else
               iInt4 = (unsigned int)
                                zm_swapi(psPtr2->errors[iCnt-1]);

cp_message4((CP_RETRIEVE | AP_ARGUMENT |
                         CP_COMPARE | AP_INTEGER),
                        Pref,( union any_type * )&iInt4, iCnt);
            }
         }
      }
      break;

/*---------------------------------------------------------------*/
   /* LSM unsolicated messages response.                            */
   /*---------------------------------------------------------------*/
   case ET_RQDP :
   case ET_OPDR :
   case ET_CLDR :
   case ET_GOHM :
   case ET_CLLA :
   case ET_OPLA :
   case ET_INTV :
   case ET_CILG :
      /*---------------------------------------------------------------*/
      /* Match the  unsolicated  message functor  description          */
      /* with the argument reference from the lsm functor.             */
      /*---------------------------------------------------------------*/
      if (cp_message4((CP_COMPARE | AP_FUNCTOR), Pref,
                                    ( union any_type * )"led", 1))
         {
         /*---------------------------------------------------------------*/
         /* Convert the device type to a Prolog integer.                  */
         /*---------------------------------------------------------------*/
         iTint1 = (int)(Cref -> dev);
         cp_message4((CP_RETRIEVE | AP_ARGUMENT | CP_COMPARE |
                     AP_INTEGER), Pref,
                     ( union any_type * )&iTint1, 1);
         }
      break;

/*---------------------------------------------------------------*/
   /* Unknown event type.                                           */
   /*---------------------------------------------------------------*/
   default:
      break;
   }

/*---------------------------------------------------------------*/
   /* If all of the  conversions were successful  then return a suc-*/
   /* cessful status.                                               */
   /*---------------------------------------------------------------*/
//#endif /* debug */ return(AP_SUCCESS);
   }
```

APPENDIX G

```
/*********************** START OF PROLOGUE    ***********************/
/*                                                                  */
/*  FUNCTION NAME:    ELI_SVS2PF                                    */
/*                                                                  */
/*  Function Title:   lSm's eVent Statistic data to Prolog Functor  */
/*                                                                  */
/*  Functional Description:                                         */
/*  Converts the event statistic data to the Prolog Functor -       */
/*  s(SE1,..SEn)                                                    */
/*  where                                                           */
/*     SE?  Statistic Event ?                                       */
/*                                                                  */
/*  Operational Description:                                        */
/*  Transpose and recast the statistical command word into a temp-  */
/*  orary variable, then mask and shift the contents of the tempo-  */
/*  rary variable  into another  temporary variable  and translate  */
/*  that into a string that will be used in the following match.    */
/*  Match the event statistical data response functor  description  */
/*  with the Prolog  reference.  If the match  is successful  then  */
/*  for each arguments in the event  statistical data functor, get  */
/*  the argument from the functor, transpose and recast the infor-  */
/*  mation into  a temporary  variable and convert  it to a Prolog  */
/*  integer.                                                        */
/*                                                                  */
/*  A hierarchical structure of the functions in this file.  Func-  */
/*  tions that have a double boarder  "===" are invoked from other  */
/*  modules (source files).  Functions that have  a single boarder  */
/*  "---" are invoked within this module and should not be invoked  */
/*  from other modules.                                             */
/*                                                                  */
/*     +---------------+                                            */
/*     | eli_svs2pf    |                                            */
/*     +---------------+                                            */
/*         |                                                        */
/*         |   +---------------+                                    */
/*         +->-| cp_message#   |                                    */
/*         |   +---------------+                                    */
/*         |                                                        */
/*         |   +---------------+                                    */
/*         +->-| zm_swapi      |                                    */
/*             +---------------+                                    */
/*                                                                  */
/*                                                                  */
/*                                                                  */
/*********************** END OF PROLOGUE      ***********************/
/*------------------------------------------------------------------*/
/* Cref  Lsm event type 0a as defined p_eli2ap.h                    */
/*------------------------------------------------------------------*/ int eli_svs2pf( ref Pref, union LSM_0A far *Cref )
    {

//#if ((EL_DEBUG & EL_DSVX2PF) == EL_DSVX2PF) /* debug */ unsigned int  iInt1 = 0;
    unsigned int  iInt2 = 0;
    unsigned int  iCnt  = 0;

/*--------------------------------------------------------------*/
    /* Transpose, mask, shift and translate the command word for it's*/
    /* length                                                       */
    /* Note: code will  have to be  added for the  differences in 2.1*/
    /*       and 2.2.                                               */
```

APPENDIX G

```
/*-----------------------------------------------------------------*/
// modified for 2.3 format iInt2 = ( unsigned int ) zm_swapi( Cref -> s.command );

iInt1 = ( unsigned int ) ( iInt2 & 0x00FF );

/*-----------------------------------------------------------------*/
    /* Match functor description with Prolog reference.              */
    /*-----------------------------------------------------------------*/
    if( cp_message4( ( CP_COMPARE | AP_FUNCTOR ), Pref,
                                     ( union any_type * )"s", iInt1 ) )
       {
       /*-----------------------------------------------------------------*/
       /* For the 1st argument (the command identifier)  of the      */
       /* functor convert the command identifier  into a Prolog      */
       /* integer.                                                   */
       /* Note: code will  have to be  added for the  differences in */
       /*       2.1 and 2.2.                                         */
       /*                                                            */
       /*-----------------------------------------------------------------*/
       iInt2 = ( unsigned int )( iInt2 & 0xFF00 );

cp_message4((CP_RETRIEVE | AP_ARGUMENT | CP_COMPARE |
                    AP_INTEGER), Pref,
                    ( union any_type * )&iInt2, 1);

/*-----------------------------------------------------------------*/
       /*  For each argument of the functor, convert the information */
       /*  into a Prolog integer.                                    */
       /*-----------------------------------------------------------------*/
       for(iCnt = 1; iCnt < iInt1; iCnt++)
           {
           iInt2 = (unsigned int)zm_swapi(Cref -> b[iCnt]);
           cp_message4((CP_RETRIEVE | AP_ARGUMENT | CP_COMPARE |
                        AP_INTEGER), Pref,
                        ( union any_type * )&iInt2, (iCnt+1));
           }
       }
    /*-----------------------------------------------------------------*/
    /* If all of the  conversions were successful  then return a    */
    /* successful status.                                           */
    /*-----------------------------------------------------------------*/

//#endif /* debug */ return(AP_SUCCESS);
    }

/********************* START OF PROLOGUE   ********************/
/*                                                            */
/* FUNCTION NAME:   ELI_SVE2PF                                */
/*                                                            */
/* Function Title:  lSm's eVent Error data to Prolog Functor  */
/*                                                            */
/* Functional Description:                                    */
/* Converts the event error data to the Prolog Functor -      */
/* e(MT,OL,EC)                                                */
/* where                                                      */
/*    MT   Mechanism Type                                     */
/*    OL   Operation Level                                    */
```

APPENDIX G

```c
/*      EC   Error Condition                                          */
/*                                                                    */
/*  Operational Description:                                          */
/*  Match the event error data response functor description with      */
/*  the Prolog reference.  If the match is  successful  then for      */
/*  each argument in the  event error data functor,  get the argu-    */
/*  ment  from the  functor, either  recast, shift  and recast, or    */
/*  transpose and recast the information into a temporary variable    */
/*  and convert it to a Prolog integer.                               */
/*                                                                    */
/*  A hierarchical structure of the functions in this file.  Func-    */
/*  tions that have a double boarder  "===" are invoked from other    */
/*  modules (source files).  Functions that have  a single boarder    */
/*  "---" are invoked within this module and should not be invoked    */
/*  from other modules.                                               */
/*                                                                    */
/*      +---------------+                                             */
/*      | eli_sve2pf    |                                             */
/*      +---------------+                                             */
/*          |                                                         */
/*          |   +---------------+                                     */
/*          +->-| cp_message#   |                                     */
/*          |   +---------------+                                     */
/*          |                                                         */
/*          |   +---------------+                                     */
/*          +->-| zm_swapi      |                                     */
/*              +---------------+                                     */
/*                                                                    */
/*                                                                    */
/*******************  END OF PROLOGUE   *******************/ int eli_sve2pf( ref Pref, union LSM_0A far *Cref )
    {

//#if ((EL_DEBUG & EL_DSVX2PF) == EL_DSVX2PF) /* debug */ unsigned int   iInt1;

/*-----------------------------------------------------------------*/
    /* Match functor description with Prolog reference.                */
    /*-----------------------------------------------------------------*/
    if (cp_message4((CP_COMPARE | AP_FUNCTOR), Pref,
                                    ( union any_type * )"e", 3))
        {
        /*-----------------------------------------------------------------*/
        /* Convert the mechanism id to a Prolog integer.                   */
        /*-----------------------------------------------------------------*/
        iInt1 = (unsigned char)(Cref -> e.mechanism);
        cp_message4((CP_RETRIEVE | AP_ARGUMENT | CP_COMPARE |
                        AP_INTEGER), Pref,
                        ( union any_type * )&iInt1, 1);

/*-----------------------------------------------------------------*/
        /* Convert the level id to a Prolog integer.                       */
        /*-----------------------------------------------------------------*/
        iInt1 = (unsigned char)((Cref -> e.level) >> 4);
        cp_message4((CP_RETRIEVE | AP_ARGUMENT | CP_COMPARE |
                        AP_INTEGER), Pref,
                        ( union any_type * )&iInt1, 2);

/*-----------------------------------------------------------------*/
        /* Convert the error id to a Prolog integer.                       */
        /*-----------------------------------------------------------------*/
        iInt1 = (unsigned int)zm_swapi(Cref -> e.error);
```

APPENDIX G

```
    cp_message4((CP_RETRIEVE | AP_ARGUMENT | CP_COMPARE |
             AP_INTEGER), Pref,
             ( union any_type * )&iInt1, 3);
    }

/*----------------------------------------------------------------*/
   /* If all of the  conversions were successful  then return a      */
   /* successful status.                                             */
   /*----------------------------------------------------------------*/
//#endif /* debug */ return(AP_SUCCESS);
   }
```

APPENDIX H

```
/********************* START OF FILE DESCRIPTOR *******************/
/*                                                                 */
/* FILE NAME:   U_CPIUTL.C                                         */
/*                                                                 */
/* FILE TITLE:  C and Prolog Interface UTiLities                   */
/*                                                                 */
/* Functional Description:                                         */
/* This file contains a group of useful functions (utilities) for  */
/* interfacing between  C and Prolog  (utilites to  interface be-  */
/* tween C(Prolog) and DOS/User have not been developed). The de-  */
/* sign of these utilities  are based off of  the object oriented  */
/* methodology and message passing.                                */
/*                                                                 */
/*                                                                 */
/* Operational Description:                                        */
/* A hierarchical structure of the functions in this file.  Func-  */
/* tions that have a double boarder  "===" are invoked from other  */
/* modules (source files).  Functions that have  a single boarder  */
/* "---" are invoked within this module and should not be invoked  */
/* from other modules.                                             */
/*                                                                 */
/*      +=============+                            +=============+ */
/*      | cp_message4 |---->------+  +----<-----| cp_message3 |    */
/*      +=============+           |  |            +=============+ */
/*                         +=============+                         */
/*                         | cp_message  |                         */
/*                         +=============+                         */
/*                               | |                               */
/*         +-------------+       | |    +-------------+            */
/*         | cp_functor  |--<---+ +--->--| cp_atom     |           */
/*         +-------------+       | |    +-------------+            */
/*                               | |                               */
/*         +-------------+       | |    +-------------+            */
/*         | cp_floating |--<---+ +--->--| cp_string   |           */
/*         +-------------+       | |    +-------------+            */
/*                               | |                               */
/*         +-------------+       | |    +-------------+            */
/*         | cp_argument |--<---+ +--->--| cp_integer  |           */
/*         +-------------+       | |    +-------------+            */
/*                               | |                               */
/*                                                                 */
/* FUNCTION Names:                                                 */
/* cp_message4      - _                                            */
/* cp_message3      - _                                            */
/* cp_message       - _                                            */
/* cp_functor       - _                                            */
/* cp_atom          - _                                            */
/* cp_string        - _                                            */
/* cp_integer       - _                                            */
/* cp_floating      - _                                            */
/* cp_argument      - _                                            */
/*                                                                 */
/*                                                                 */
/********************* END OF FILE DESCRIPTOR *********************/

/*********************** START OF PROLOGUE ************************/
/*                                                                 */
/* FUNCTION NAME:   cp_functor( struct PO * )                      */
/*                                                                 */
/* FUNCTION TITLE: prolog FUNCTOR object                           */
/*                                                                 */
/* Functional Description:                                         */
```

APPENDIX H

```
/* The function will construct, retrieve, or compare the functor  */
/* passed to the prolog internal database reference.              */
/*                                                                */
/* Operational Description:                                       */
/* Based on the Prolog reference data type and the message,       */
/* either construct, retrieve, or compare (to another one) the    */
/* functor.                                                       */
/* If the data type is undefined, then one can either build or    */
/* compare the functor, depending on the message.                 */
/* If message type is either construct or compare (not retrieve), */
/* build the functor.                                             */
/* Otherwise, the message and the data type are incompatible.     */
/* If the data type is a functor, then one can either retrieve or */
/* compare the functor, depending on the message.                 */
/* If message type is retrieve, try to retrieve the functor.      */
/* If message type is compare, try to match the functor.          */
/* Otherwise, the message and the data type are incompatible.     */
/* Otherwise, the data type is invalid.                           */
/*                                                                */
/* A hierarchical structure of the functions in this file.  Func- */
/* tions that have a double boarder "===" are invoked from other  */
/* modules (source files).  Functions that have a single boarder  */
/* "---" are invoked within this module and should not be invoked */
/* from other modules.                                            */
/*                                                                */
/*      +--------------+                                          */
/*      | cp_functor   |                                          */
/*      +--------------+                                          */
/*             |                                                  */
/*             |      +---------------+                           */
/*             +--->--| findtype_c    |                           */
/*             |      +---------------+                           */
/*             |      +---------------+                           */
/*             +--->--| getfunctor_c  |                           */
/*             |      +---------------+                           */
/*             |      +---------------+                           */
/*             +--->--| putfunctor_c  |                           */
/*             |      +---------------+                           */
/*             |      +---------------+                           */
/*             +--->--| strlen        |                           */
/*             |      +---------------+                           */
/*             |      +---------------+                           */
/*             +--->--| strncpy       |                           */
/*             |      +---------------+                           */
/*             |      +---------------+                           */
/*             +--->--| strnicmp      |                           */
/*                    +---------------+                           */
/*                                                                */
/*                                                                */
/*                                                                */
/********************* END OF PROLOGUE *********************/ int cp_functor( struct PO *Cref )
    {

//#if ((CP_DEBUG & CP_DFUNCTOR) == CP_DFUNCTOR)

/*---------------------------------------------------------------*/
    /* Local definitions and initialization of variables used in this*/
    /* function.                                                     */
    /*---------------------------------------------------------------*/
    int     iLength;
    int     iArity;
    int     iType;
```

APPENDIX H

```
    int   iPref;
    char  cName[255];

for( iLength = 0; iLength <= sizeof( cName ); iLength++ )
       {
       cName[ iLength ] = 0x00;
       } iPref = Cref -> reference;

/*------------------------------------------------------------*/
    /* Based  on the  Prolog  reference  data type  and the  message,*/
    /* either construct,  retrieve,  or compare  (to another one) the*/
    /* functor.                                                   */
    /*------------------------------------------------------------*/

//#if (CP_TRACE == 1)
//
//    switch((iType = iPref))
//
//#else switch((iType = findtype_c(iPref)))

//#endif

{
       /*------------------------------------------------------------*/
       /* If the data  type is undefined,  then one can  either build*/
       /* or compare the functor, depending on the message.         */
       /*------------------------------------------------------------*/ case AP_UNDEF:
       /*------------------------------------------------------------*/
       /* If message type is either construct or compare            */
       /* (not retrieve), build the functor.                        */
       /*------------------------------------------------------------*/
          if ((Cref -> type == cp_construct_functor) ||
              (Cref -> type == cp_compare_functor))
             {
             Cref -> length = strlen(Cref -> name.c);

//#if (CP_TRACE == 1)
//           return(AP_SUCCESS);
//#else
             if (! putfunctor_c(Cref -> name.c,
                                Cref -> length,
                                Cref -> arity, iPref))
                return(AP_FAILURE);
//#endif

}

/*------------------------------------------------------------*/
          /* Otherwise, the message and the data type are              */
          /* incompatible.                                             */
          /*------------------------------------------------------------*/
          else
             {
             return(AP_FAILURE);
             }
```

APPENDIX H

```
            return(AP_SUCCESS);

/*----------------------------------------------------------*/
        /* If the data type is a functor, then one can either       */
        /* retrieve or compare the functor, depending on the message. */
        /*----------------------------------------------------------*/ case AP_FUNCTOR :
            /*----------------------------------------------------------*/
            /* If message type is retrieve, try to retrieve the functor*/
            /*----------------------------------------------------------*/
            if (Cref -> type == cp_retrieve_functor)
                {

//#if (CP_TRACE == 1)
//              strncpy(cName,"t_functor",10);
//              iLength = 9;
//              iArity = 5;
//
//              if (1 == 1)
//#else
                if (getfunctor_c(iPref,cName,&iLength,&iArity))
//#endif
                    {

//                  strncpy(Cref -> name.c,cName,iLength+1);

strcpy( Cref -> name.c,cName );
                    Cref -> length = iLength;
                    Cref -> arity = iArity;
                    return(AP_SUCCESS);
                    }
                else
                    {
                    return(AP_FAILURE);
                    }
                }

/*----------------------------------------------------------*/
            /* If message type is compare, try to match the functor.  */
            /*----------------------------------------------------------*/
            else
                if (Cref -> type == cp_compare_functor)
                    {
                    Cref -> length = strlen(Cref -> name.c);

//#if (CP_TRACE == 1)
//              strncpy(cName,"t_functor",10);
//              iLength = 9;
//              iArity = 5;
//#else
                    getfunctor_c(iPref,cName,&iLength,&iArity);
//#endif if ((Cref -> arity != iArity) ||
                        (Cref -> length != iLength) ||
                        (strnicmp(Cref -> name.c,cName,iLength) != 0))
                      return(AP_FAILURE);
                    else
```

APPENDIX H

```
            return(AP_SUCCESS);
         }
      /*------------------------------------------------------------*/
      /* Otherwise, the message and the data type are               */
      /* incompatible.                                              */
      /*------------------------------------------------------------*/ else
            {
            return(AP_FAILURE);
            }
         return(AP_SUCCESS);

/*------------------------------------------------------------*/
      /*  Otherwise, the data type is invalid.                      */
      /*------------------------------------------------------------*/
      default :
         return(AP_FAILURE);
      };

//#endif return(AP_SUCCESS);

}

/*********************** START OF PROLOGUE **********************/
/*                                                               */
/* FUNCTION NAME:   cp_atom( struct PO * )                       */
/*                                                               */
/* FUNCTION TITLE:  prolog ATOM object                           */
/*                                                               */
/* Functional Description:                                       */
/* The function will construct, retrieve, or compare  the atom   */
/* passed to the prolog internal database reference.             */
/*                                                               */
/* Operational Description:                                      */
/* Based  on the  Prolog  reference  data type  and the message, */
/* either construct,  retrieve,  or compare  (to another one) the*/
/* atom.                                                         */
/* If the data  type is undefined,  then one can  either build or*/
/* compare the atom, depending on the message.                   */
/* If message type is either construct or compare (not retrieve),*/
/* build the atom.                                               */
/* Otherwise, the message and the data type are incompatible.    */
/* If the data type is  a atom, then one  can either  retrieve or*/
/* compare the atom, depending on the message.                   */
/* If message type is retrieve, try to retrieve the atom.        */
/* If message type is compare, try to match the atom.            */
/* Otherwise, the message and the data type are incompatible.    */
/* Otherwise, the data type is invalid.                          */
/*                                                               */
/* A hierarchical structure of the functions in this file.  Func-*/
/* tions that have a double boarder  "===" are invoked from other*/
/* modules (source files).  Functions that have  a single boarder*/
/* "---" are invoked within this module and should not be invoked*/
/* from other modules.                                           */
/*                                                               */
/*       +--------------+                                        */
/*       | cp_atom      |                                        */
/*       +--------------+                                        */
/*              |                                                */
```

APPENDIX H

```
/*               |      +--------------+                    */
/*               +--->--| findtype_c   |                    */
/*               |      +--------------+                    */
/*               |      +--------------+                    */
/*               +--->--| gettxt_c     |                    */
/*               |      +--------------+                    */
/*               |      +--------------+                    */
/*               +--->--| putatm_c     |                    */
/*               |      +--------------+                    */
/*               |      +--------------+                    */
/*               +--->--| strlen       |                    */
/*               |      +--------------+                    */
/*               |      +--------------+                    */
/*               +--->--| strncpy      |                    */
/*               |      +--------------+                    */
/*               |      +--------------+                    */
/*               +--->--| strnicmp     |                    */
/*                      +--------------+                    */
/*                                                          */
/*                                                          */
/*                                                          */
/********************** END OF PROLOGUE ****************/ int cp_atom( struct PO * Cref )
    {

//#if ((CP_DEBUG & CP_DATOM) == CP_DATOM)

int     iLength;
    int     iType;
    int     iPref;
    char    cName[255];

/*----------------------------------------------------------------*/
    /* Based on the Prolog reference data type and the message,*/
    /* either construct, retrieve, or compare (to another one) the*/
    /* atom.                                                       */
    /*----------------------------------------------------------------*/ for(iLength = 0; iLength <= sizeof(cName); iLength++)
        {
        cName[iLength] = 0x00;
        } iPref = Cref -> reference;

//#if (CP_TRACE == 1)
//    switch((iType = iPref))
//#else
    switch((iType = findtype_c(iPref)))
//#endif
        {

/*----------------------------------------------------------------*/
        /* If the data type is undefined, then one can either     */
        /* build or compare the atom, depending on the message.   */
        /*----------------------------------------------------------------*/
        case AP_UNDEF :
            /*----------------------------------------------------------------*/
            /* If message type is either construct or compare     */
            /* (not retrieve), build the atom.                    */
            /*----------------------------------------------------------------*/
            if ((Cref -> type == cp_construct_atom) ||
                (Cref -> type == cp_compare_atom))
```

APPENDIX H

```
            {
            Cref -> length = strlen(Cref -> name.c);
//#if (CP_TRACE == 1)
//          return(AP_SUCCESS);
//#else
            if (! putatm_c( Cref -> name.c, Cref -> length, iPref ) )
                return(AP_FAILURE);
//#endif }
        /*----------------------------------------------------------*/
        /* Otherwise, the message and the data type are             */
        /* incompatible.                                            */
        /*----------------------------------------------------------*/
        else
            {
            return(AP_FAILURE);
            }
        break;

/*----------------------------------------------------------*/
        /* If the data type is a atom, then one can either retrieve */
        /* or compare the atom, depending on the message.           */
        /*----------------------------------------------------------*/
        case AP_ATOM :
        case AP_STRING :
            /*------------------------------------------------------*/
            /* If message type is retrieve, try to retrieve the atom. */
            /*------------------------------------------------------*/
            if (Cref -> type == cp_retrieve_atom)
                {
//#if (CP_TRACE == 1)
//              strncpy(cName,"t_atom",7);
//              iLength = 6;
//
//              if (1 == 1)
//#else
            if (gettxt_c(iPref,cName,&iLength))
//#endif
                {
                strncpy(Cref -> name.c,cName,iLength+1);
                Cref -> length = iLength;
                return(AP_SUCCESS);
                }
            else
                {
                return(AP_FAILURE);
                }
            }
        /*----------------------------------------------------------*/
        /* If message type is compare, try to match the atom.       */
        /*----------------------------------------------------------*/
        else
            if (Cref -> type == cp_compare_atom)
                {
                Cref -> length = strlen(Cref -> name.c);
//#if (CP_TRACE == 1)
//              strncpy(cName,"t_atom",7);
//              iLength = 6;
```

APPENDIX H

```
//#else
                gettxt_c(iPref,cName,&iLength);
//#endif
                if ((Cref -> length != iLength) ||
                    (strnicmp(Cref -> name.c,cName,iLength) != 0))
                   return(AP_FAILURE);
                else
                   return(AP_SUCCESS);
                }
        /*----------------------------------------------------------*/
        /* Otherwise, the message and the data type are             */
        /* incompatible.                                            */
        /*----------------------------------------------------------*/
        else
            {
            return(AP_FAILURE);
            }
        break;

/*----------------------------------------------------------*/
    /* Otherwise, the data type is invalid.                     */
    /*----------------------------------------------------------*/
    default :
        return(AP_FAILURE);
        break;
    }

//#endif return(AP_SUCCESS);

}

/********************** START OF PROLOGUE **********************/
/*                                                              */
/* FUNCTION NAME:   cp_integer( struct PO * )                   */
/*                                                              */
/* FUNCTION TITLE:  prolog INTEGER object                       */
/*                                                              */
/* Functional Description:                                      */
/* The function will construct, retrieve, or compare the integer*/
/* (long or short) passed to the prolog internal database refer-*/
/* ence.                                                        */
/*                                                              */
/* Operational Description:                                     */
/* Based on the Prolog reference data type and the message,     */
/* either construct, retrieve, or compare (to another one) the  */
/* integer (long or short).                                     */
/* If the data type is undefined, then one can either build or  */
/* compare the integer, depending on the message.               */
/* If message type is either construct short or compare short   */
/* (not retrieve short), build a short integer.                 */
/* If message type is either construct long or compare long     */
/* (not retrieve long), build a long integer.                   */
/* Otherwise, the message and the data type are incompatible.   */
/* If the data type is a short integer, then one can either re- */
/* trieve or compare the short integer, depending on the message.*/
/* If message type is retrieve, try to retrieve the integer.    */
/* If message type is compare, try to match the integer.        */
/* Otherwise, the message and the data type are incompatible.   */
```

APPENDIX H

```
/* If the data type is a  long  integer, then one  can either re- */
/* trieve or compare the  long integer, depending on the message. */
/* If message type is retrieve, try to retrieve the integer.      */
/* If message type is compare, try to match the integer.          */
/* Otherwise, the message and the data type are incompatible.     */
/* Otherwise, the data type is invalid.                           */
/*                                                                */
/* A hierarchical structure of the functions in this file.  Func- */
/* tions that have a double boarder  "===" are invoked from other */
/* modules (source files).  Functions that have  a single boarder */
/* "---" are invoked within this module and should not be invoked */
/* from other modules.                                            */
/*                                                                */
/*     +-------------+                                            */
/*     | cp_integer  |                                            */
/*     +-------------+                                            */
/*            |                                                   */
/*            |     +--------------+                              */
/*            +--->--| findtype_c  |                              */
/*            |     +--------------+                              */
/*            |     +--------------+                              */
/*            +--->--| getshort_c  |                              */
/*            |     +--------------+                              */
/*            |     +--------------+                              */
/*            +--->--| getlong_c   |                              */
/*            |     +--------------+                              */
/*            |     +--------------+                              */
/*            +--->--| putlong_c   |                              */
/*                  +--------------+                              */
/*                                                                */
/*                                                                */
/*                                                                */
/************************* END OF PROLOGUE ******************/ int cp_integer( struct PO * Cref )
    {

//#if ((CP_DEBUG & CP_DINTEGER) == CP_DINTEGER)
    int           iName;
    int           iType;
    int           iPref;
    unsigned long lName;

/*----------------------------------------------------------------*/
    /* Based  on the  Prolog reference  data type  and the  message, */
    /* either construct,  retrieve,  or compare  (to another one) the*/
    /* integer (long or short).                                      */
    /*----------------------------------------------------------------*/
    iPref = Cref -> reference;

//#if (CP_TRACE == 1)
//    switch((iType = iPref))
//#else
    switch((iType = findtype_c(iPref)))
//#endif {
        /*----------------------------------------------------------------*/
        /* If the data  type is undefined,  then one  can either          */
        /* build or compare the integer pending on the message.           */
        /*----------------------------------------------------------------*/
        case AP_UNDEF :
            /*----------------------------------------------------------------*/
            /* If message type  is either  construct short  or               */
```

APPENDIX H

```
            /* compare short (not retrieve short), build a short    */
            /* integer.                                              */
            /*------------------------------------------------------*/
            if ((Cref -> type == cp_construct_short_integer) ||
                (Cref -> type == cp_compare_short_integer))
                {
                lName = (unsigned long)(Cref -> name.i & 0xFFFF);
//#if (CP_TRACE == 1)
//              return(AP_SUCCESS);
//#else
                if (! putlong_c(lName, iPref))
                    return(AP_FAILURE);
//#endif
                }

/*------------------------------------------------------*/
            /* If message type  is either  construct  long  or compare*/
            /* long (not retrieve  long), build a  long integer.    */
            /*------------------------------------------------------*/
            else
                if ((Cref -> type == cp_construct_long_integer) ||
                    (Cref -> type == cp_compare_long_integer))
                    {
                    lName = (unsigned long)(Cref -> name.l & 0xFFFFFFFFL);
//#if (CP_TRACE == 1)
//                  return(AP_SUCCESS);
//#else
                    if (! putlong_c( lName, iPref ) )
                        return(AP_FAILURE);
//#endif
                    }

/*------------------------------------------------------*/
            /* Otherwise, the message and the data type are         */
            /* incompatible.                                         */
            /*------------------------------------------------------*/
            else
               {
               return(AP_FAILURE);
               }
            break;

/*------------------------------------------------------*/
            /* If the data type is a  short integer, then one  can  */
            /* either retrieve or compare the short integer, pending*/
            /* on the message.                                      */
            /*------------------------------------------------------*/
            case AP_SHORT :
                /*--------------------------------------------------*/
                /* If message type is retrieve, try to retrieve the */
                /* integer.                                          */
                /*--------------------------------------------------*/
                if (Cref -> type == cp_retrieve_short_integer)
                    {
//#if (CP_TRACE == 1)
```

APPENDIX H

```
//              iName = 12345;
//              if (1 == 1)
//#else
                if (getint_c(iPref,&iName))
//#endif
                    {
                    Cref -> name.i = iName;
                    return(AP_SUCCESS);
                    }
                else
                    {
                    return(AP_FAILURE);
                    }
            }
        /*------------------------------------------------------*/
        /* If message type is compare, try to match the integer.*/
        /*------------------------------------------------------*/
        else
            if (Cref -> type == cp_compare_short_integer)
                {
//#if (CP_TRACE == 1)
//              iName = 12345;
//#else
                getint_c(iPref,&iName);
//#endif if (Cref -> name.i != iName)
                    return(AP_FAILURE);
                else
                    return(AP_SUCCESS);
                }
        /*------------------------------------------------------*/
        /*  Otherwise, the message and the data type are       */
        /*  incompatible.                                      */
        /*------------------------------------------------------*/
            else
              if (Cref -> type == cp_retrieve_long_integer)
                {
//#if (CP_TRACE == 1)
//              lName = 1234567;
//              if (1 == 1)
//#else
                if (getlong_c(iPref,&lName))
//#endif
                    {
                    Cref -> name.l = lName;
                    return(AP_SUCCESS);
                    }
                else
                    return(AP_FAILURE);
                }

/*------------------------------------------------------*/
        /* If message type is compare, try to match the integer. */
        /*------------------------------------------------------*/
            else
              if (Cref -> type == cp_compare_long_integer)
                {
//#if (CP_TRACE == 1)
//              lName = 1234567;
//#else
                getlong_c(iPref,&lName);
//#endif
```

APPENDIX H

```
            if (Cref -> name.l != lName)
               return(AP_FAILURE);
            else
               return(AP_SUCCESS);
            }

/*---------------------------------------------------------*/
      /* Otherwise, the message and the data type are            */
      /* incompatible.                                           */
      /*---------------------------------------------------------*/
      else
         {
         return(AP_FAILURE);
         }
      break;

/*---------------------------------------------------------*/
      /* If the data type is a  long  integer, then one  can     */
      /* either retrieve or compare the  long integer pending    */
      /* on the message.                                         */
      /*---------------------------------------------------------*/
      case AP_LONG :
         /*------------------------------------------------------*/
         /* If message type is retrieve, try to retrieve the     */
         /* integer.                                             */
         /*------------------------------------------------------*/
         if (Cref -> type == cp_retrieve_long_integer)
            {
//#if (CP_TRACE == 1)
//            lName = 1234567;
//            if (1 == 1)
//#else
            if (getlong_c(iPref,&lName))
//#endif
               {
               Cref -> name.l = lName;
               return(AP_SUCCESS);
               }
            else
               return(AP_FAILURE);
            }

/*---------------------------------------------------------*/
      /*  If message type is compare, try to match the integer.  */
      /*---------------------------------------------------------*/
      else
         if (Cref -> type == cp_compare_long_integer)
            {
//#if (CP_TRACE == 1)
//            lName = 1234567;
//#else
            getlong_c(iPref,&lName);
//#endif
            if (Cref -> name.l != lName)
               return(AP_FAILURE);
            else
               return(AP_SUCCESS);
            }

/*---------------------------------------------------------*/
      /* Otherwise, the message and the data type are            */
      /* incompatible.                                           */
      /*---------------------------------------------------------*/
```

APPENDIX H

```
        else
            {
            return(AP_FAILURE);
            }
        break;

/*--------------------------------------------------------------*/
    /* Otherwise, the data type is invalid.                         */
    /*--------------------------------------------------------------*/
    default :
        return(AP_FAILURE);
        break;
    }

//#endif return(AP_SUCCESS);
    }

/************************ START OF PROLOGUE ************************/
/*                                                                  */
/*  FUNCTION NAME:   cp_argument( struct PO * )                     */
/*                                                                  */
/*  FUNCTION TITLE:  prolog functor ARGUMENT object                 */
/*                                                                  */
/*  Functional Description:                                         */
/*  The function will retrieve  an argument of  a functor from the  */
/*  prolog internal database reference.                             */
/*                                                                  */
/*  Operational Description:                                        */
/*  Based  on the  Prolog  reference  data type  and the  message,  */
/*  retrieve the argument of the functor.                           */
/*  If the data type is a functor, then determine the message.      */
/*  If message type is retrieve, try to retrieve an argument.       */
/*  Otherwise, the message and the data type are imcompatiable.     */
/*  Otherwise, the data type is invalid.                            */
/*                                                                  */
/*  A hierarchical structure of the functions in this file.  Func-  */
/*  tions that have a double boarder  "===" are invoked from other  */
/*  modules (source files).  Functions that have  a single boarder  */
/*  "---" are invoked within this module and should not be invoked  */
/*  from other modules.                                             */
/*                                                                  */
/*       +--------------+                                           */
/*       | cp_argument  |                                           */
/*       +--------------+                                           */
/*              |                                                   */
/*              |       +--------------+                            */
/*              +--->--| findtype_c    |                            */
/*              |       +--------------+                            */
/*              |       +--------------+                            */
/*              +--->--| getfuncarg_c  |                            */
/*                      +--------------+                            */
/*                                                                  */
/*                                                                  */
/*                                                                  */
/*********************** END OF PROLOGUE ***********************/ int cp_argument( struct PO * Cref )
    {
//#if ((CP_DEBUG & CP_DARGUMENT) == CP_DARGUMENT)
    ref    arTref;
    int    iType;
```

APPENDIX H

```
    int    iPref;

/*----------------------------------------------------------------*/
    /* Based on the Prolog reference data type and the message,*/
    /* retrieve the argument of the functor.                   */
    /*----------------------------------------------------------------*/
    iPref = Cref -> reference;

//#if (CP_TRACE == 1)
//    switch((iType = iPref))
//#else
    switch((iType = findtype_c(iPref)))
//#endif
      {
        /*----------------------------------------------------------------*/
        /* If the data type is a functor, then retrieve the argument. */
        /*----------------------------------------------------------------*/
        case AP_FUNCTOR :
            /*----------------------------------------------------------------*/
            /* If message type is retrieve, try to retrieve an argument*/
            /*----------------------------------------------------------------*/
            if (Cref -> type == cp_retrieve_functor_argument)
              {
//#if (CP_TRACE == 1)
//           arTref = 9876;
//#else
              getfuncarg_c( iPref, Cref -> arity, &arTref );
//#endif Cref -> name.i = arTref;
              return(AP_SUCCESS);
              }

/*----------------------------------------------------------------*/
            /* Otherwise, the message and the data type are            */
            /* incompatiable.                                          */
            /*----------------------------------------------------------------*/
            else
              {
                return(AP_FAILURE);
              }
            break;
        /*----------------------------------------------------------------*/
        /* Otherwise, the data type is invalid.                    */
        /*----------------------------------------------------------------*/
        default :
            return(AP_FAILURE);
            break;
      }

//#endif return(AP_SUCCESS);
    }

/********************* START OF PROLOGUE *********************/
/*                                                            */
/* FUNCTION NAME:   cp_message3(int,int, union any_type *)    */
/*                                                            */
/* FUNCTION TITLE:  c to prolog message router with 3 arguments */
/*                                                            */
/* Functional Description:                                    */
```

APPENDIX H

```
/*  This function was created to handle messages consisting of two   */
/*  additional  arguments and  to remove the  recursive capability   */
/*  from cp_message (for now).  Future implementations of the mes-   */
/*  sage passing object oriented  approach will elimitate the need   */
/*  of this function.                                                */
/*                                                                   */
/*  Operational Description:                                         */
/*  If the message is either construct  or retrieve and construct,   */
/*  or either compare or retrieve  and compare, determine the data   */
/*  type.                                                            */
/*  If the  data type  is a string,   copy the data  passed, invoke  */
/*  cp_message and return the results.                               */
/*  If the  data type  is an atom,   copy the  data passed,  invoke  */
/*  cp_message and return the results.                               */
/*  If the data type is a short integer, copy the data passed, in-   */
/*  voke cp_message and return the results.                          */
/*  If the data type is a long  integer, copy the data passed, in-   */
/*  voke cp_message and return the results.                          */
/*  Otherwise, the message and datatype is imcompatible.             */
/*  If the message is retrieve, determine the data type.             */
/*  If the data type  is a string, invoke  cp_message and copy the   */
/*  results.                                                         */
/*  If the data type  is an atom,  invoke  cp_message and copy the   */
/*  results.                                                         */
/*  If the  data type  is a short  integer, invoke  cp_message and   */
/*  copy the results.                                                */
/*  If the  data type  is a  long  integer, invoke  cp_message and   */
/*  copy the results.                                                */
/*  Otherwise, the message and datatype is imcompatible.             */
/*  Otherwise, the message is invalid.                               */
/*                                                                   */
/*  A hierarchical structure of the functions in this file.  Func-   */
/*  tions that have a double boarder  "===" are invoked from other   */
/*  modules (source files).  Functions that have  a single boarder   */
/*  "---" are invoked within this module and should not be invoked   */
/*  from other modules.                                              */
/*                                                                   */
/*      +--------------+                                             */
/*      | cp_message3 |                                              */
/*      +--------------+                                             */
/*             |                                                     */
/*             |     +--------------+                                */
/*             +--->--| cp_message   |                               */
/*             |     +--------------+                                */
/*             |     +--------------+                                */
/*             +--->--| strncpy      |                               */
/*             |     +--------------+                                */
/*             |     +--------------+                                */
/*             +--->--| strlen       |                               */
/*                   +--------------+                                */
/*                                                                   */
/*                                                                   */
/*                                                                   */
/*********************** END OF PROLOGUE **********************/ int cp_message3( unsigned int Mref, int Pref, union any_type * Tref)
    {

//#if ((CP_DEBUG & CP_DMESSAGE) == CP_DMESSAGE)

unsigned int wType;
    unsigned int wMssg;
    struct PO    sPobj;
```

APPENDIX H

```
/*---------------------------------------------------------------*/
/*   For each message, convert the old way to the new way.       */
/*---------------------------------------------------------------*/
wMssg = (unsigned int) (Mref & 0xFF00);
wType = (unsigned int) (Mref & 0x00FF);
switch(wMssg)
    {
    case CP_CONSTRUCT :
        switch(wType)
            {
            case AP_STRING :
                sPobj.type = cp_construct_string;
                sPobj.reference = Pref;
//                  sPobj.length = strlen(Tref -> c);

strcpy( sPobj.name.c,Tref -> c );
                sPobj.arity = 0;

if (! cp_string(&sPobj))
                        return(AP_FAILURE);
                break;

case AP_ATOM :
                sPobj.type = cp_construct_atom;
                sPobj.reference = Pref;

//                  sPobj.length = strlen(Tref -> c);
//                  strncpy(sPobj.name.c,Tref -> c,sPobj.length);

strcpy( sPobj.name.c,Tref -> c );

sPobj.arity = 0;

if (! cp_atom(&sPobj))
                        return(AP_FAILURE);
                break;

case AP_SHORT:
                sPobj.type = cp_construct_short_integer;
                sPobj.reference = Pref;
                sPobj.name.i = Tref -> i;
                sPobj.arity = 0;

if (! cp_integer(&sPobj))
                    return(AP_FAILURE);
                break;

case AP_LONG :
                sPobj.type = cp_construct_long_integer;
                sPobj.reference = Pref;
                sPobj.name.l = Tref -> l;
                sPobj.arity = 0;

if (! cp_integer(&sPobj))
                    return(AP_FAILURE);
                break;

default :
                return(AP_FAILURE);
```

APPENDIX H

```
            break;
        }
    break;

case CP_COMPARE :
       switch(wType)
           {
           case AP_STRING :
              sPobj.type = cp_compare_string;
              sPobj.reference = Pref;
//            sPobj.length = strlen(Tref -> c);
//            strncpy(sPobj.name.c,Tref -> c,sPobj.length);

strcpy( sPobj.name.c,Tref -> c );

sPobj.arity = 0;

if (! cp_string(&sPobj))
                     return(AP_FAILURE);
              break;

case AP_ATOM :
              sPobj.type = cp_compare_atom;
              sPobj.reference = Pref;
//            sPobj.length = strlen(Tref -> c);
//            strncpy(sPobj.name.c,Tref -> c,sPobj.length);

strcpy( sPobj.name.c,Tref -> c );

sPobj.arity = 0;

if (! cp_string(&sPobj))
                     return(AP_FAILURE);
              break;

case AP_SHORT :
              sPobj.type = cp_compare_short_integer;
              sPobj.reference = Pref;
              sPobj.name.i = Tref -> i;
              sPobj.arity = 0;
              if (! cp_integer(&sPobj))
                  return(AP_FAILURE);
              break;

case AP_LONG :
              sPobj.type = cp_compare_long_integer;
              sPobj.reference = Pref;
              sPobj.name.l = Tref -> l;
              sPobj.arity = 0;
              if (! cp_integer(&sPobj))
                  return(AP_FAILURE);
              break;

default :
              return(AP_FAILURE);
              break;
```

APPENDIX H

```
            } break;

case CP_RETRIEVE :
        switch(wType)
            {
            case AP_STRING :
                sPobj.reference = Pref;
                sPobj.type = cp_retrieve_string;
                sPobj.arity = 0;

if (! cp_string(&sPobj))
                    return(AP_FAILURE);

strncpy(Tref -> c,sPobj.name.c,sPobj.length);
//              Tref->c[ sPobj.length + 1 ] = 0x00;
                Tref->c[ sPobj.length ] = 0x00;

break;

case AP_ATOM :
                sPobj.reference = Pref;
                sPobj.type = cp_retrieve_atom;
                sPobj.arity = 0;

if (! cp_atom(&sPobj))
                        return(AP_FAILURE);

strncpy(Tref -> c,sPobj.name.c,sPobj.length);
//              Tref->c[ sPobj.length + 1 ] = 0x00;
                Tref->c[ sPobj.length ] = 0x00;
                break;

case AP_SHORT :
                sPobj.reference = Pref;
                sPobj.type = cp_retrieve_short_integer;
                sPobj.arity = 0;

if (! cp_integer(&sPobj))
                    return(AP_FAILURE);

Tref -> i = sPobj.name.i;
                break;

case AP_LONG :
                sPobj.reference = Pref;
                sPobj.type = cp_retrieve_long_integer;
                sPobj.arity = 0;

if (! cp_integer(&sPobj))
                    return(AP_FAILURE);

Tref -> l = sPobj.name.l;
                break;
```

APPENDIX H

```
            default :
                return(AP_FAILURE);
                break;
            } break;
        /*------------------------------------------------------------*/
        /* Invalid message.                                           */
        /*------------------------------------------------------------*/
        default :
            return(AP_FAILURE);
            break;
        }

//#endif return(AP_SUCCESS);
    }

/************************* START OF PROLOGUE *********************/
/*                                                                 */
/* FUNCTION NAME:   cp_message4(int,int, union any_type *, int)   */
/*                                                                 */
/* FUNCTION TITLE:  c to prolog message router with 4 arguments   */
/*                                                                 */
/* Functional Description:                                         */
/* This function was created  to handle messages  consisting of 3 */
/* additional  arguments and  to remove the  recursive capability */
/* from cp_message (for now).  Future implementations of the mes- */
/* sage passing object oriented  approach will elimitate the need */
/* of this function.                                               */
/*                                                                 */
/* Operational Description:                                        */
/* If the message is either construct  or compare,  determine the */
/* data type.                                                      */
/* If the data type  is a functor,  copy the data  passed, invoke */
/* cp_message and return the results.                              */
/* Otherwise, the message and datatype is incompatible.            */
/*                                                                 */
/* If the message is retrieve, determine the data type.            */
/* If the data type is a functor, invoke  cp_message and copy the */
/* results.                                                        */
/* If the data type  is an argument,  invoke cp_message  and copy */
/* the results.                                                    */
/* If the data types are an argument and a string, invoke cp_mes- */
/* sage to retrieve the argument and then, to retrieve the string.*/
/* Copy the results and exit.                                      */
/* If the data types are an argument and an atom,  invoke cp_mes- */
/* sage to retrieve the argument and then,  to retrieve the atom. */
/* Copy the results and exit.                                      */
/* If the data types are an argument and a short integer,  invoke */
/* cp_message to retrieve the argument and then,  to retrieve the */
/* short integer.  Copy the results and exit.                      */
/* If the data types are an argument and a  long integer,  invoke */
/* cp_message to retrieve the argument and then,  to retrieve the */
/* long  integer.  Copy the results and exit.                      */
/* Otherwise, the message and datatype is incompatible.            */
/*                                                                 */
/* If the message  is retrieve  and compare,  determine  the data */
/* types.                                                          */
/* If the data types are an argument and a string, invoke cp_mes- */
/* sage to retrieve the argument and then,  to compare the string */
/* and return the results.                                         */
```

APPENDIX H

```
/* If the data types are an argument and an atom,  invoke cp_mes-  */
/* sage to retrieve the  argument and then,  to compare the atom   */
/* and return the results.                                          */
/* If the data types are an argument and a short integer,  invoke  */
/* cp_message to retrieve the argument and then,  to compare  the  */
/* short integer.  Copy the results and exit.                       */
/* If the data types are an argument and a  long integer,  invoke  */
/* cp_message to retrieve the argument and then,  to compare  the  */
/* long  integer.  Copy the results and exit.                       */
/* Otherwise, the message and datatype is incompatible.             */
/*                                                                  */
/* If the message is retrieve and construct,  determine  the data  */
/* types.                                                           */
/* If the data types are an argument and a string,  invoke cp_mes- */
/* sage to  retrieve  the  argument and  then,  to  construct the  */
/* string and return the results.                                   */
/* If the data types are an argument and an atom,  invoke cp_mes-  */
/* sage to retrieve the  argument and then, to construct the atom  */
/* and return the results.                                          */
/* If the data types are an argument and a short integer,  invoke  */
/* cp_message to retrieve the argument and then, to construct the  */
/* short integer.  Copy the results and exit.                       */
/* If the data types are an argument and a  long integer,  invoke  */
/* cp_message to retrieve the argument and then, to construct the  */
/* long  integer.  Copy the results and exit.                       */
/* Otherwise, the message and datatype is incompatible.             */
/*                                                                  */
/* Otherwise, the message is invalid.                               */
/*                                                                  */
/* A hierarchical structure of the functions in this file.  Func-  */
/* tions that have a double boarder  "===" are invoked from other  */
/* modules (source files). Functions that have  a single boarder  */
/* "---" are invoked within this module and should not be invoked  */
/* from other modules.                                              */
/*                                                                  */
/*      +--------------+                                            */
/*      | cp_message4 |                                             */
/*      +--------------+                                            */
/*             |                                                    */
/*             |        +--------------+                            */
/*             +--->--| cp_message   |                             */
/*             |        +--------------+                            */
/*             |        +--------------+                            */
/*             +--->--| strncpy      |                             */
/*             |        +--------------+                            */
/*             |        +--------------+                            */
/*             +--->--| strlen       |                             */
/*                      +--------------+                            */
/*                                                                  */
/*                                                                  */
/*                                                                  */
/*********************** END OF PROLOGUE ************************/
int cp_message4(unsigned int Mref,int Pref,union any_type *Tref,
                                                       int Aref)
    {

//#if ((CP_DEBUG & CP_DMESSAGE) == CP_DMESSAGE)

unsigned int wType;
    unsigned int wMssg;
    union any_type uTmp1;
    struct PO    sPobj;
```

APPENDIX H

```
/*---------------------------------------------------------------*/
/* Based on the message  passed, determine the  operation to pre-*/
/* form.                                                         */
/*---------------------------------------------------------------*/
wMssg = (unsigned int) (Mref & 0xFF00);
wType = (unsigned int) (Mref & 0x00FF);
switch(wMssg)
    {
    /*---------------------------------------------------------------*/
    /* Create . . .                                                  */
    /*---------------------------------------------------------------*/
    case CP_CONSTRUCT :
    /*---------------------------------------------------------------*/
    /*  Compare . . .maybe ?                                         */
    /*---------------------------------------------------------------*/
    case CP_COMPARE :
        /*---------------------------------------------------------------*/
        /* Based on the opject passed, initialize the proper             */
        /* structure elements and invoke the correct object.             */
        /*---------------------------------------------------------------*/
        switch(wType)
            {
            /*---------------------------------------------------------------*/
            /*  Functor ?                                                    */
            /*---------------------------------------------------------------*/
            case AP_FUNCTOR :
//                 sPobj.length = strlen(Tref -> c);
                strcpy( sPobj.name.c,Tref -> c );
                sPobj.arity = Aref;
                sPobj.type = cp_compare_functor;
                sPobj.reference = Pref;

if (! cp_functor(&sPobj))
                   return(AP_FAILURE);
                break;

/*---------------------------------------------------------------*/
            /* Invalid data type.                                            */
            /*---------------------------------------------------------------*/
            default :
               return(AP_FAILURE);
               break;
            } break;

/*---------------------------------------------------------------*/
        /*  Retrieve . . . maybe?                                        */
        /*---------------------------------------------------------------*/
        case CP_RETRIEVE :
            /*---------------------------------------------------------------*/
            /*  Based on the opject passed, initialize the proper            */
            /*  structure elements and invoke the correct object.            */
            /*---------------------------------------------------------------*/
            switch(wType)
                {
                /*---------------------------------------------------------------*/
                /* Functor ?                                                     */
                /*---------------------------------------------------------------*/
                case AP_FUNCTOR :
```

APPENDIX H

```
        sPobj.arity = Aref;
        sPobj.type = cp_retrieve_functor;
        sPobj.reference = Pref;

if (! cp_functor(&sPobj))
           return(AP_FAILURE);
        strncpy(Tref -> c,sPobj.name.c,sPobj.length);
        break;

/*----------------------------------------------------*/
/*   Argument ?                                       */
/*----------------------------------------------------*/
case AP_ARGUMENT :
   sPobj.arity = Aref;
   sPobj.type = cp_retrieve_functor_argument;
   sPobj.reference = Pref;

if (! cp_argument(&sPobj))
      return(AP_FAILURE);
   Tref -> i = sPobj.name.i;
   break;

/*----------------------------------------------------*/
/*   Argument of functor first, ...                   */
/*----------------------------------------------------*/
case (AP_ARGUMENT | AP_SHORT) :
   sPobj.arity = Aref;
   sPobj.type = cp_retrieve_functor_argument;
   sPobj.reference = Pref;

if (! cp_argument(&sPobj))
      return(AP_FAILURE);

/*----------------------------------------------------*/
   /*  then a Short Integer                              */
   /*----------------------------------------------------*/
   if( !cp_message3( ( wMssg | AP_SHORT),
                     sPobj.name.i,&uTmp1 ) )
      return(AP_FAILURE);
   Tref -> i = uTmp1.i;
   break;

/*----------------------------------------------------*/
/*   Argument of functor first, ...                   */
/*----------------------------------------------------*/
case (AP_ARGUMENT | AP_LONG) :
   sPobj.arity = Aref;
   sPobj.type = cp_retrieve_functor_argument;
   sPobj.reference = Pref;

if (! cp_argument(&sPobj))
      return(AP_FAILURE);

/*----------------------------------------------------*/
   /*  then a Long Integer                               */
   /*----------------------------------------------------*/
   if( !cp_message3( ( wMssg | AP_LONG ),
                     sPobj.name.i,&uTmp1 ) )
      return(AP_FAILURE);
   Tref -> l = uTmp1.l;
// printf(" argument %i =   %x \n",Aref,Tref -> l);
```

APPENDIX H

```
        return(AP_SUCCESS);
        break;

/*------------------------------------------------------*/
    /*  Invalid data type.                                  */
    /*------------------------------------------------------*/
    default :
       return(AP_FAILURE);
       break;
    }
 break;

/*----------------------------------------------------------*/
/*  Retrieve and Compare ... maybe ?                        */
/*----------------------------------------------------------*/
case (CP_RETRIEVE | CP_COMPARE) :
    /*------------------------------------------------------*/
    /*  Based on the opject passed, initialize the proper   */
    /*  structure elements and invoke the correct object.   */
    /*------------------------------------------------------*/
    switch(wType)
       {
       /*---------------------------------------------------*/
       /*  First retrieve the argument of the functor, ...  */
       /*---------------------------------------------------*/
       case (AP_ARGUMENT | AP_STRING) :
          sPobj.arity = Aref;
          sPobj.type = cp_retrieve_functor_argument;
          sPobj.reference = Pref;

if (! cp_argument(&sPobj))
             return(AP_FAILURE);

/*------------------------------------------------*/
          /*  then compare the argument to the string       */
          /*------------------------------------------------*/
          if( !cp_message3( ( CP_COMPARE | AP_STRING ),
                                          sPobj.name.i,Tref ) )
             return(AP_FAILURE);
          break;

/*---------------------------------------------------*/
       /*  First retrieve the argument of the functor, ...  */
       /*---------------------------------------------------*/
       case (AP_ARGUMENT | AP_ATOM) :
          sPobj.arity = Aref;
          sPobj.type = cp_retrieve_functor_argument;
          sPobj.reference = Pref;

if (! cp_argument(&sPobj))
             return(AP_FAILURE);
          /*------------------------------------------------*/
          /* then compare the argument to the atom          */
          /*------------------------------------------------*/
          if( !cp_message3( ( CP_COMPARE | AP_ATOM ),
                                          sPobj.name.i,Tref ) )
             return(AP_FAILURE);
          break;
```

APPENDIX H

```
    /*--------------------------------------------------*/
    /* First retrieve the argument of the functor, ... */
    /*--------------------------------------------------*/
    case (AP_ARGUMENT | AP_SHORT) :
       sPobj.arity = Aref;
       sPobj.type = cp_retrieve_functor_argument;
       sPobj.reference = Pref;
       if (! cp_argument(&sPobj))
          return(AP_FAILURE);
       /*--------------------------------------------------*/
       /* then compare the argument to the short integer */
       /*--------------------------------------------------*/
       if( !cp_message3( ( CP_COMPARE | AP_SHORT ),
                                        sPobj.name.i,Tref ) )
          return(AP_FAILURE);
       break;

/*--------------------------------------------------*/
    /* First retrieve the argument of the functor, ... */
    /*--------------------------------------------------*/
    case (AP_ARGUMENT | AP_LONG) :
       sPobj.arity = Aref;
       sPobj.type = cp_retrieve_functor_argument;
       sPobj.reference = Pref;

if (! cp_argument(&sPobj))
          return(AP_FAILURE);
       /*--------------------------------------------------*/
       /* then compare the argument to the long  integer */
       /*--------------------------------------------------*/
       if( !cp_message3( ( CP_COMPARE | AP_LONG ),
                                        sPobj.name.i,Tref ) )
          return(AP_FAILURE);
       break;

/*--------------------------------------------------*/
    /* Invalid data type.                              */
    /*--------------------------------------------------*/
    default :
       return(AP_FAILURE);
       break;
    }
 break;

/*--------------------------------------------------*/
/* Retrieve and Construct.. maybe ?                */
/*--------------------------------------------------*/
case (CP_RETRIEVE | CP_CONSTRUCT) :
    /*--------------------------------------------------*/
    /* Based on the opject passed, initialize the proper */
    /* structure elements and invoke the correct object. */
    /*--------------------------------------------------*/
    switch(wType)
       {
       /*--------------------------------------------------*/
       /* First retrieve the argument of the functor, ... */
       /*--------------------------------------------------*/
       case (AP_ARGUMENT | AP_STRING) :
          sPobj.arity = Aref;
```

APPENDIX H

```
   sPobj.type = cp_retrieve_functor_argument;
   sPobj.reference = Pref;
   if (! cp_argument(&sPobj))
      return(AP_FAILURE);

/*--------------------------------------------------*/
   /* then compare the argument to the string         */
   /*--------------------------------------------------*/
   if( !cp_message3( ( CP_CONSTRUCT | AP_STRING ),
                                     sPobj.name.i,Tref ) )
      return(AP_FAILURE);
   break;

/*--------------------------------------------------*/
/* First retrieve the argument of the functor, ... */
/*--------------------------------------------------*/
case (AP_ARGUMENT | AP_ATOM) :
   sPobj.arity = Aref;
   sPobj.type = cp_retrieve_functor_argument;
   sPobj.reference = Pref;
   if (! cp_argument(&sPobj))
      return(AP_FAILURE);
   /*                                                  */
   /* then compare the argument to the atom           */
   /*                                                  */
   if( !cp_message3( ( CP_CONSTRUCT | AP_ATOM ),
                                     sPobj.name.i,Tref ) )
      return(AP_FAILURE);
   break;

/*--------------------------------------------------*/
/* First retrieve the argument of the functor, ... */
/*--------------------------------------------------*/
case (AP_ARGUMENT | AP_SHORT) :
   sPobj.arity = Aref;
   sPobj.type = cp_retrieve_functor_argument;
   sPobj.reference = Pref;
   if (! cp_argument(&sPobj))
      return(AP_FAILURE);

/*--------------------------------------------------*/
   /* then compare the argument to the short integer */
   /*--------------------------------------------------*/
   if( !cp_message3( ( CP_CONSTRUCT | AP_SHORT ),
                                     sPobj.name.i,Tref ) )
      return(AP_FAILURE);
   break;

/*--------------------------------------------------*/
/* First retrieve the argument of the functor, ... */
/*--------------------------------------------------*/
case (AP_ARGUMENT | AP_LONG) :
   sPobj.arity = Aref;
   sPobj.type = cp_retrieve_functor_argument;
   sPobj.reference = Pref;
   if (! cp_argument(&sPobj))
      return(AP_FAILURE);

/*--------------------------------------------------*/
```

APPENDIX H

```
        /* then compare the argument to the long  integer */
        /*-------------------------------------------------*/
        if( !cp_message3( ( CP_CONSTRUCT | AP_LONG ),
                                         sPobj.name.i,Tref ) )
            return(AP_FAILURE);
        break;

/*-------------------------------------------------*/
        /*  Invalid data type.                             */
        /*-------------------------------------------------*/
        default :
            return(AP_FAILURE);
            break;
        }
      break;

/*-----------------------------------------------------*/
    /* Invalid message.                                    */
    /*-----------------------------------------------------*/
    default :
        return(AP_FAILURE);
        break;
    }
//#endif
    return(AP_SUCCESS);
    }
```

What is claimed is:

1. A method for translating data comprising the following steps:

storing a plurality of data records, each said data record corresponding to an output of a rebated monitoring component for a system including a plurality of said monitoring components, wherein each said data record having a data format including a plurality of fields, a majority of said fields being identified by a position of the field in the data record;

inputting a first query into a means for translating data;

translating said first query, using said translating means, to yield a corresponding section query having a data format of at least one of said data records;

retrieving a selectable set of data records from said plurality of data records wherein data records of said selectable set satisfy said second query;

detecting redundant information in said selectable set;

determining a resulting translation, wherein said resulting translation includes a translation of information provided by said selectable set into a data representation having one or more data areas, and for each data area of a majority of said one or more data areas there is a natural language term for identifying the data area and wherein said resulting transition is provided for analyzing said system.

2. A method, as claimed in claim 1, wherein:

each said natural language term includes English words.

3. A method, as claimed in claim 1, wherein said step of storing includes retaining said plurality of data records in an order corresponding to a time each said data record is created.

4. A method, as claimed in claim 1, wherein:

said step of determining includes providing said resulting translation for diagnosing a fault of said system, said fault represented in said plurality of data records.

5. A method, as claimed in claim 1, wherein:

said system includes a data storage and retrieval capability.

6. A method, as claimed in claim 1, wherein:

said step of translating includes generating an intermediate query different from said first query and said second query, wherein said intermediate query has a data representation including alphanumeric terms for identifying fields of said intermediate query.

7. A method, as claimed in claim 6, wherein:

said step of generating includes generating said second query using said intermediate query.

8. A method, as claimed in claim 1, wherein:

said step of retrieving includes comparing a value from said second query with a value of a one record from said plurality of records, wherein said value of said one record being identified by a position within said one record.

9. A method, as claimed in claim 1, wherein:

said step of determining includes at least one of:
 (a) filtering a value unneeded for translation from said selectable set of data records such that the value is not represented in said resulting translation;
 (b) combining one determined portion of a first data record of said selectable set with another determined portion of a second data record of said selectable set, such that said resulting translation includes data translations of both said one determined portion and said another determined portion so that redundant data in said one determined portion and said another determined portion being non-redundantly represented in said resulting translation.

10. A method, as claimed in claim 1, wherein:

said step of determining includes using said selectable set for generating an intermediate result, said intermediate result represented in a data representation including alphanumeric terms for identifying fields of said intermediate result, said intermediate result used for determining said resulting translation.

11. A method, as claimed in claim 1, wherein said first query has one or more data areas, and for each data area of a majority of said one or more data areas, there is a natural language term for identifying the data area.

12. An apparatus for bi-directionally translating data comprising:

storage means for storing a plurality of event data records, said event data records corresponding to outputs of a monitoring means for monitoring errors of a system, and each said event data record having an event data representation including a plurality of fields with each field of a majority of said fields being identified by a position in the event data record;

transcriber-interpreter means for translating between a natural language-like record and a first set of one or more data records, wherein:
 (A1) said natural language-like record includes one or more information areas, and for each information area of a majority of said one or more information areas, there being a natural language identification area for identifying the information area; and
 (A2) said first set of one or more data records being a translation of said natural language-like record, said first set being an intermediate translation used in translating between said natural language-like record and a second set of one or more data records in said event data representation;

converter-transcriber means for translating between said first set of one or more data records, and said second set;

supervisory means for controlling said transcriber-interpreter means and said converter-interpreter means for translating between said natural language-like record and said second set of one or more event data records;

means for retrieving event data records from said storage means using said first set;

wherein;
 (B1) when translating from said natural language-like record to said second set, said second set is an input query to said means for retrieving, and
 (B2) when translating from said event data records in said storage means to said natural language-like record, said one or more data records in said second set are event data records retrieved from said storage means using said means for retrieving.

13. An apparatus, as claimed in claim 12, wherein:

each of said data records in said first set is represented in a data record representation including:
 (a) an identifier portion having an alphanumeric function identifier from a predetermined set of function identifiers; and
 (b) a data portion having a predetermined ordering of one or more function parameter designations for each function identifier in said predetermined set of function identifiers, each of said one or more function parameter designations having an alphanumeric representation.

14. An apparatus, as claimed in claim 12, wherein:

a majority of said data records of said second set are represented as non-alphanumeric bit strings.

15. An apparatus, as claimed in claim 10, wherein:

said supervisory means receives said natural language-like record from a data analysis means for translating said natural language-like record into said second set of event data records by first invoking said transcriber-interpreter means and subsequently invoking said converter-transcriber means.

16. An apparatus, as claimed in claim 12, wherein:

said system includes means for archiving and retrieving data and said monitoring means includes a plurality of sensors embedded in said system for outputting error data corresponding to said event data records of stored plurality of event data records.

17. An apparatus, as claimed in claim 12, wherein:

said converter-transcriber means translates said first set of one or more data records into output data suitable for a report generation means for generating a report related to an informational content of said first set.

18. An apparatus, as claimed in claim 12, wherein:

said transcriber-interpreter means translates said natural language-like record into an English language equivalent.

19. An apparatus as claimed in claim 12, wherein:

said transcriber-interpreter means includes an hierarchical collection of rules used for translating.

20. An apparatus, as claimed in claim 12, wherein one of said transcriber-interpreter means and said converter-transcriber means includes a filtering means for removing unrequested information in said second set when translating from said second set to said first set.

21. An apparatus, as claimed in claim 12, wherein one of said transcriber-interpreter means and said converter-transcriber means includes a means for detecting redundant information in said second set when translating from said second set to said first set.

* * * * *